US012505400B2

(12) United States Patent
Kuck et al.

(10) Patent No.: US 12,505,400 B2
(45) Date of Patent: Dec. 23, 2025

(54) OPTIMIZATION OF PACKAGE WEIGHT DISTRIBUTION

(71) Applicant: Dexterity, Inc., Redwood City, CA (US)

(72) Inventors: Jonathan Kuck, Palo Alto, CA (US); Zhouwen Sun, San Mateo, CA (US); Jacopo Banfi, Allston, MA (US); Vikram Ramanathan, Menlo Park, CA (US); William Arthur Clary, Pasadena, CA (US); Kevin Jose Chavez, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 18/100,940

(22) Filed: Jan. 24, 2023

(65) Prior Publication Data

US 2023/0245036 A1    Aug. 3, 2023

Related U.S. Application Data

(60) Provisional application No. 63/305,193, filed on Jan. 31, 2022.

(51) Int. Cl.
*G06Q 10/083*    (2024.01)
(52) U.S. Cl.
CPC .................................. *G06Q 10/083* (2013.01)
(58) Field of Classification Search
CPC .............................. G06Q 50/40; G06Q 10/083
See application file for complete search history.

(56) References Cited

U.S. PATENT DOCUMENTS 9,315,344 B1    4/2016    Lehmann
9,884,734 B1    2/2018    Garner
(Continued)

FOREIGN PATENT DOCUMENTS

CN    112009923    12/2020
CN    112589791    4/2021
(Continued)

OTHER PUBLICATIONS

T. Fromm and A. Birk, "Physics-based damage-aware manipulation strategy planning using Scene Dynamics Anticipation," 2016 IEEE/RSJ International Conference on Intelligent Robots and Systems (IROS), Daejeon, Korea (South), 2016, pp. 915-922, doi: 10.1109/IROS.2016.7759159. (Year: 2016).*
(Continued)

*Primary Examiner* — George Chen
*Assistant Examiner* — Tayar M Kyu
(74) *Attorney, Agent, or Firm* — Van Pelt, Yi & James LLP

(57) ABSTRACT

The present application discloses a method, system, and computer system for arranging a set of objects for loading to a transport container. The method includes (i) receiving an indication of the set of objects to be loaded into the transport container for transport from a source location to a destination location, (ii) determining, based at least in part on object information corresponding to the set of objects and resources available to load the set of objects, an arrangement of the set of objects loaded into the transport container that satisfies a weight distribution criteria, and (iii) providing the arrangement as an output to be used in connection with loading the set of objects to the transport container.

20 Claims, 25 Drawing Sheets

(56) References Cited

U.S. PATENT DOCUMENTS

| | | |
|---|---|---|
| 10,618,172 B1 | 4/2020 | Diankov |
| 2003/0116484 A1 | 6/2003 | Takizawa |
| 2007/0156255 A1 | 7/2007 | Herrmann |
| 2009/0037245 A1 | 2/2009 | Gabrielson |
| 2010/0222915 A1 | 9/2010 | Kuehnemann |
| 2010/0316468 A1 | 12/2010 | Lert |
| 2011/0137624 A1 | 6/2011 | Weisman |
| 2012/0283868 A1 | 11/2012 | Rutt |
| 2017/0183158 A1 | 6/2017 | Zhu |
| 2018/0075402 A1* | 3/2018 | Stadie ............... G05D 1/0255 |
| 2018/0194575 A1 | 7/2018 | Anderson |
| 2020/0130935 A1 | 4/2020 | Wagner |
| 2020/0242285 A1 | 7/2020 | Huang |
| 2020/0247611 A1 | 8/2020 | Sharp |
| 2020/0269429 A1 | 8/2020 | Chavez |
| 2020/0316782 A1 | 10/2020 | Chavez |
| 2020/0377315 A1 | 12/2020 | Diankov |
| 2021/0019452 A1 | 1/2021 | Theobald |
| 2021/0053699 A1 | 2/2021 | Carpenter |
| 2021/0122046 A1 | 4/2021 | Sun |
| 2021/0122590 A1 | 4/2021 | Garner |
| 2021/0129334 A1* | 5/2021 | Kanunikov ............ B25J 9/1671 |
| 2021/0133650 A1 | 5/2021 | Cella |
| 2021/0158185 A1 | 5/2021 | Mcfarland |
| 2021/0206587 A1 | 7/2021 | Chavez |
| 2021/0276807 A1* | 9/2021 | van Schijndel ...... G05D 1/0212 |
| 2021/0279831 A1 | 9/2021 | Moore |
| 2022/0016977 A1 | 1/2022 | Shimomura |
| 2023/0241776 A1 | 8/2023 | Kuck |
| 2023/0241777 A1 | 8/2023 | Morris-Downing |

FOREIGN PATENT DOCUMENTS

| | | |
|---|---|---|
| DE | 102020201683 | 8/2021 |
| JP | H05116760 | 5/1993 |
| JP | 2017165517 | 9/2017 |
| JP | 2020064335 | 4/2020 |
| JP | 2020172384 | 10/2020 |
| JP | 2022521002 | 4/2022 |
| TW | 201013554 | 4/2010 |
| TW | M575565 | 3/2019 |
| TW | 202137128 | 10/2021 |
| WO | 2021160445 | 8/2021 |

OTHER PUBLICATIONS

International Preliminary Report on Patentability for International Application PCT/US2023/011509, Aug. 6, 2024, 8 pages.

* cited by examiner

OPTIMIZATION OF PACKAGE WEIGHT DISTRIBUTION

CROSS REFERENCE TO OTHER APPLICATIONS

This application claims priority to U.S. Provisional Patent Application No. 63/305,193 entitled OPTIMIZATION OF PACKAGE WEIGHT DISTRIBUTION filed Jan. 31, 2022 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of objects use strategies such as packing and unpacking dissimilar objects in boxes, crates, containers, conveyor belts, and on pallets, etc. Packing dissimilar objects in boxes, crates, on pallets, etc. enables the resulting sets of objects to be handled by heavy lifting equipment, such as forklifts, cranes, etc., and enables objects to be packed more efficiently for storage (e.g., in a warehouse) and/or shipment (e.g., in truck, cargo hold, etc.).

In some contexts, objects may be so dissimilar in size, weight, density, bulkiness, rigidity, strength of packaging, etc. that any given object or set of objects may or may not have attributes that would enable those objects to support the size, weight, distribution of weight, etc., of a given other object that might be required to be packed (e.g., in a box, container, pallet, etc.). When loading a transport container with a set of dissimilar objects, objects must be selected and loaded carefully to ensure the objects within the transport container does not collapse, lean, or otherwise become unstable (and to avoid object damage.

Use of robotics is made more challenging in many environments due to the variety of objects, variations in the order, number, and mix of objects to be packed, on a given pallet for example, and a variety of types and location of container and/or feed mechanism from which objects must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
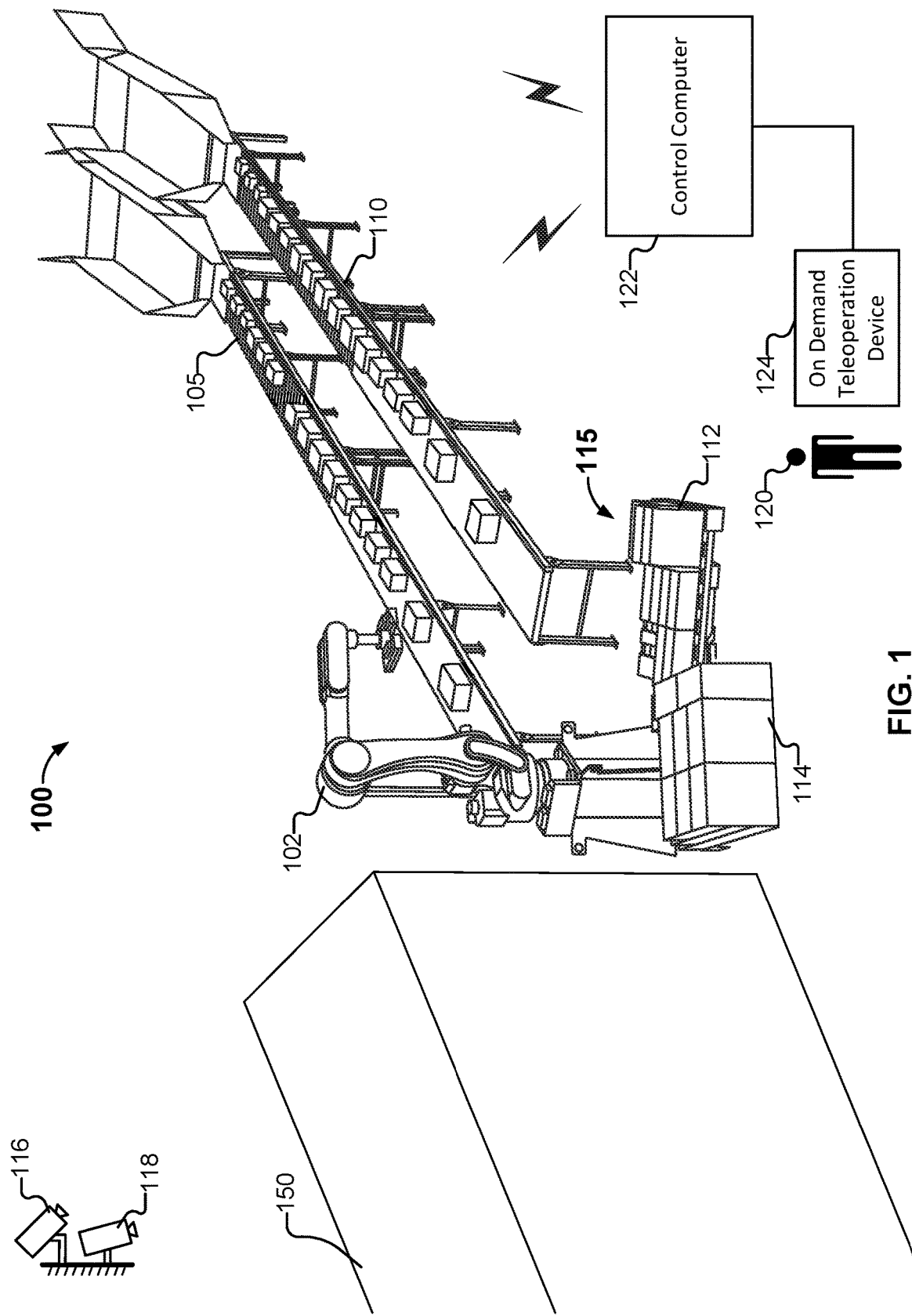
FIG. 1 is a diagram illustrating a robotic system to load objects to a transport container according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of objects on the pallet), any combination of the foregoing, and/or a sensor array comprising a plurality of sensors of the foregoing, etc. An example of a vision system is further described in U.S. patent application Ser. No. 16/667,661, the entirety of which is hereby incorporated herein for all purposes.

As used herein, a transport container includes a shipping container, an intermodal container, a cargo bay in a vehicle such as a truck, a truck bed, etc. In some embodiments, various other types of physically constrained space may be deemed a transport container for purposes herein.

Loading a set of objects to one or more transport containers is a computationally expensive operation because of the extremely large number of permutations or combinations for allocating objects to a particular transport container and for arranging a set of objects into the particular transport container. Certain loadings (e.g., partitioning, arrangements, orientations) of objects into a particular transport container are more desirable than other loadings because weight distributions in a transport container impact the safety of transporting the transport containers, and because the density of the loadings impacts the number of transport containers required to transport the set of objects.

Various embodiments use one or more models to optimize loadings of the set of objects, or otherwise select a best loading of the set of objects. In some embodiments, the system determines/selects a best loading of the set of objects within one or more predefined constraints. Examples of the one or more predefined constraints include (i) a time to compute/determine the particular loading of the set of objects to the one or more transport containers, (ii) a robotic system resource constraint (e.g., a number of robots that can be used to load the set of objects, a movement constraint by the robots, etc.), (iii) a constraint imposed by the dimensions of the transport container to which the set of objects are to be loaded, (iv) a weight distribution constraint (e.g., to eliminate loadings that are deemed unsafe or unstable), (v) a scoring constraint based on a predefined scoring function (e.g., a function that measures a goodness of one or more characteristics of the loading, such as density, stability, etc.), (vi) a buffer zone constraint (e.g., that constrains the extent to which objects may be buffered in connection with resequencing the objects), etc. Various other constraints may be implemented.

Determining the manner to load a set of objects into one or more transport containers generally takes a significant amount of time, such as in connection with simulating various possible loadings. Various embodiments implement a time constraint on the determination/selection of the loading. In some embodiments, the system determines the loading (e.g., the partitioning, sequencing, arrangement, etc.) based on a determination that a scoring of the loading according to a predefined scoring function exceeds a predefined scoring threshold. For example, the system selects the first evaluated loading that has a satisfactory scoring, such as in order to quickly determine a loading that is "good-enough". In some embodiments, the system iteratively evaluates potential loadings, and after a predefined time threshold has expired, the system determines the loading associated with a highest scoring among the set of evaluated loading and uses such a loading in connection with providing a plan of the loading as an output for loading the set of objects in the one or more transport containers.

Various embodiments include a system, method, and/or device for determining a plan for loading a set of objects into one or more transport containers. The method includes determining the plan based at least in part on determining whether to partition the set of objects to be loaded into a plurality of transport containers in response to determining to partition the set of objects across a plurality of partitions, determining the partitioning to obtain the set of partitions. The method further includes determining a sequencing of objects for loading a set of objects, or a subset of the set of objects (e.g., a partition of the set of partitions), to a particular transport container of the one or more transport containers. For examples, the system determines a sequence in which objects are expected to arrive to a workspace for loading (e.g., based on sensor data obtained by a vision system, or information recording an order in which objects were unloaded from one or more other transport containers), and the system determines whether to perform a re-sequencing of the set of objects. In response to determining to re-sequence the objects to be loaded into a particular transport container, the system determines a strategy for re-sequencing objects (e.g., controlling a conveyance structure or infeed system to provide certain objects before others, staging certain objects in a buffer zone as such objects are delivered to allow for the picking and placing of other objects before those in the buffer zone, etc.). In connection with determining a resequencing of the objects or determining that a resequencing is not to be performed, the system determines an arrangement of the set of objects into the corresponding transport container. For example, the system determines a placement and orientation of the set of objects. The system provides the plan as an output for controlling one or more robots to partition, re-sequence, and/or load the set of objects into the one or more transport containers.

Various embodiments include a system, method, and/or device for determining a plan for partitioning a set of objects among a set of transport containers. The method includes (i) receiving an indication of the set of objects to be loaded into the set of transport containers, (ii) determining, based at least in part on object information corresponding to the set of objects and resources available to load the set of objects, a plan to partition the set of objects across the set of transport containers, the plan including an indication of a subset of the objects allocated to a corresponding subset of the containers, and (iii) providing the plan as an output to be used in connection with loading various subsets of objects to corresponding subsets of containers. The system determines the plan to partition the set of objects (or determines not to partition the set of objects) based at least in part on a model, such as a partitioning model. For example, the system stores a partitioning model, which may be a machine learning model that is trained using information obtained from historical placements or loadings of sets of objects in transport containers. As another example, the partitioning model is trained using simulations that are performed by a computing system using various engines or models, such as a physics engine, a placement model, etc.

Examples of challenges associated with partitioning that are overcome by various embodiments include Computational complexity: the number of partitioning of the input set of objects is combinatorially large, thereby making exact optimization computationally intractable.

Safety: objects should be safely loaded into each transport container and safely transported. The safety constraint may include human personnel safety (e.g., loading helpers and truck drivers, etc.) and object safety (e.g., damage avoidance during load, transport, and unload).

Time: the partitioning is to be performed within a fixed time limit. As an example, the physical partitioning is to be executable in a shipping facility within a fixed time and subject to storage, layout, and routing hardware constraints. As another example, the loading of the various partitions of objects are to be loaded within a fixed amount of time (e.g., a fixed aggregate time for loading all partitions, or fixed time for loading a particular partition, etc.).

Cost: operational costs of executing partitioning, loading, and transport of the transport container should be minimized, or below a predefined cost threshold.

Personnel and hardware: people and hardware used to load objects into transport containers may differ between truck bays or shipping facilities, etc.

Various embodiments include a system, method, and/or device for sequencing a set of objects for loading to a transport container. The method includes (i) receiving an indication of the set of objects to be loaded into the transport container for transport from a source location to a destination location, (ii) determining, based at least in part on object information corresponding to the set of objects and resources available to load the set of objects, a sequence according to which the set of objects are to be loaded into the transport container, and (iii) providing the sequence to a robotic system to implement in connection with loading the set of objects to the transport container. The system determines a plan to sequence the set of objects (or determines not to re-sequence the set of objects) based at least in part on a model, such as a sequencing model. For example, the system stores a partitioning model, which may be a machine learning model that is trained using information obtained from historical placements or loadings of sets of objects in transport containers. As another example, the sequencing model is trained using simulations that are performed by a computing system using various engines or models, such as a physics engine, a placement model, etc.

Examples of challenges associated with partitioning that are overcome by various embodiments include:

Computational complexity: the number of ordered sequences is combinatorial in the number of objects (e.g., number of objects within a partition or set of objects to be loaded to a particular transport container), thereby making exact optimization computationally intractable.

Stability: the objects packed in a transport container are to be stably packed. Stability may be accomplished by tightly wedging boxes between transport container walls (or truck walls), but without significant mechanical supports such as shrink-wrapping, bungee cords, ratchet straps, tie downs, etc.

Simulation: Simulating the loadings of a set of objects in a transport container is difficult. For example, accurately simulating many deformable bodies (e.g., objects) in contact with one another and subjected to forces (e.g., compressive forces) is computationally expensive.

Density: the objects packed in a transport container are to satisfy a density constraint. For example, a high density of objects is preferred/required (e.g., boxes are to fit tightly together with few air gaps). However, object dimensions, packaging, rigidity, etc. are highly diverse with many unique objects.

Feasibility: certain object orderings may be expensive to achieve based on a source location from which objects are routed, and/or the physical layout and properties of the shipping facility or other warehouse.

Order uncertainty: Hardware malfunction or human involvement may perturb the requested (e.g., determined) ordered object sequence. In some embodiments computed ordered sequence may account for the foregoing uncertainty in the final ordering, and may otherwise be robust to perturbations.

Weight distribution: objects are to be loaded onto the transport container/truck such that (i) the weight distribution of the objects does not cause damage to the objects during transport, (ii) the weight distribution of the objects results in safe truck/transport handling while driving or otherwise being transported, and/or (iii) avoids undue strain on transport hardware, such as truck hardware, thereby improving truck lifetime.

Object characteristics: object perception (e.g., shape and physical properties such as dimension, weight, type of packaging, fragility, rigidity, etc.) obtained from vision-based sensors (e.g., a vision system) or touch-based sensors is used to determine object attributes that are to be used to determine the ordering (e.g., to be used in connection with simulating the packed objects, etc.).

Available hardware: transport containers, robotic loading hardware, and human personnel may different between truck bays or shipping facilities. The variations in available hardware may be taken into consideration in various embodiments in determining the subset of objects to load particular transport container (e.g., object partitioning) and the order in which the subset of objects is to be loaded to the transport container.

Various embodiments include a system, method, and/or device for arranging a set of objects for loading to a transport container. The method includes (i) receiving an indication of the set of objects to be loaded into the transport container for transport from a source location to a destination location, (ii) determining, based at least in part on object information corresponding to the set of objects and resources available to load the set of objects, an arrangement of the set of objects loaded into the transport container that satisfies a weight distribution criteria, and (iii) providing the arrangement as an output to be used in connection with loading the set of objects to the transport container. The system determines the plan to arrange the set of objects based at least in part on a model, such as an arrangement model. For example, the system stores a partitioning model, which may be a machine learning model that is trained using information obtained from historical placements or loadings of sets of objects in transport containers. As another example, the partitioning model is trained using simulations that are performed by a computing system using various engines or models, such as a physics engine, a placement model, etc.

Examples of challenges associated with partitioning that are overcome by various embodiments include:

Computational complexity: the number of objects and possible orientations of the objects to be loaded in a transport container combinatorial in the number of objects (e.g., number of objects within a partition or set of objects to be loaded to a particular transport container), thereby making exact optimization or physical simulation computationally expensive.

Robotic manipulators loading constraints: loading of a set of objects into a transport container is to be feasible and efficient for robotic manipulators. For example, the loading avoids/minimizes the extent to which a robot is placed in awkward poses or transitions. As another example, the loading minimizes or constrains the time permitted for a feasible loading.

Robotic manipulators unloading constraints: unloading of a set of objects into a transport container is to be feasible and efficient for robotic manipulators.

Integration with other systems/modules: the system/module for determining or planning a loading of a set of objects in a transport container (e.g., an arrangement of objects, an order in which the objects are loaded in accordance with the arrangement, etc.) may be integrated with modules configured to determine an order/sequence of loading a set of objects and/or a manner by which a set of objects are partitioned into N partitions or subsets of objects, each loading into one of N transport containers.

Density: the objects packed in a transport container are to satisfy a density constraint. For example, a high density of objects is preferred/required (e.g., boxes are to fit tightly together with few air gaps). However, object dimensions, packaging, rigidity, etc. are highly diverse with many unique objects.

FIG. 1 is a diagram illustrating a robotic system to load objects to a transport container according to various embodiments. In some embodiments, system 100 is implemented at least in part by process 600 of FIG. 6, process 700 of FIG. 7, process 800 of FIG. 8, process 900 of FIG. 9, process 1000 of FIG. 10, process 1100 of FIG. 11, process 1100 of FIG. 12, process 1300 of FIG. 13, process 1400 of FIG. 14, process 1500 of FIG. 15, process 1600 of FIG. 16, process 1700 of FIG. 17, process 1800 of FIG. 18A, and/or process 1850 of FIG. 8B.

In the example shown, system 100 includes a robotic arm 102. In this example the robotic arm 102 is stationary, but in various alternative embodiments, robotic arm 102 may be a fully or partly mobile, e.g., mounted on a rail, fully mobile on a motorized chassis, etc. In other implementations, system 100 may include a plurality of robotic arms with a workspace. As shown, robotic arm 102 is used to pick arbitrary and/or dissimilar objects from one or more conveyors (or other source) 110 and 105 in connection with loading the objects to transport container 150, or to pick objects from transport container 150 and placing the objects on one or more conveyors in connection with unloading transport container 150. In some embodiments, other robots not shown in FIG. 1 may be used to load pallets of objects to be loaded/unloaded into transport container 150, to push pallets or trays of objects to the workspace of robotic arm 102 for loading/unloading to transport container 150, etc.

As illustrated in FIG. 1, system 100 may comprise one or more predefined zones. For example, pallet 112, pallet 114 are shown as located within buffer zone 115. In some embodiments, one of the predefined zones is used as a buffer or staging area in which objects are temporarily stored (e.g., such as temporary storage until the object is to be loaded to transport container 150 in connection with loading objects to transport container 150 or loaded to conveyors 105 and/or 110 in connection with unloading objects from transport container 150). As illustrated in FIG. 1, buffer zone may comprise one or more containers or pallets to hold objects for buffering/staging during loading/unloading. The predefined zone(s) may be denoted by marking or labelling on the ground or otherwise structurally such as via the frame shown in system 100. Each of the predefined zones (e.g., buffer zones) may be located within range of robotic arm 102 (e.g., such that robotic arm 102 can place, objects in the buffer zone and/or pick objects from the buffer zone, etc.). For example, the predefined zones may be located radially around robotic arm 102.

One or more objects are provided (e.g., carried) to the workspace of robotic arm 102 (or carried from the workspace) such as via conveyor 110 and/or conveyor 105. System 100 controls operation of conveyors 105, 110, such as by control a speed, a direction of operation, etc. As an example, system 100 is configured to control the speed of conveyor 105 independently of the speed of conveyor 110, or system 100 control the speeds of both conveyor 105 and/or conveyor 110. Controlling the conveyors 105, 110 may include pausing the conveyor(s) (e.g., to allow sufficient time for robotic arm 102 to pick and place the objects). In some embodiments, conveyor 105 and/or conveyor 110 carries objects for one or more manifests (e.g., orders), or one or more sets of objects that are to be respectively loaded into different transport containers. For example, conveyor 105 and conveyor 110 may carry objects for a same manifest and/or different manifests.

System 100 controls robotic arm 102 to perform pick and place operations with respect to objects in the workspace such as to load an object to transport container 150, to unload an object from transport container 150, to move an object to buffer zone 115, etc. For example, system 100 controls robotic arm 102 to pick an object from a conveyor such as conveyor 110 or conveyor 105 and place the item o in transport container 150. System 100 controls robotic arm 102 (e.g., via control computer 122) to picks the object and move the object to a corresponding destination location (e.g., a location within transport container 150) based at least in part on a plan associated with the object or a plan associated with loading/unloading a set of objects to/from a particular transport container.

In some embodiments, determining the plan associated with loading/unloading a set of objects to/from one or more transport containers includes one or more of (i) determining a partitioning (if any) of the set of objects for loading various subsets of objects in a plurality of transport containers, (ii) determining a sequencing/ordering in which objects are to be loaded/unloaded to/from a transport container, (iii) determining a sequencing/ordering in which objects are to be delivered to the workspace for the robot (e.g., robotic arm 102) to load the objects to the transport container, (iv)

determining an arrangement of the objects according to which the objects are to be loaded in the transport container, (v) simulating a loading of one or more objects to a transport container, (vi) simulating a transport of the transport container (e.g., simulating forces that the transport container is expected to experience during transport, such as in connection with evaluating the stability or safety of a loading of objects in the transport container), and/or (vii) evaluating various possible partitions, sequences, and/or arrangements (e.g., scoring based on a predefined scoring function(s) and selecting a partition, sequence, or arrangement to implement), etc.

In some embodiments, system 100 determines the plan for loading/unloading a set of objects to/from a particular transport container offline or asynchronously with the loading/unloading of the transport container. For example, system 100 determines the plan for loading/unloading a set of objects to/from one or more transport containers by querying one or more servers (e.g., querying a cloud service) based at least in part on the set of objects. The one or more servers may determine the plan based on running a plurality of simulations of loading various objects to the transport container(s) and evaluating the loadings. The one or more servers may perform the simulations and evaluations of the various loadings and the determination of the plan for loading the set of objects offline, such as overnight or otherwise before the set of objects are provided to the workspace(s) of the robots (e.g., robotic arm 102).

System 100 may update the plan for loading/unloading the set of objects to/from one or more transport containers in real-time during while the set of objects are delivered to, or are disposed in, the workspace of the robots. For example, system 100 uses a lightweight model or one or more predefined heuristics to update the plan for loading/unloading the set of objects (e.g., the plan that was previously determined offline with the loading/unloading). System 100 uses control computer 122 to update the plan for loading/unloading the set of objects. The update to the plan for loading/unloading the set of objects may account for variations in one or more of (i) objects delivered to the workspace (e.g., malfunctioning may cause additional objects to be delivered or certain objects to be withheld from delivery, etc.), (ii) properties of objects delivered to the workspace (e.g., errors in the detection of object attributes), and/or (iii) an order in which objects are delivered to the workspace, etc.

In response to receiving the plan (e.g., from a server(s)) system 100 determines a strategy for performing a pick and place operations with respect to the objects to be loaded to transport container 150. For example, determining the strategy includes determining a manner by which to grasp the object, a trajectory of the object, and a manner by which the object is released, etc.

In some embodiments, system 100 determines an update to the plan associated with the object such as while the object is on the conveyors 105, 110, and system 100 may update the plan upon picking up the object (e.g., based on an obtained attribute of the object such as weight, or in response to information obtained by a sensor in the workspace such as an indication of an expected collision with another object or human, etc.). System 100 may obtain an identifier associated with the object such as a barcode, QR code, or other identifier or information on the object. For example, system 100 scans/obtains the identifier as the object is carried on the conveyor. In response to obtaining the identifier, system 100 uses the identifier in connection with determining the order in which the items are to be loaded to transport container 150, an arrangement of the object (e.g., destination location and/or orientation), a strategy for picking and placing the object, whether to re-sequence the objects such as based on staging the object in buffer zone 115, etc. In response to determining the transport container to which the object belongs, system 100 may determine a strategy, or determine whether to update the plan for loading the object to the transport container, based at least in part on a model or simulation of the loading of objects in transport container 150 and/or of a placing of the object in transport container 150. System 100 may also determine a specific location at which the object is to be placed in transport container 150 or buffer zone 115. In addition, a plan for moving the object to the destination location may be determined, including a planned path or trajectory along which the object is to be moved. In some embodiments, the plan is updated as the robotic arm 102 is moving the object such as in connection with performing an active measure to change or adapt to a detected state or condition associated with the one or more objects in the workspace (e.g., to avoid an expected collision event, to account for a measured weight of the object being greater than an expected weight, to reduce shear forces on the object as the object moved, etc.).

According to various embodiments, system 100 comprises a vision system. System 100 may comprise one or more sensors and/or sensor arrays, such as cameras 116, 118. For example, system 100 includes one or more sensors within proximity of conveyor 105 and/or conveyor 110. The one or more sensors may obtain information associated with an object on the conveyor such as an identifier or information on the label of the object, or an attribute of the object such as dimensions of the object. In some embodiments, system 100 includes one or more sensors and/or sensor arrays that obtain information pertaining to a predefined zone and/or a pallet in the zone. For example, system 100 include a sensor that obtains information associated with buffer zone 115 and/or transport container 150. Sensors may include one or more 2D cameras, 3D (e.g., RGBD) cameras, infrared, and other sensors to generate a three-dimensional view of a workspace (or part of a workspace such as a pallet and stack of objects on the pallet). The information pertaining to buffer zone 115 and/or transport container 150 can be used in connection with determining a state of buffer zone and/or a loading of objects in transport container 150. As an example, system 100 generates a model of a loading of objects in transport container 150 based at least in part on the information pertaining to transport container 150. System 100 in turns use the model in connection with determining/updating a plan for placing an object in transport container 150.

According to various embodiments, system 100 determines a plan for picking and placing an object (or updates the plan) based at least in part on a determination of a stability of objects loaded to transport container 150. System 100 determines a model of the loading of objects in transport container 150, and system 100 uses the model in connection with determining/updating the plan for placing an object. As an example, if a next object to be moved is relatively large (e.g., such that a surface area of the object is large relative to a top surface of an object(s) on which the object relatively large object is to be placed in transport container 150), then system 100 may determine that placing the object in the planned destination location may cause the loading of objects in transport container 150 to become unstable (e.g., because the surface of the stack is non-planar). In contrast, system 100 may determine that placing the relatively large (e.g., planar) object at the planned destination location may result in a relatively loading (e.g., arrangement of objects in transport container 150). System 100 may determine that an expected stability of placing the object at the destination location is greater than a predetermined stability threshold, or that placement of the object at the destination location may result in an optimized placement of the object (e.g., at least with respect to stability).

In some embodiments, system 100 controls robotic arm 102 to load a subset of the objects to be loaded to transport container 150 to a pallet, and the pallet is subsequently loaded into transport container 150. For example, system 100 (e.g., control computer 122) determines a plan for palletizing the subset of objects, such as to obtain an optimal pallet or a pallet that satisfies one or more palletizing criteria (e.g., a stability criteria, a density criteria, satisfaction of one or more heuristics, etc.). In response to determining the plan for palletizing the subset of objects, system 100 controls robotic arm 102 to palletize the subset of objects in accordance with the plan. The pallet is moved from the workspace of robotic arm 102 to transport container 150. For example, the pallet is moved to transport container 150 by robotic arm 102 or another robotic system (e.g., a robotic forklift) or human operator.

System 100 may communicate a state of transport container 150 and/or operation of robotic arm 102 within a predefined zone. The state of transport container 150 and/or operation of robotic arm 102 may be communicated to a user or other human operator 120, such as human operator 120 (e.g., to provide a status of the loading/unloading of transport container, or to invoke human intervention to successfully complete a pick or place operation, etc.). For example, system 100 may include a communication interface (not shown) via which information pertaining to the state of system 100 (e.g., a state of transport container 150, a predetermined zone, a robotic arm, etc.) is communicated to a terminal such as on-demand teleoperation device 124 and/or a terminal used by a human operator.

According to various embodiments, system 100 uses information obtained by one or more sensors within the workspace to determine an abnormal state pertaining to transport container 150, such as an instability of objects loaded into transport container 150, or an identification of objects that have fallen from their respective destination locations. In response to detecting the abnormal state, the system communicates an indication of the abnormal state such as on-demand teleoperation device 124 or another terminal used by an operator. In addition to, or as an alternative to, notifying an operator of the abnormal state, system 100 performs an active measure in response to detecting the abnormal state. The active measure may include controlling the robotic arm 102 to at least partially correct the abnormal state (e.g., re-place fallen objects, realign the objects loaded into transport container 150, etc.). In some embodiments, the system performs the active measure to partially correct the abnormal state in response to determining that an extent of the abnormality is less than a threshold value. Examples of determining that an extent of the abnormality is less than a threshold value include (i) a determination that the misalignment of the object(s) is less than a threshold misalignment value, (ii) a determination that a number of dislodged, misplaced, or fallen objects is less than a threshold number, (iii) a determination that a size of a dislodged, misplaced, or fallen object satisfies a size threshold, etc.

A human operator may communicate with system 100 via a network such as a wired network and/or a wireless network. For example, system 100 may comprise a communication interface via which system 100 is connected to one or more networks. In some embodiments, a terminal connected via network to system 100 provides a user interface via which a human operator can provide instructions to system 100, and/or via which the human operator may obtain information pertaining to a state of system 100 (e.g., a state of the robotic arm, a state of a transport container 150, a state of a loading process for a particular manifest, etc.). The human operator may provide an instruction to system 100 via an input to the user interface. For example, a human operator may use the user interface to pause the robotic arm, pause a loading/unloading process with respect to a particular manifest, etc.

In various embodiments, elements of system 100 may be added, removed, swapped out, etc. In such an instance, a control computer initializes and registers the new element, performs operational tests, and begins/resumes loading/unloading operations, incorporating the newly added element, for example. Examples of elements may include conveyors, robotic arms, buffer zones, etc.

According to various embodiments, system 100 determines (e.g., computes, maintains, stores, etc.) an estimated state for transport container 150 and/or buffer zone 115. For example, system 100 determines a geometric model corresponding to the workspace and/or a loading of objects in transport container 150.

According to various embodiments, system 100 comprises a vision system comprising one or more sensors (e.g., sensor 240, sensor 241, etc.). In various embodiments, system 100 uses sensor data and geometric data (e.g., a geometric model) in connection with determining a location to place one or more objects in transport container 150 (or in connection with unloading one or more objects from transport container 150). System 100 uses different data sources to model the state of transport container 150 (or an arrangement/loading of objects in a transport container). For example, system 100 may estimate locations of one or more objects in transport container 150 and one or more characteristics (or attributes) associated with the one or more objects (e.g., a size of the object(s)). Examples of the one or more characteristics associated with the one or more objects include an object size (e.g., dimensions of the object), a center of gravity, a rigidity of the object, a type of packaging, a location of an identifier, etc.

System 100 determines the geometric model based at least in part on one or more attributes for one or more objects in the workspace. For example, the geometric model reflects respective attributes of a set of objects (e.g., one or more of a first set that are palletized/stacked, and a second set of objects that is to be palletized/stacked, etc.). Examples of an object include an object size (e.g., dimensions of the object), a center of gravity, a rigidity of the object, a type of packaging, a location of an identifier, a deformability of the object, a shape of the object, etc. Various other attributes of an object or object within the workspace may be implemented.

The model generated by system 100 can correspond to, or be based at least in part on, a geometric model. In some embodiments, system 100 generates the geometric model based at least in part on one or more objects that have been placed (e.g., objects for which system 100 controlled robotic arm 102 to place), one or more attributes respectively associated with at least a subset of the one or more objects, one or more objects within the workspace (e.g., predetermined objects such as a container in buffer zone 115, a robotic arm(s), a shelf system, a chute or other conveyance structure, or other infrastructure comprised in the workspace), etc. The geometric model can be determined based at least in part on running a physics engine on the control computer to model an arrangement of objects (e.g., models a state/stability of an arrangement of objects in transport container 150 or buffer zone 115, etc.). The geometric model is determined based at least in part on an expected interaction of various components of the workspace, such as an object with another object, an object, a simulated force applied to the transport container or objects within the transport container (e.g., to model the use of a forklift or other device to raise/move the transport container, to model the transport of the transport container, such as a model of a vehicle accelerating/decelerating during transport of the transport container), etc.

According to various embodiments, system 100 uses the geometric model and the sensor data to determine a best estimate of a state of the workspace or state of transport container 150. System 100 can adjust for (e.g., cancel) noise in one or more of the geometric models and/or sensor data. In some embodiments, system 100 detects anomalies or differences between a state according to the geometric model and a state according to the sensor data. In response to determining an anomaly or difference between the geometric model and the sensor data, system 100 can make a best estimate of the state notwithstanding the anomaly or difference. For example, system 100 determines whether to use the geometric model or the sensor data, or a combination of (e.g., an interpolation between) the geometric model and the sensor data, etc. In some embodiments, system 100 determines the estimated state on a segment-by-segment basis (e.g., a voxel-by-voxel basis in the workspace, an object-by-object basis, or an object-by-object basis, etc.). For example, a first part of the workspace may be estimated using only the geometric model, a second part of the workspace may be estimated using only the sensor data (e.g., in the event of an anomaly in the geometric model), and/or a third part of the workspace may be estimated based on a combination of the geometric model and the sensor data. Using the example illustrated in FIG. 1, system 100 in connection with determining an aggregated estimated state may use only the geometric model to determine the individual estimated state for the objects loaded into transport container 150, use only sensor data to determine the individual estimated state for the workspace (e.g., a state of transport container 150 and/or buffer zone 115), and use a combination of the respective geometric model and sensor data for the objects loaded to the transport container.

System 100 is configured to determine or update a plan for loading a set of objects to transport container 150. The determining the plan for loading the set of objects includes one or more of (i) determining whether to partition the set of objects (e.g., for loading across a plurality of transport containers); (ii) partitioning the set of objects in response to determining to partition the set of objects; (iii) determining a sequence in which the objects are to be delivered to the workspace of system for loading the objects to transport container 150; (iv) determining an order in which robotic arm 102 is to load the objects to transport container 150; (v) determining an arrangement of the set of objects (e.g., placements for the objects, such as location and orientation, etc.).

In some embodiments, system 100 uses control computer 122 to determine a solution with respect to loading the set of objects. Control computer 122 is configured to provide a quick solution in real-time or synchronous with the control of robotic arm 102 to load the set of objects to transport container 150. For example, system 100 (e.g., control computer 122) stores a lightweight model (e.g., a machine learning model) or a set of one or more heuristics according to which system 100 determines a solution for loading the set of objects to transport container.

In some embodiments, system 100 queries one or more servers (not shown), such as a cloud service, to determine a plan for loading the set of objects. The one or more servers are configured to provide a solution that is generally more optimal than the solution otherwise provided by the lightweight model used to determine inline solutions. For example, the one or more servers have a greater computational resources and are not as restricted with respect to time for determining the solution as the locally stored lightweight model. The one or more servers provide an offline service for determining a plan for loading a set of objects. For example, the one or more servers determine the plan asynchronous with respect to the loading of the objects to transport container 150. The one or more servers are configured to store/use a more robust model that provides solutions having higher fidelity than solutions obtained by querying the locally stored lightweight model. The lightweight model is configured to tradeoff higher fidelity for quicker computation of a solution for loading the set of objects.

In some embodiments, system 100 obtains from a cloud service a robust solution for loading the set of objects to transport container 150, and system 100 (e.g., control computer 122) queries the locally stored lightweight model based at least in part on variations of the state of the workspace in relation to the expected state of the workspace used by the cloud service to model the workspace and determine a solution. Examples of variations of the state of the workspace include: (i) different hardware constraints, such as absence of certain robots, different robotic system capabilities, or different configurations of the workspace in which the particular transport container are to be loaded, (ii) the objects are delivered to the workspace in an order different from an expected order used in determining the plan, (iii) one or more attributes of one or more objects is different from the attributes used in the modelling of the workspace to determine the plan. Various other variations may occur for which system 100 uses the locally stored lightweight model to update the plan for a more optimal plan of loading the set of items.

In some embodiments, the model for evaluating plans for loading a set of objects to transport container 150 includes a plurality of modules that are integrable. The plurality of modules may be respectively directed to evaluation along different dimensions. Examples of modules that are integrated to evaluate a solution for loading the set of objects to transport container 150 includes a partitioning module, a sequencing module, a weight distribution module, etc. As an example, the plurality of modules is respectively queried for a solution. The partitioning module is queried for a determination of whether the set of objects to be loaded are to be partitioned and loaded across a plurality of transport containers. The sequencing module is queried for (i) a determination of a sequence in which the objects are to be loaded to the applicable transport container and/or a sequence in which the objects are to be delivered to the workspace of the robot for loading to the applicable transport container (e.g., the workspace for robotic arm 102 for loading objects to transport container 150), and/or (ii) a determination of whether to update a sequence of objects delivered to the workspace or to be loaded to the applicable transport container (e.g., determine whether the system should re-sequence the objects). The weight distribution module is queried to determine whether the weight distribution of the planned loading of objects to the applicable transport container satisfies one or more weight distribution criterion. For example, the weight distribution module is queried to determine whether the weight distribution of the planned arrangement of objects is expected to ensure a safe and stable arrangement during transport. Various other modules may be implemented and integrated to the model for evaluating the loading of the set of objects.

In some embodiments, various modules used in the model for evaluating a loading of a set of objects (e.g., to provide a good-enough or best solution for loading the set of objects) implement techniques to limit the solution space of potential solutions (e.g., potential partitioning, potential sequencing, potential arrangements, etc.). For example, a module implements a technique to narrow the solution space to include feasible solutions and potentially solutions that are nearly feasible. The modules may implement one or more heuristics in connection with trimming the solution space, or may otherwise be trained (e.g., using machine learning processes) to quickly identify solutions that are expected to be deemed feasible (e.g., quickly exclude solutions that are expected to be deemed infeasible). For models that are to be implemented offline (e.g., to provide asynchronous evaluations for solutions for loading the set of objects), the modules are configured to trim the solution space to allow for more potential solutions to be evaluated (e.g., edge-case solutions are included in the potential solution space because the offline model is not as restricted with respect to computation resources or runtime to provide a feasible solution). In contrast, for models that are to be implemented inline (e.g., to provide synchronous/real-time solutions), the modules are configured to trim the solution space to generate a relatively narrower potential solution space.

In some embodiments, the model and/or modules used in connection with the model are configured to leverage combinatorial optimization and/or machine learning to efficiently find a feasible solution and to iteratively refine/improve the solution.

In some embodiments, the model is configured to provide a feasible solution within a predefined period of time. For example, the model is configured to iteratively evaluate potential solutions and identify a feasible solution within the predefined period of time. As an example, in the case of a model implemented inline to provide a solution synchronous or in real-time with the loading of the objects, the predefined period of time is 5 seconds. As another example, in the case of a model implemented offline to provide an asynchronous solution, the predefined time is on the magnitude of hours, such as 5 hours, 12 hours, etc. If the model completes evaluation of the solution space before expiration of the predefined period of time, the model returns a best solution, such as a solution having a highest scoring value with respect to an evaluation using a predefined scoring function. If the model has not completed evaluation of the solution space before expiration of the predefined period of time and if the model has identified a set of one or more feasible solutions, the model returns a best solution among the one or more feasible solutions. If the model has not completed evaluation of the solution space before expiration of the predefined period of time and the model has not yet identified a set of one or more feasible solutions, the model may implement one or more heuristics to quickly provide a solution that is deemed likely to be feasible. Examples of heuristics may include loading heavy objects first, loading large objects first, arranging heavy or large objects to be near the bottom of the transport container (e.g., on the floor of the transport container or within the first set of rows of objects, etc.), buffering fragile or deformable objects (e.g., a fragility or deformability exceeding a corresponding predefined fragility threshold or deformability threshold) or otherwise loading such objects towards the end of loading the transport container or loading such objects towards a top row of objects in the transport container, etc. Various other heuristics may be implemented.

In some embodiments, the partitioning module determines whether to partition a set of objects into partitions to be respectively loaded across a set of transport containers. In response to determining to partition the set of objects, the partitioning module determines a manner in which the set of objects are to be partitioned. For example, the partitioning module stores a mapping of subsets of objects to partitions. As another example, each partition may be assigned to a particular transport container.

In some embodiments, the partitioning module scores the loading of a subset of objects to a transport container and/or an unloading of the subset of objects from the transport container. For example, the partitioning module evaluates partitions based at least in part on a predefined scoring function. The scoring function provides an objective measure of a goodness of a loading or unloading. Examples of characteristics used in the scoring function include: stability, density, weight distribution, cost (e.g., runtime), etc. Various other characteristics may be implemented in the scoring function. As an example, the scoring function may be indicative of a cost (e.g., a cost in terms of time, work expended, etc.) of loading/unloading the subset of objects from the respective transport container. As another example, the scoring function provides a measure of whether the partition has one or more arrangements for the loading of the subset of objects in the transport container that satisfy a stability criterion (e.g., the expected stability of one or more arrangements exceeds a predefined stability threshold). As another example, the scoring function provides a measure of whether the partition has one or more arrangements for which the loading of the subset of objects satisfies a density criterion (e.g., the expected density of objects loaded into a particular transport container exceeds a predefined density threshold). As another example, the scoring function provides a measure of whether the partition has one or more arrangements for which the loading of the subset of objects satisfies a weight distribution criterion (e.g., the expected weight distribution of objects loaded into a particular transport container exceeds a predefined weight distribution).

In some embodiments, the partitioning module jointly accounts for (i) transport container unloading at a receiving shipping facility, and (ii) loading of the transport container at the outgoing shipping facility. For example, the partitioning module determines partitions that are collectively best for loading and unloading. As an example, a partition that is less optimal for loading a transport container may be selected on a determination that the partition will result in more than offsetting efficiencies at an unloading of the transport container. In some embodiments, the system scores a partition of the set of objects to be loaded based on an average of the scoring value for loading the corresponding subset of objects and the scoring value for unloading the corresponding subset of objects. For example, the system may use a weighted average of the scoring values for loading and unloading the subset of objects.

In some embodiments, the system (e.g., the partitioning module) selects the partition that has both (i) the highest score according to the predefined scoring function, and (ii) satisfies one or more feasible loading criteria. Examples of feasible loading criterion include: (a) maximum amount of time to load, unload, or collectively load and unload, (b) a minimum expected density of objects loaded to the transport container, (c) a minimum number of total objects loaded to the transport container, (d) a minimum stability of the subset of objects loaded to the transport container, (e) a weight distribution that satisfies one or more criteria such as weight being distributed at locations of transport container corresponding to the wheels of a truck that is expected to carry the transport container or otherwise at locations of transport container where the transport container is supported during transport, etc. Various other feasible loading criteria may be implemented. The one or more feasible loading criteria may be minimum requirements for a loading of a set of objects in order for the loading to be deemed feasible.

In some embodiments, the partitioning module bounds the solution space based on resources available for loading/unloading a set of objects. Examples of bounding include: (i) dimensional bounding based on the dimensions of a transport container in which the set of objects are expected to be loaded (e.g., different transport containers may have different dimensions or configurations (e.g., different types of doors or access capabilities for loading/unloading), (ii) one or more characteristics (e.g., capabilities, limitations, etc.) of a loading/unloading bay to which the set of objects or transport container is assigned, (iii) human personnel assigned to the loading/unloading the set of objects (e.g., characteristics of the human personnel assigned to a particular loading/unloading bay of the shipping facility), (iv) a runtime for implementing the loading/unloading the set of objects, (v) a runtime for determining a feasible solution, (vi) a storage, layout, and routing hardware of the shipping facility, such as an indication of whether the shipping facility has an area that may be implemented as a buffer zone to stage items and facilitate re-sequencing of items during loading/unloading, (vii) available loading/unloading hardware, such as robotic arms, robotically operated forklifts or other modalities, and the characteristics thereof (e.g., the capabilities, limitations, etc., such as extent to which a robotic arm may be configured to avoid/limit awkward poses, etc.), and (viii) the set of objects to be loaded/unloaded (e.g., the set of objects to be transported from location A to location B). Various other types of bounding may be implemented in connection with determining a solution for partitioning the set of objects.

In connection with determining a partitioning of a set of objects (e.g., determining one or more partitions according to which the set of objects are to be loaded), various embodiments of the model implement one or more other modules to assess the feasibility of a partition. Examples of the one or more other modules includes: (a) a modeling module that determines a model (e.g., a geometric model) of the workspace or transport container, (b) a simulation module that simulates pick/place operations to simulate the loading/unloading of one or more objects to/from the transport container, (c) a physics engine that simulates the physics of a transport container/loading, such as simulating forces acting on or between objects. The one or more modules invoked by the model are used to evaluate one or more of a density of objects in a transport container, a number of objects expected to be loaded to the transport container, a stability of a loading in a transport container, a weight distribution of the loading in the transport container, an expected runtime for implementing the loading/unloading the transport container. The one or more modules may be implemented to evaluate the loadings along various other dimensions.

In some embodiments, the model calls a physics engine to simulate the loading/unloading of a set of objects to/from a transport container, and to simulate the load within the transport container. The simulation of the loading/unloading may include simulating forces acting on/between objects during loading/unloading, or otherwise in connection with the placement of objects. As another example, the model may call a physics engine to simulate the transport of a load within the transport container (e.g., to simulate forces that may act on the load during transport).

The physics engine may model the transport container and/or a loading of objects to determine one or more properties associated with the loading of the objects to the transport container, such as a stability of set of objects, a weight distribution of the set of objects, etc. In some embodiments, the physics engine may determine a value pertaining to a stability (or expected stability) of the transport container and/or a loading of objects. The physics engine may determine that the transport container and/or a loading of objects is, or is expected to be, stable or unstable based on a comparison of a value pertaining to a stability (or expected stability) to a predefined stability threshold.

In some embodiments, the predefined stability threshold is set based on a confidence interval associated with stability. For example, the predefined stability threshold may be set such that 95% of the time the transport container/loading is stable and not subject to objects falling from the loading in the transport container, etc. As another example, the predefined stability threshold may be set such that 99% of the time the transport container/loading is stable. The predefined stability threshold may be set by a user.

In some embodiments, the physics engine is used in connection with determining an expected stability of a transport container/loading, such as before an action is implemented. For example, before performing placing an object to the transport container (e.g., during loading), the system uses the physics engine to evaluate an expected stability of placing the object at a particular location of the transport container. As another example, before removing an object from a transport container (e.g., during unloading), the system uses the physics engine to evaluate an expected stability of removing the object from the transport container. In response to a determination that the expected stability of a transport container/loading will be stable after performance of the action, the action may be performed or otherwise deemed to be an action that is a possible/permissible action. For example, in response to determining, after all of the objects to be loaded to the transport container are loaded, that the expected stability of the loading exceeds the stability threshold, the system deems the loading to be a feasible loading. Conversely, in response to a determination that the expected stability of a transport container/loading of objects will be not stable (or not sufficiently stable, such as less than a predetermined stability threshold) after performance of the action (e.g., complete or partial loading/unloading), the action may be performed or otherwise deemed to be an action that is a not possible/impermissible action.

In some embodiments, the physics engine is used in connection with determining a stability of a transport container/loading, such as after an action is implemented. The physics engine may be invoked by the system in connection with inline evaluation of loadings, such as in connection with determining whether the plan for loading the set of objects is to be updated (e.g., to account for variations in the expected geometric model simulated offline and the real-world characteristics of the loading of the objects). For example, after placing an object to a transport container (e.g., during loading), the system uses the physics engine to evaluate a stability in response to placing the object at a particular location in the transport container. As another example, after removing an object from the transport container (e.g., during unloading), the system may use the physics engine to evaluate the stability of the transport container/loading remaining after removal of the object. In response to a determination that the stability of a transport container/loading is stable (e.g., exceeds a predetermined stability threshold), the system may deem the transport container/loading as stable and plan a subsequent action (e.g., place a next object, or remove a next object, etc.). Conversely, in response to a determination that the stability of a transport container/loading is not stable (or not sufficiently stable, such as less than a predetermined stability threshold), the system may deem the transport container/loading as unstable and the system may implement a remedial action (e.g., to improve the stability of the transport container/loading).

According to various embodiments, the system implements a remedial action in response to a determination that the stability of a transport container/loading is not stable (or not sufficiently stable, such as less than a predetermined stability threshold). Examples of the remedial action include (i) providing an alert/indication to a user, (ii) requesting human intervention, (iii) determining and implementing a plan to remove an object from, or adjust the placement of the object within, the transport container/loading that is causing the instability, (iv) determining and implementing a plan to add an object to the transport container/loading that is expected to improve the stability of the transport container/loading (e.g., improve the stability to exceed a predetermined stability threshold), (v) determining to insert a spacer that is expected to improve the stability of the loading. In some embodiments, one or more remedial actions are implemented. The system may select one or more remedial actions to implement based at least in part on a likelihood (e.g., a measure of likelihood) that the one or more remedial actions may improve the stability, and/or an extent (e.g., a measure of the extent) to which the one or more remedial actions is expected to improve the stability.

In some embodiments, the physics engine is comprised in a module loaded and/or executed by a computer system that controls the robot performing loading/unloading of a set of items. In some embodiments, the physics engine is comprised in a module loaded and/or executed by a remote system (e.g., a server). For example, the physics engine may be hosted as a service that is called by one or more robotic systems to evaluate stability or expected stability of a transport container/loading, etc.

The system determines, in connection with invocation of the physics engine, the stability or expected stability based at least in part on sensor data pertaining to the workspace such as the transport container, objects being delivered or already delivered to the workspace, attributes of objects to be loaded/unloading to/from the transport container. As an example, the sensor data is obtained by a vision system associated with the workspace in which the robotic arm performing loading/unloading operates. In some embodiments, the physics engine determines, or obtains, a model of the transport container/loading. The model is generated based at least in part on the sensor data. The model of the transport container/loading may be generated by a modelling module that is called by the physics engine, etc. In some embodiments, the model comprises one or more attributes associated with one or more objects in the transport container/loading. Examples of an attribute of an item include size (e.g., length, width, height, etc.), weight, center of gravity, type of packaging, a measure of rigidity, an indication of whether the item is rigid, an identifier (e.g., a barcode, label, etc.), a measure of deformability, an indication of whether the object is deformable. Other attributes may be included in, or associated with, the model. According to various embodiments, the physics engine determines a stability of the transport container/loading based at least in part on the model of the transport container/loading. As an example, the physics engine determines a stability of the transport container/loading based on a position (or relative position) of one or more items in the transport container, and at least one attribute of at least one item.

In some embodiments, the system finds a preliminary solution and then iteratively seeks to improve the solution with respect to one or more predefined objectives. For example, in the case of determining partitioning, the system uses the partitioning module to determine a preliminary feasible partitioning, and then seeks to improve the partitioning to improve the runtime of loading/unloading (e.g., individual or collective runtime for loading the set of partitions), improve the stability of the expected loadings for the partitions, improve the weight distribution of the loadings for the partitions, etc. In some embodiments, the system uses one or more heuristics to make an intelligent guess on a preliminary solution. The one or more heuristics may be empirically determined based on a training set of historical simulations of loading/unloading objects to/from a transport container. For example, the one or more heuristics are determined based on implementing a machine learning process to infer the heuristics that are associated with solutions for which a corresponding scoring value (e.g., determined according to a predefined scoring function) exceeds a minimum scoring threshold. Examples of heuristics may include loading heavy objects first (e.g., an expected weight exceeding a predefined weight threshold), loading large objects first (e.g., an expected volume or dimension of the object exceeding a predefined size threshold), arranging heavy or large objects to be near the bottom of the transport container (e.g., on the floor of the transport container or within the first set of rows of objects, etc.), buffering fragile or deformable objects (e.g., a fragility or deformability exceeding a corresponding predefined fragility threshold or deformability threshold) or otherwise loading such objects towards the end of loading the transport container or loading such objects towards a top row of objects in the transport container, etc. Various other heuristics may be implemented.

An example of the system finding a preliminary solution to partitioning of objects between two transport containers is to assign a number to each object (e.g., according to a sequence in which the objects are provided), and assigning objects corresponding to an even number to a first transport container and assigning objects corresponding to an odd number to a second transport container. The system then simulates the loadings according to such a partitioning to assess whether the solution is feasible (e.g., a scoring value exceeds a predefined scoring threshold). In some embodiments, the system iterative tries to improve the solution. An example of iteratively attempting to improve the solution is by varying the partitioning, such as by changing the sequence of items, or shuffling items between partitions. The system performs a simulation and calls the model to evaluate the various iterations of the solutions in connection with identifying feasible solutions. As another example, in response to determining a preliminary solution or an iteration of a solution, the system analyzes the loading (e.g., a model of the loading of the set of objects in the transport container) and determines the object placements that are expected to have caused instability or that are expected to have negatively impacted density. In response to identifying the placements that are expected to have negatively impacted density, stability, weight distribution etc., the system determines an alternative placement of such object(s) to improve the density, stability, weight distribution, etc. The system simulates alternative placement and evaluates the loading to determine whether the arrangement corresponds to a feasible solution.

In some embodiments, the sequencing module is configured to perform one or more of (i) obtaining an order in which set of objects are provided to the workspace, (ii) an order in which the set of objects are to be loaded/unloaded (e.g., placed in) to/from the transport container, (iii) determining whether the set of objects to be re-sequenced before loading the set of objects to the transport container, (iv) in response to determining that the set of objects is to be re-sequenced, determining a re-sequencing of the set of objects, (v) determining a plan for the re-sequencing of the set of objects, etc. The sequencing module determines whether to re-sequence the set of objects based at least in part on an order in which the objects are provided (e.g., carried by conveyor, etc.) to the workspace, a capability for re-sequencing (e.g., an indication of whether the workspace comprises a buffer zone), a current plan for loading the set of objects to the transport container. For example, in response to determining that a sequence in which objects are being delivered to the workspace is inconsistent (e.g., not the same, or an extent by which one or more items deviates from the planned sequence) with the expected sequence of objects (e.g., based at least in part on the plan for loading the set of objects) and determining that the robotic system is capable of re-sequencing the items (e.g., the shipping facility has a buffer zone in which the robot stages an object while placing other items being delivered to the workspace), the system determines to re-sequence the objects delivered to the workspace and a plan for re-sequencing the objects. The system provides the plan as an output, such as for a robotic system to control a robotic arm to implement the plan of re-sequencing the objects.

In some embodiments, the sequencing module determines whether to re-sequence the set of objects and/or an updated sequence of the set of objects based at least in part on one or more of: (a) an indication of a set of objects to be loaded, (b) an ordered sequence of the set of objects to be loaded, (c) an extent to which the sequence can be re-ordered (e.g., the extent may be constrained by physical hardware constraints such as buffer zones or by a predefined threshold specifying a maximum allowed edit distance between the input and output sequences), (d) a maximum loading time allowed for physically loading the transport container, (e) a maximum unloading time allowed for physically unloading the transport container, such as at a shipping destination, (f) a maximum computation time limit in which the sequencing module is to provide a best solution.

In some embodiments, the sequencing module returns a recommended solution within a maximum computation time limit. The sequencing module may utilize classical combinatorial optimization techniques, such as search, sampling, bounding, variational optimization, and iterative methods. In some embodiments, the sequencing module includes a model that is trained using machine learning processes. The model may be trained offline on problems that are specific to a particular customer's distribution (e.g., problems specific to a shipping facility, types of objects, or types of transport container). As an example, the model is trained using problem distributions that customers observe. The machine learning process is used to improve a search of a feasible solution for sequencing the objects in a data-driven manner. For example, the machine learning process is used to learn representations of object packings that incorporate physical properties and that respect spatial equivariances.

In some embodiments, the system determines an order in which objects are unloaded from one or more incoming transport containers that are to be loaded to one or more outgoing transport containers. As an example, the system stores a manifest associated with each incoming transport container, and the manifest indicates a set of objects carried in the incoming transport container and/or a manner in which the set of objects are loaded (e.g., an arrangement or other characteristics of the loading, etc.). The system uses the manifest in connection with determining a plan to unload the incoming transport container, and the system uses the manifest and/or plan in connection with determining the order in which objects will be provided to the workspace of the robotic system loading outgoing transport container(s) or a sorting stage that sorts the objects for delivery to the appropriate outgoing transport container. As another example, the plan for unloading the incoming transport container was determined at the time the transport container was loaded (e.g., in connection with optimizing collective loading and unloading of the transport container), and the system obtains the plan and determines an order in which the objects are to be provided to the workspace of the robotic system loading outgoing transport container(s) or the sorting stage.

In some embodiments, the sequencing module determines to re-sequence the set of objects at least in part at the unloading stage. For example, the system obtains the plan for unloading the set of objects from a corresponding incoming transport container, the plan including an indication of an order in which items are to be unloaded (e.g., and thus delivered to the workspace or sorting stage). In response to determining the re-sequence the set of objects at least in part at the unloading stage, the system updates the plan for unloading the set of objects. As an example, the update to the plan for unloading the set of objects includes unloading the objects in a different order to cause the objects delivered to the workspace(s) of the robotic system(s) loading the applicable transport container(s) or to the sorting stage to be corresponding re-sequenced. As another example, the update to the plan for unloading the set of objects includes causing the robotic system that is grasping objects from the incoming transport container to stage one or more objects in a buffer zone until certain other object(s) are removed from the transport container and provided to the sorting stage or the loading stage (e.g., placed on a conveyance structure that carries the objects to the sorting stage or loading stage).

In some embodiments, the sequencing module operates to seek to optimize a loading of one or more transport containers by determining an order in which the objects are to be provided to the workspace of the robotic system controlled to perform the loading of objects. In connection with determining whether to re-sequence the objects or a manner in which the objects are to be re-sequenced, various embodiments of the model implement one or more other modules to assess the feasibility of a partition. Examples of the one or more other modules includes: (a) a modeling module that determines a model (e.g., a geometric model) of the workspace or transport container, (b) a simulation module that simulates pick/place operations to simulate the loading/unloading of one or more objects to/from the transport container, (c) a physics engine that simulates the physics of a transport container/loading, such as simulating forces acting on or between objects. The one or more modules invoked by the model are used to evaluate one or more of a density of objects in a transport container, a number of objects expected to be loaded to the transport container, a stability of a loading in a transport container, a weight distribution of the loading in the transport container, an expected runtime for implementing the loading/unloading the transport container. The one or more modules may be implemented to evaluate the loadings along various other dimensions.

In connection with determining whether to re-sequence the objects or a manner in which the objects are to be re-sequenced, the sequencing module causes a loading and/or unloading of the set of objects to be simulated. For example, the model for planning the loading/unloading the set of objects may call a simulation module that simulates the loading/unloading in connection with using the sequencing module to determine a re-sequencing operation. In some embodiments, the model (e.g., the sequencing module) jointly accounts for (i) transport container unloading at a receiving shipping facility, and (ii) loading of the transport container at the outgoing shipping facility. For example, the sequencing module determines sequences that are collectively best for loading and unloading. As an example, a sequence of objects that is less optimal for loading a transport container may be selected on a determination that the partition will result in more than offsetting efficiencies at an unloading of the transport container. In some embodiments, the system scores a sequencing of the set of objects to be loaded based on an average of the scoring value for loading the corresponding subset of objects and the scoring value for unloading the corresponding subset of objects. For example, the system may use a weighted average of the scoring values for loading and unloading the subset of objects.

In some embodiments, the system (e.g., the sequencing module) selects the sequence of objects that has both (i) the highest score according to the predefined scoring function, and (ii) satisfies one or more feasible loading criteria. Examples of feasible loading criterion include: (a) maximum amount of time to load, unload, or collectively load and unload, (b) a minimum expected density of objects loaded to the transport container, (c) a minimum number of total objects loaded to the transport container, (d) a minimum stability of the subset of objects loaded to the transport container, (e) a weight distribution that satisfies one or more criteria such as weight being distributed at locations of transport container corresponding to the wheels of a truck that is expected to carry the transport container or otherwise at locations of transport container where the transport container is supported during transport, etc. Various other feasible loading criteria may be implemented. The one or more feasible loading criteria may be minimum requirements for a loading of a set of objects in order for the loading to be deemed feasible.

In some embodiments, the sequencing module bounds the solution space based on resources available for loading/unloading a set of objects and/or resources available for re-sequencing the set of objects. Examples of bounding include: (i) dimensional bounding based on the dimensions of a transport container in which the set of objects are expected to be loaded (e.g., different transport containers may have different dimensions or configurations (e.g., different types of doors or access capabilities for loading/unloading), (ii) one or more characteristics (e.g., capabilities, limitations, etc.) of a loading/unloading bay to which the set of objects or transport container is assigned, (iii) human personnel assigned to the loading/unloading the set of objects (e.g., characteristics of the human personnel assigned to a particular loading/unloading bay of the shipping facility), (iv) a runtime for implementing the loading/unloading the set of objects, (v) a runtime for determining a feasible solution, (vi) a storage, layout, and routing hardware of the shipping facility, such as an indication of whether the shipping facility has an area that may be implemented as a buffer zone to stage items and facilitate re-sequencing of items during loading/unloading (e.g., a capacity of the buffer zone(s) or extent to which buffer zone may be used to stage objects), (vii) available loading/unloading hardware, such as robotic arms, robotically operated forklifts or other modalities, and the characteristics thereof (e.g., the capabilities, limitations, etc., such as extent to which a robotic arm may be configured to avoid/limit awkward poses, etc.), (viii) the set of objects to be loaded/unloaded (e.g., the set of objects to be transported from location A to location B), (ix) a requirement that all objects in the set of objects are to fit within a particular transport container, (x) a requirement that the loading/objects is to be stable during transport, (xi) a requirement that the robotic system will be able to load the truck within the input maximum loading time (e.g., a predefined time constraint). Various other types of bounding may be implemented in connection with determining a solution for partitioning the set of objects.

In the event that the sequencing module is unable to arrive at an optimal/best solution within the computational time limit (e.g., runtime constraint), the sequencing module outputs a stable packing order that can be performed within a maximum loading time. In some embodiments, the sequencing module attempts to seek a solution that maximizes the number of objects that fit within the transport container (e.g., subject to object prioritization, such as a set of priorities respectively associated with the set of objects) during its runtime.

In some embodiments, the system stores an assignment of priorities to objects in the set of objects. For example, the system stores a mapping of objects to priorities. The respective priorities may order the objects or may identify a priority classification in which similarly classified objects are deemed the same priority (e.g., high priority, medium priority, low priority, or a requirement that a particular object must be included on a particular transport container or at a particular location in the transport container (e.g., a first or last object to be unloaded). The system may determine the solution for sequencing the set of objects based on the priorities associated with the various objects.

In some embodiments, the system finds a preliminary solution and then iteratively seeks to improve the solution with respect to one or more predefined objectives. For example, in the case of determining sequencing, the system uses the partitioning module to determine a preliminary feasible sequencing, and then seeks to improve the partitioning to improve the runtime of loading/unloading (e.g., individual or collective runtime for loading the set of partitions), improve the stability of the expected loadings based on the order in which objects are loaded, improve the weight distribution of the loadings based on the order in which objects are loaded, etc. In some embodiments, the system uses one or more heuristics to make an intelligent guess on a preliminary solution. The one or more heuristics may be empirically determined based on a training set of historical simulations of loading/unloading objects to/from a transport container. For example, the one or more heuristics are determined based on implementing a machine learning process to infer the heuristics that are associated with solutions for which a corresponding scoring value (e.g., determined according to a predefined scoring function) exceeds a minimum scoring threshold. Examples of heuristics may include loading heavy objects first (e.g., an expected weight exceeding a predefined weight threshold), loading large objects first (e.g., an expected volume or dimension of the object exceeding a predefined size threshold), arranging heavy or large objects to be near the bottom of the transport container (e.g., on the floor of the transport container or within the first set of rows of objects, etc.), buffering fragile or deformable objects (e.g., a fragility or deformability exceeding a corresponding predefined fragility threshold or deformability threshold) or otherwise loading such objects towards the end of loading the transport container or loading such objects towards a top row of objects in the transport container, enforcing a sequencing to ensure relatively large or heavy objects are provided to the workspace at the beginning of the order of objects (e.g., to facilitate loading of the large/heavy objects first), etc. Various other heuristics may be implemented.

An example of the system finding a preliminary solution to sequencing of objects between two transport containers is to determine an order in which the objects are delivered to the workspace, such as by detecting items on a conveyor based on a vision system, or to determine an order of items based on weight or size (e.g., volume or length along a dimension), or a combination thereof. The system then simulates the loadings according to such an order to assess whether the solution is feasible (e.g., a scoring value exceeds a predefined scoring threshold). In some embodiments, the system iterative tries to improve the solution. An example of iteratively attempting to improve the solution is by varying the sequencing (e.g., varying the order in which objects are loaded and determining an order in which the objects are to be delivered to the workspace to accomplish such order, including consideration of the extent to which objects may be buffered). The system performs a simulation and calls the model to evaluate the various iterations of the solutions in connection with identifying feasible solutions. As another example, in response to determining a preliminary solution or an iteration of a solution, the system analyzes the loading (e.g., a model of the loading of the set of objects in the transport container) and determines the object placements that are expected to have caused instability or that are expected to have negatively impacted density. In response to identifying the placements that are expected to have negatively impacted density, stability, weight distribution etc., the system determines an alternative placement of such object(s) to improve the density, stability, weight distribution, etc. The system simulates alternative placement and evaluates the loading to determine whether the arrangement corresponds to a feasible solution.

In some embodiments, the system implements a lightweight model that is used to quickly determine a re-sequencing of objects inline with the loading of the transport container, such as in response to determining that an order in which objects are delivered to the workspace differs from the expected order (e.g., the order determined offline by a sequencing module) or determination that a particular placement negatively impacts the loading (e.g., causes an instability or insufficient density).

In some embodiments, the system implements a weight distribution module that determines a weight distribution of a loading (e.g., a set of objects loaded to a transport container), analyzes the weight distribution of the loading, and determines whether the weight distribution of the load satisfies one or more weight distribution criterion (e.g., a feasible loading criterion). For example, the weight distribution module determines a weight distribution of a loading based on a particular partition of objects, a sequence in which objects are loaded, and/or arrangement of objects (e.g., the set of placements for the objects to be loaded to the transport container). Additionally, or optionally, the weight distribution module provides a recommendation for changing a loading (e.g., update a plan for loading the set of objects) to improve the weight distribution or to otherwise determine one or more changes that are expected to cause the loading to satisfy the one or more weight distribution criterion. The one or more weight distribution criterion ae indicative of whether the loading is expected to be safe during transit and/or whether the loading is expected to be stable (e.g., reduce the likelihood that one or more objects will fall during transit, such as below a corresponding predefined threshold).

Examples of weight distribution criterion include: (a) an extent to which weight is distributed over one or more predefined areas (e.g., areas in proximity of a location at which the transport container is expected to be supported, such as areas corresponding to a location for the wheels of a transport truck, etc.), (b) a threshold percentage of the weight being over the one or more predefined areas, (c) an extent to which relatively heavy objects (e.g., objects having weight exceeding a predefined weight threshold) are disposed towards the bottom (e.g., within the bottom quarter or bottom third of the transport container, etc.), (d) a threshold percentage of the aggregate of the load being over the one or more predefined areas, (e) a threshold percentage of the aggregate load being within a threshold distance of the bottom of the transport container (e.g., bottom quarter, bottom third, etc.), (f) an extent to which relatively light objects (e.g., objects having weight less than a predefined weight threshold) are disposed towards the top (e.g., within the top quarter or top third of the transport container, etc.), (g) a threshold percentage of the aggregate being within a threshold distance of the top of the transport container (e.g., less than twenty percent of the aggregate load being within the top quarter or top third of the transport container, (h) a threshold number of heavy objects more than a threshold distance from the bottom of the transport container (e.g., no more than three or another predefined number of objects deemed heavy being in the top half of the loading in the transport container), (i) a threshold number of light objects within a threshold distance of the bottom of the transport container, (j) a threshold percentage or number of heavy items disposed above (e.g., resting on) a light item or a deformable item, (k) a threshold amount of weight of the load over a predefined area (e.g., weight per square foot), (l) a centering of the load around tires or other supports), etc. Various other weight distribution criterion may be implemented.

In some embodiments, the weight distribution criteria are determined based on a machine learning model trained using historical load data. As an example, the model is trained based on forces expected to be encountered during transit. As another example, the model is trained based on loadings that are deemed safe and loadings that are deemed unsafe (e.g., loading profiles with which an accident during transit occurred, or a number of objects fell during transit). As another example, the model is trained based on a vehicle or transport container lifetime. For example, the model is trained to simulate a truck hardware lifetime subject to long term payload weight distributions.

In some embodiments, the weight distribution module performs a computer simulation to predict and/or measure the risk of damage to an object or a set of objects given a partition (or defined set of objects to be loaded), an ordering, an arrangement and/or a weight distribution associated with a plan for loading the set of objects. In response to determining that the expected risk of damage exceeds a predefined risk threshold, the weight distribution module deems the loading to be infeasible loading.

In some embodiments, the weight distribution module (e.g., the weight distribution machine learning model) simulates truck handling given a particular payload weight distribution. The weight distribution module determines whether the weight distribution of the load satisfies the one or more weight distribution criterion based on the simulation.

In some embodiments, the weight distribution module simulates a hardware lifetime (e.g., a truck lifetime, a transport container lifetime, etc.) subject to the particular weight distribution of the loading. The weight distribution module determines whether the weight distribution of the load satisfies the one or more weight distribution criterion based on the simulation. For example, if the load is expected to negatively impact the lifetime of the hardware or negatively impact the lifetime more than a predefined lifetime wear threshold, the weight distribution module determines that the load does not satisfy the one or more weight distribution criterion (e.g., the loading is deemed infeasible).

In some embodiments, the weight distribution module determines whether a loading satisfies one or more weight distribution criterion based at least in part on an object attribute. For example, the model (e.g., the weight distribution module) takes into consideration a delicateness or robustness of an object in connection with determining a loading, a partitioning, and/or a sequencing of a set of objects. The delicateness or robustness may be detected based on for example, information obtained from a vision system, or the delicateness or robustness may be defined, such as based on a manual assignment of delicateness, etc.

In some embodiments, the system queries the weight distribution module in connection with determining a partitioning (or whether to partition) and/or determining a sequencing. For example, the system queries the weight distribution module to verify that the weight distribution of a potential arrangement of objects (or placement of a particular object) satisfies the one or more weight distribution criterion. For example, the model calls the weight distribution module in connection with performing a simulating of the loading of objects to a transport container for determining the partitioning and/or sequencing of the set of objects.

In some embodiments, system 100 queries the weight distribution module (e.g., a lightweight version of the weight distribution model) to inline with controlling robotic arm 102 to load objects in transport container 150. System 100 queries the weight distribution module to assess a current weight distribution of objects loaded to transport container 150 or to determine whether a particular placement (e.g., a current placemen) violates a weight distribution criterion. The inline weight distribution module quickly assesses the load distribution, such as by evaluating the current loading in relation to one or more heuristics and provides an indication of whether the loading or a current placement violates the weight distribution criteria. In response to determining that the loading or a current placement will cause the weight distribution criteria/criterion to be violated, system 100 may perform an active measure to cure the weight distribution. For example, the weight distribution module provides an indication of one or more objects expected to cause the improper/infeasible weight distribution and/or an indication of a recommended update to the plan to cure or improve the weight distribution. The weight distribution module may provide an explanation of the weight distribution violation/imbalance. For example, the weight distribution module provides a recommendation for adjusting the placement of one or more objects loaded to transport container 150 and/or a recommendation for adjusting the placement of objects to be placed to transport container 150 (or adjusting order in which objects are to be placed).

In some embodiments, system 100 determines an initial solution (e.g., an initial partition, an initial sequence, an initial arrangement, etc., or any combination thereof) based at least in part on one or more heuristics. system 100 then iterates from the initial solution, such as by varying one or more dimensions of the solution (e.g., vary a partitioning, vary a sequence, etc.) and assessing whether subsequent solutions improve upon the previous iteration. If system 100 determines that an iteration is less optimal from a previous iteration or that an iteration is a non-feasible solution (e.g., the weight distribution would violate a weight distribution criteria, etc.), system 100 discards such iteration and continues to iterate over solutions. As an example, system 100 monitors to determine whether a solution improves or worsens relative to a current/previous iteration, and system 100 may learn one or more characteristics that are expected to lead to non-feasible solutions or solutions that have a scoring value less than a predefined scoring threshold. During simulating an iteration, system 100 stops simulation or assessment of the iteration upon determining that the solution is not feasible. For example, system 100 monitors certain values and rules during simulation of solutions and anticipates whether a solution will be a feasible solution or whether it satisfies or violates any other predefined criteria. As an example, in the case of determining a solution for partitioning a set of objects, system 100 may monitor a weight distribution among the various partitions and Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) is a combined feature vector or set of features vectors and based on the combined feature vector or set of feature vectors the classifier model determines (i) a weight distribution of a loading of objects, (ii) whether a loading of a set of objects is feasible (e.g., safe, efficient), (iii) a partitioning of a set of objects into N subsets of objects (e.g., N partitions), (iv) a sequencing/ordering of the objects to be loaded into a particular transport container, (v) an arrangement/orientation of objects to be loaded into a particular transport container, etc.

Although the foregoing example is discussed in the context of a system loading a set of objects into one or more transport containers, the robotic system can also be used in connection with unloading a set of objects from one or more transport containers.

Figure 2A:
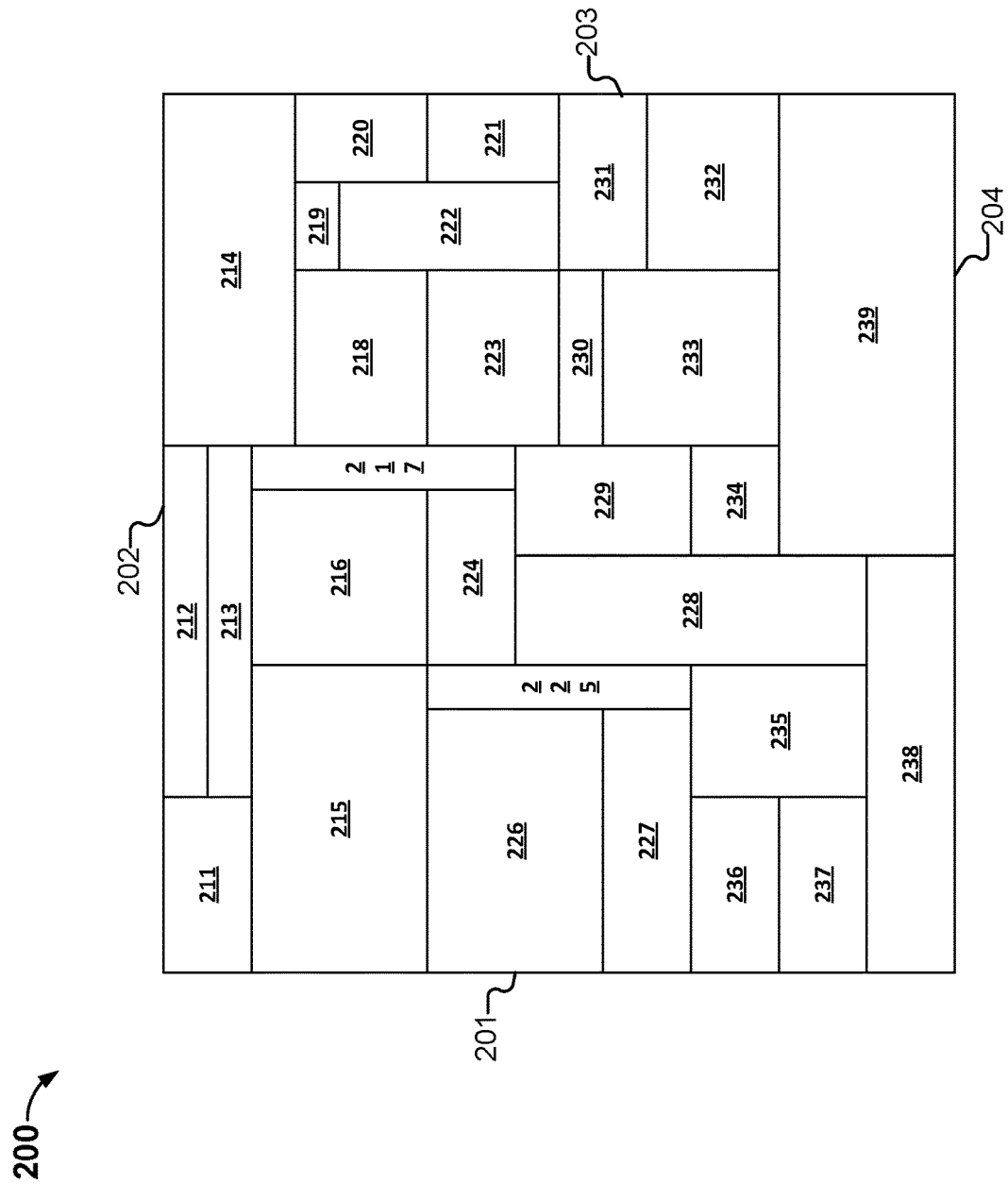
FIG. 2A is a diagram illustrating an arrangement of a set of objects in a transport container according to various embodiments.
Figure 2B:
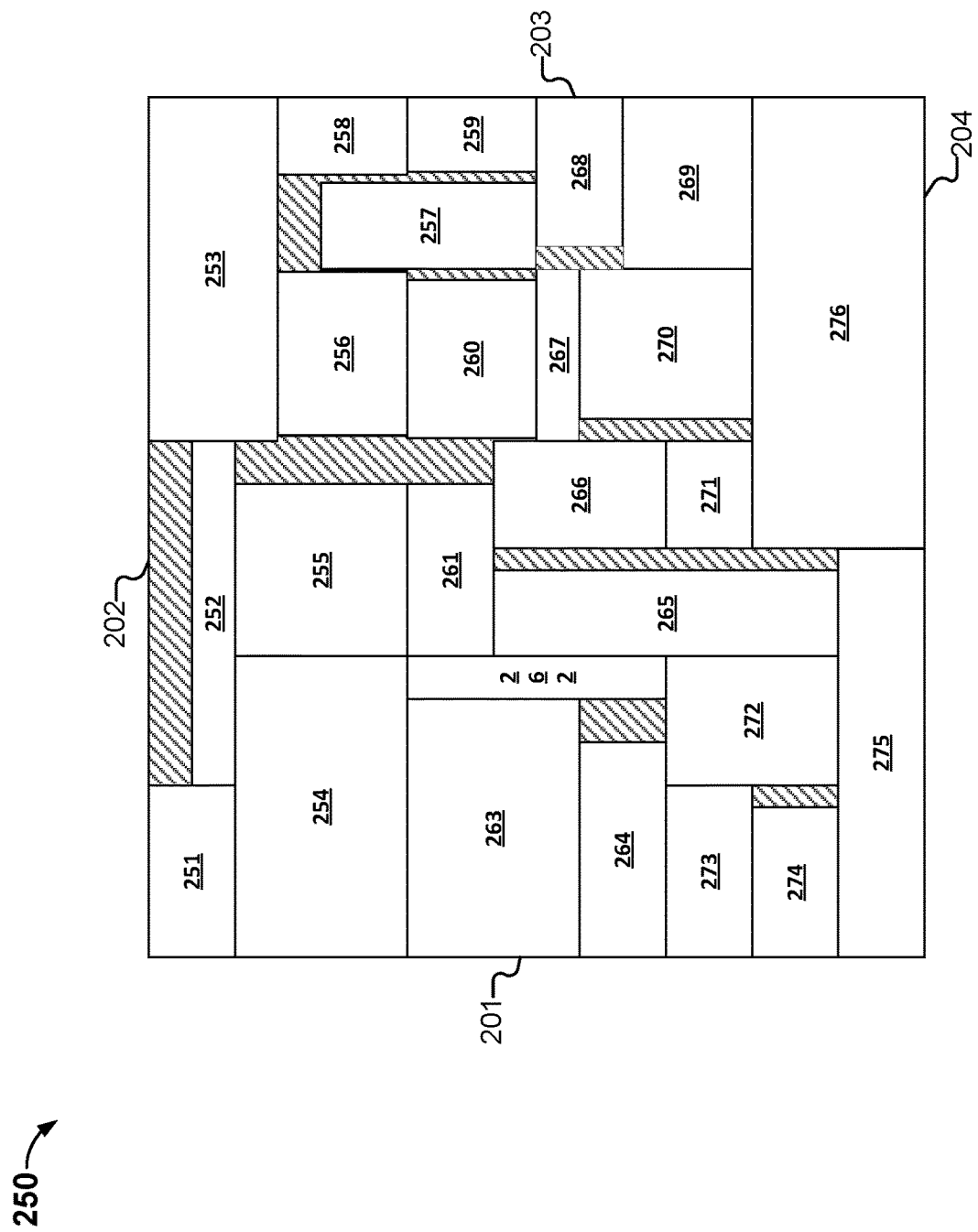
FIG. 2B is a diagram illustrating an arrangement of a set of objects in a transport container according to various embodiments.

FIGS. 2A and 2B are diagrams illustrating arrangements of a set of objects in a transport container according to various embodiments. For example, FIGS. 2A and 2B show a view from the rear of the transport container.

In the example shown in FIG. 2A, the system obtains arrangement 200 for objects 211-239. The system determines arrangement 200 based on one or more boundary conditions such as location of side walls 201-204 of the transport container. In connection with determining arrangement 200, the system may generate/simulate a geometric model for placement of items such as to optimize the arrangement (or otherwise select a best arrangement within a predefined computation runtime) according to a predefined scoring threshold. In response to determining arrangement 200, the system scores arrangement 200 based on the predefined scoring threshold. For example, the obtained scoring value is indicative of the quality (e.g., goodness) of the arrangement. Arrangement 200 has a relatively high density of objects (e.g., the system has determined a loading without spaces between objects). Accordingly, arrangement 200 has a high scoring value at least along the density dimension, however, arrangement 200 may be less high along other dimensions, such as weight distribution, time to load the set of objects, the number of objects that are within the load.

In the example shown in FIG. 2B, the system obtains arrangement 250 for objects 251-276. The system bounds the solution for the arrangement of objects 251-276 based on the location of side walls 201-204 of the transport container. In response to determining arrangement 250, the system scores arrangement 250 based on the predefined scoring threshold. Although arrangement 250 has a relatively high density of objects, arrangement 250 has a lower density (at least in the view from the rear of the transport container). For example, arrangement 250 has several gaps/spacing between certain objects, such as a gap above object 252, a gap between objects 262 and 265, a gap between objects 265 and 266, a gap between objects 253 and 257, etc.

Figure 3A:
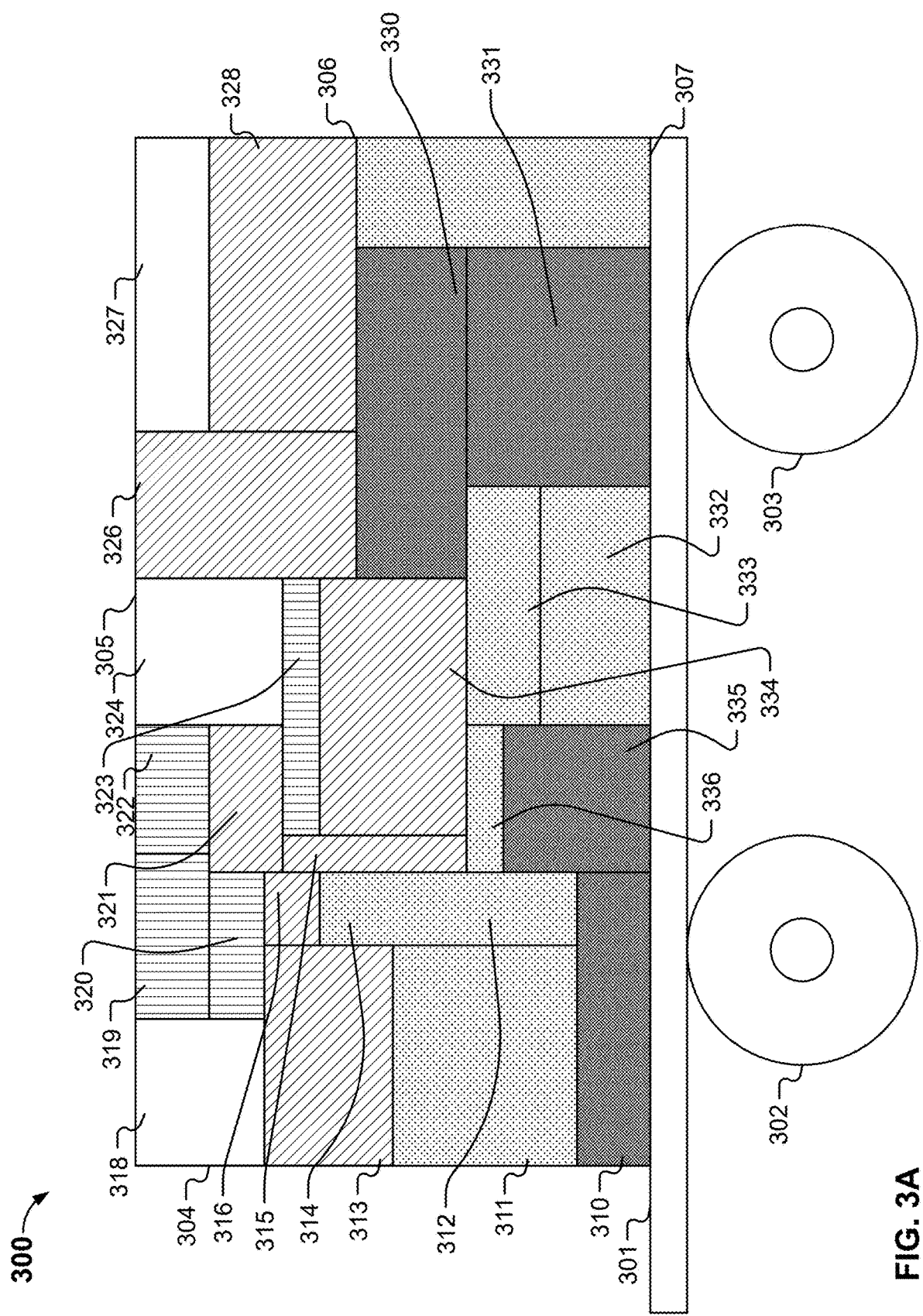
FIG. 3A is a diagram illustrating a weight distribution of a set of objects in a transport container according to various embodiments.
Figure 3B:
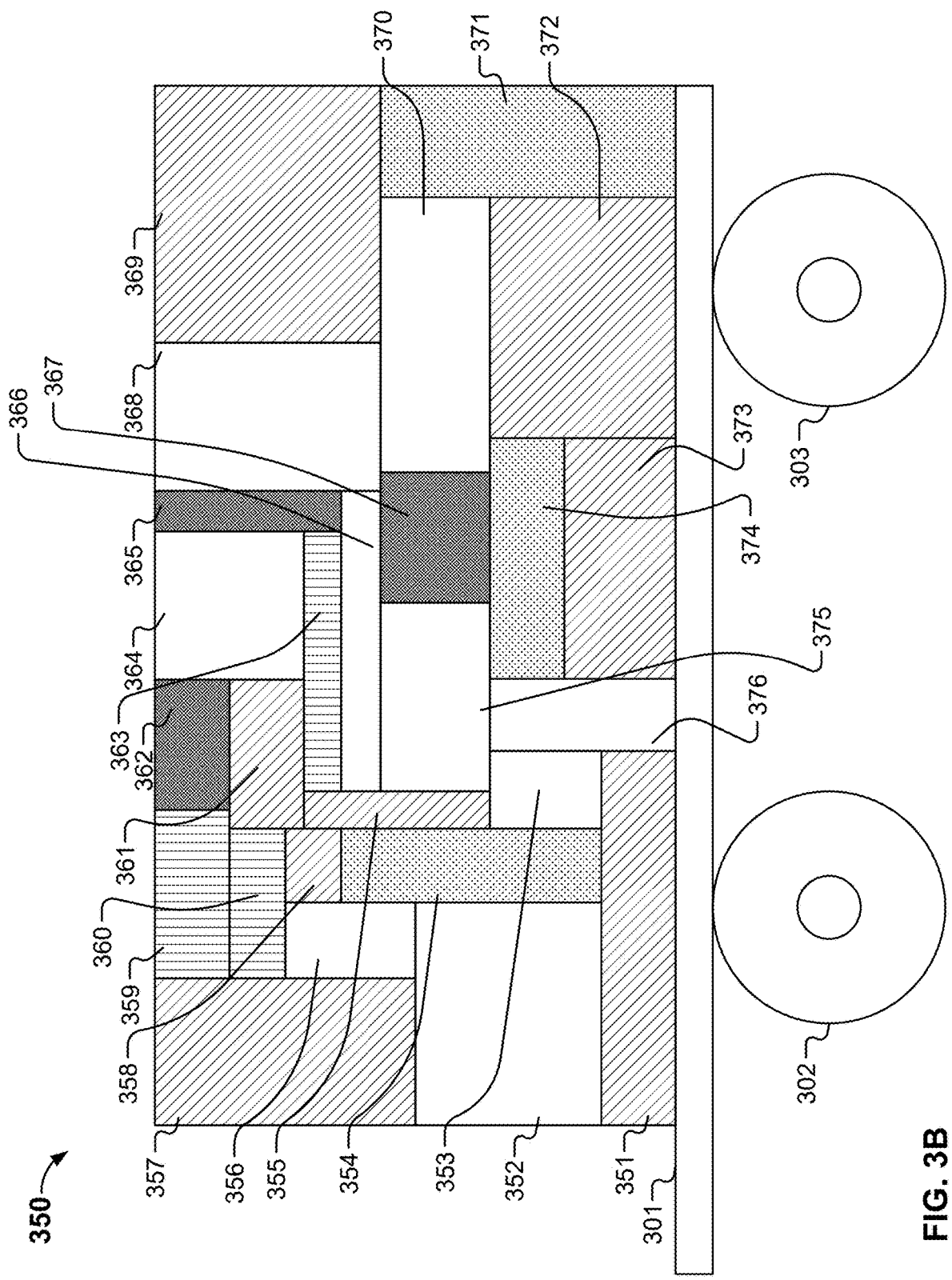
FIG. 3B is a diagram illustrating a weight distribution of a set of objects in a transport container according to various embodiments.
Figure 3C:
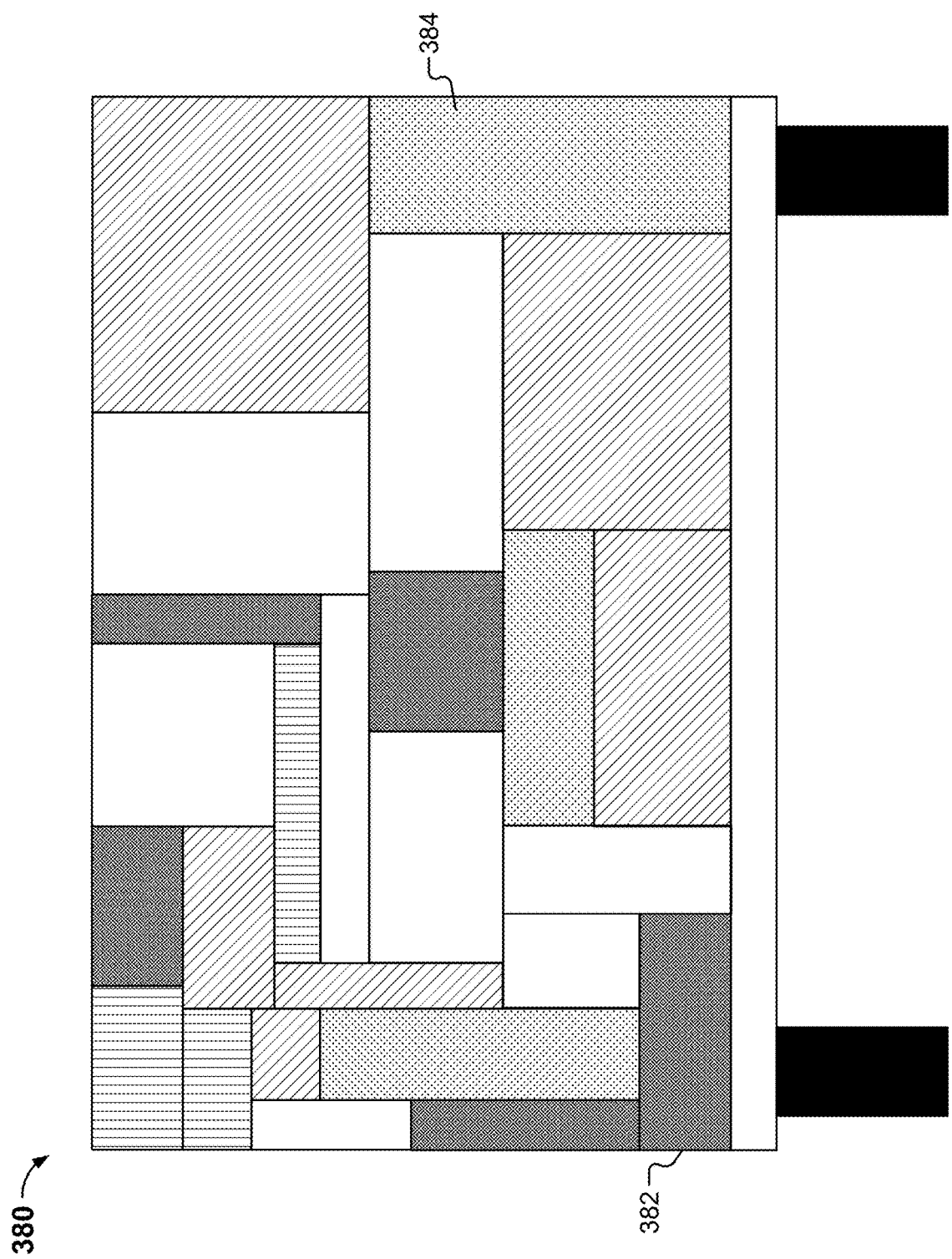
FIG. 3C is a diagram illustrating a weight distribution of a set of objects in a transport container according to various embodiments.

FIGS. 3A, 3B, and 3C are diagrams illustrating a weight distribution of a set of objects in a transport container according to various embodiments. In the examples shown, a weight of an object is denoted by the shading of the object. The weight of an object is illustrated based on the shading, such as a denser shading denoting a heavier or denser object. For example, an unshaded object denotes a light object (e.g., a weight less than a first weight threshold), objects having a vertical shading (e.g., the shading of object 322) is a relatively heavier object (e.g., a weight greater than a second weight threshold and less than a third weight threshold), objects having a diagonal hatch (e.g., the shading of object 326) is a relatively heavier object (e.g., a weight greater than the third weight threshold and less than a fourth weight threshold), objects having a dense dotted shading (e.g., the shading of object 311) is a relatively heavier object (e.g., a weight greater than the fourth weight threshold and less than a fifth weight threshold), and the objects having a darker/more dense cross hatch shading (e.g., the shading of object 310) is a relatively heavier object (e.g., a weight greater than the fifth weight threshold). In this example, the first weight threshold is less than the second weight threshold; the second weight threshold is less than the third weight threshold; the third weight threshold is less than the fourth weight threshold; and the fourth weight threshold is less than the fifth weight threshold.

In some embodiments, the system uses a model to assess the weight distribution of a loading. As an example, the system implements a weight distribution module that is configured to evaluate the weight distribution of a loading of a set of objects, to determine whether the weight distribution of the loading satisfies one or more weight distribution criterion, provide an indication of whether the loading satisfies the one or more weight distribution criterion (e.g., including an identification of object(s) that cause a violation), and/or provide a recommendation for resolving violations of the one or more weight distribution criterion. The weight distribution module may be queried to evaluate the loading, such as in connection with determining a scoring value according to a predefined scoring function, or as a verifier that confirms whether a solution that is otherwise feasible satisfies the one or more weight distribution criterion.

In the example shown in FIG. 3A, loading 300 of a set of objects 310-336 in a transport container defined at least in part by sides 304, 305, 306, and 307. The transport container is shown as being carried by trailer 301 comprising wheels 302, 303. As illustrated, the weight distribution of loading 300 is relatively centered around the area of the transport container supported by wheels 302, 303. In addition, the weight distribution of loading 300 indicates that heavier objects are closer to the bottom of the transport container, and lighter objects are closer to the top of the transport container. The system analyzes loading 300 to assess whether the weight distribution is indicative of one or more of (i) an unsafe loading, (ii) a loading that creates relatively high wear-and-tear (e.g., a likelihood that the lifetime of the trailer or truck is decreased by a lifetime threshold value is less than a predefined likelihood threshold), (iii) a likelihood that a threshold amount of objects (e.g., a number of objects, a volume of objects, etc.) will fall during transport, (iv) a likelihood that one or more objects may be crushed by heavier objects higher up in the transport container, etc.

In the example shown in FIG. 3B, loading 350 of a set of objects 351-376 is provided. As illustrated, the weight distribution of loading 350 is less centered around the area of the transport container supported by wheels 302, 303 than loading 300. For example, loading 350 comprises heavier objects in areas that are not over wheels 302, 303, or heavier objects higher are disposed towards the top of the transport container (e.g., objects 362, 365, 367). As another example, lighter objects (e.g., objects 352, 353, 364, 368, 370, etc.) are dispersed throughout the transport container, including at locations closer to the middle and bottom of the transport container. The weight distribution module determines that some heavier objects are disposed above lighter objects, which may cause certain fragile or deformable objects to be damaged. For example, the weight distribution module may identify the placement of object 365 as causing a violation of one or more weight distribution criterion, such as because object 365 is a heavier item and is disposed towards the top of the transport container, and object 365 is disposed over light object 366. For example, the weight distribution module may identify the placement of object 362 as causing a violation of one or more weight distribution criterion, such as because object 362 is relatively heavy and is disposed towards the top of the transport container, or not within a predefined range of the bottom of the transport container (e.g., within a bottom half or bottom third of the transport container. The weight distribution module may also determine that loading 350 violates one or more weight distribution criterion because the extent to which the weight is distributed around the areas supported by wheels 302, 303 is less than a weight distribution threshold (e.g., because the weight is distributed towards the center of the transport container between the front and rear wheels.

As illustrated in FIGS. 3A-3C, the system determines the weight distribution along the length of the transport container and/or the width of the transport container. In the example shown in FIG. 3C, the system determines the weight distribution of the loading of objects is determined across the width of the vehicle. For example, the system seeks to balance the weight being distributed on each side and/or to center the weight distribution in the width direction over the tires of the vehicle. As illustrated, the weight distribution of loading 380 is relatively centered such that the weight distribution along the width corresponds to the placement of the wheels. For example, heavier objects 382 and 384 are respectively provided over the left and right wheels.

Figure 4A:
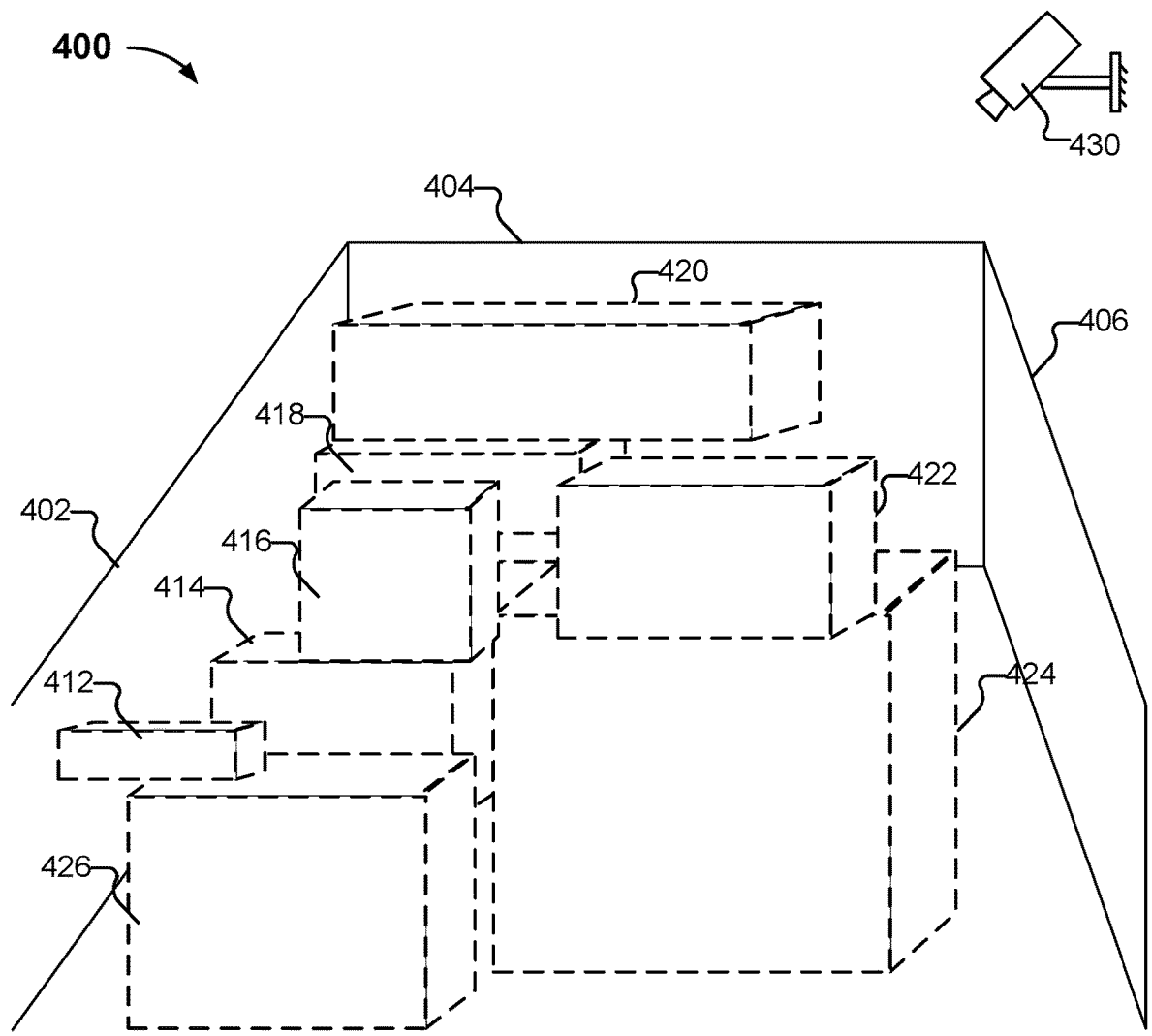
FIG. 4A is a diagram illustrating an arrangement of a set of objects in a transport container according to various embodiments.
Figure 4B:
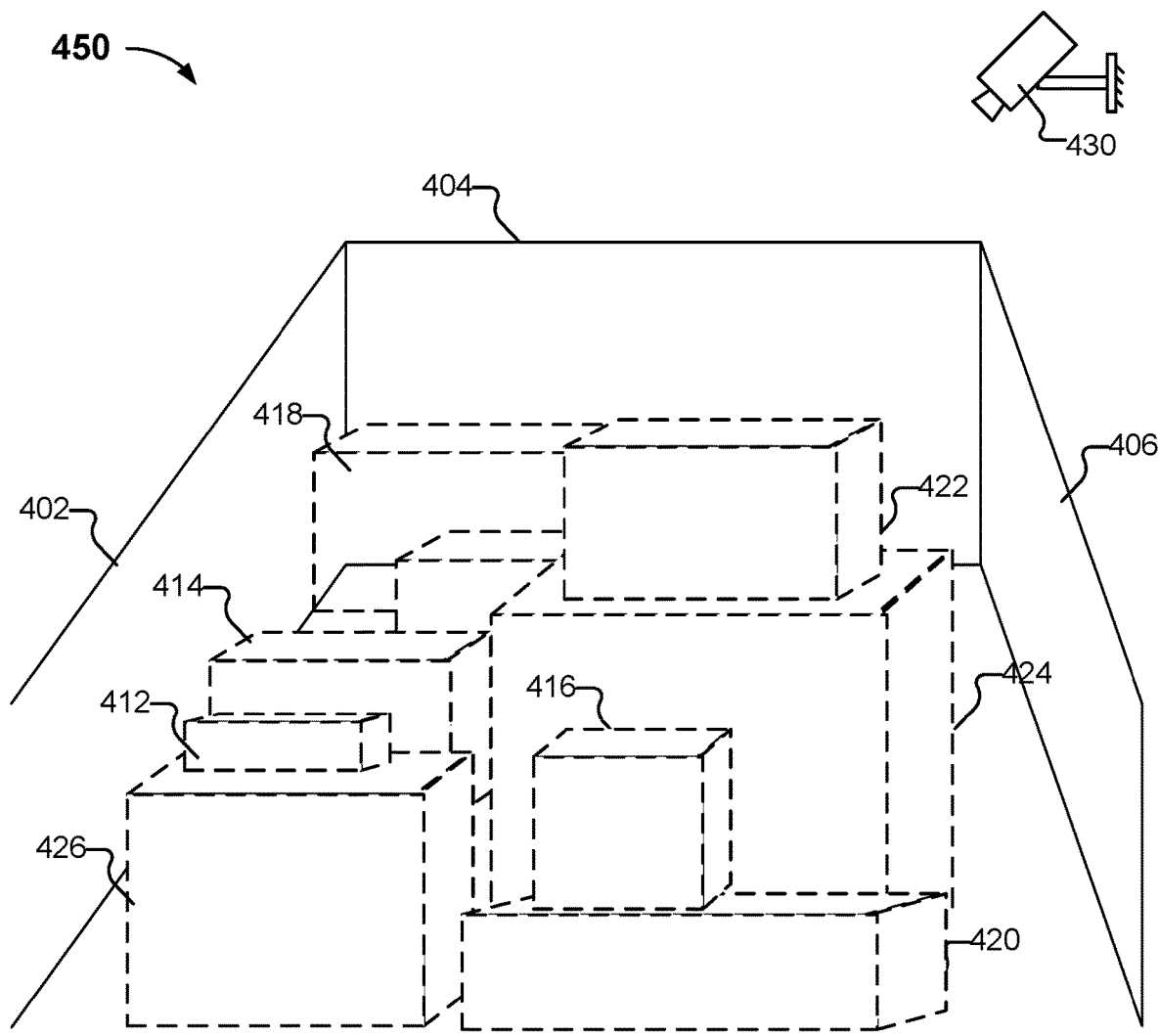
FIG. 4B is a diagram illustrating an arrangement of a set of objects in a transport container according to various embodiments.

FIGS. 4A and 4B are diagrams illustrating an arrangement of a set of objects in a transport container according to various embodiments. In the examples shown, loadings 400, 450 of objects 412-426 are illustrated within a transport container at least partly defined by walls 402, 404, 406. In some embodiments, loadings 400, 450 are simulated loadings, such as loadings generated during the evaluation of partitioning, sequencing, weight distribution, or assessment of whether a loading is feasible. In some embodiments, loadings 400, 450 correspond to loadings of objects placed in the transport container and detected by vision system 430. For example, the system may segment the information captured by vision system 430.

In connection with determining a plan to load the set of objects to the transport container, the system evaluates the loading. For example, the system evaluates loadings to determine a partitioning (if any) of the set of objects. As another example, the system evaluates loadings to determine a sequencing or re-sequencing of the set of objects. The system evaluates a loading to determine whether the loading is a feasible loading, such as by determining whether the loading violates the one or more weight distribution criterion.

In some embodiments, the system evaluates a loading based at least in part on scoring the loading based on a predefined scoring function. For example, the system determines a scoring value associated with the loading, and the system determines whether the loading is a feasible loading based at least in part on the scoring value (e.g., the scoring value exceeding a predefined minimum scoring threshold).

In the examples shown, loading 400 may be deemed less favorable than loading 450. For example, the system may determine that object 412 is not stably disposed on object 426 because at least part (e.g., a threshold amount) of object 412 is not supported by object 426. The system may determine that the likelihood that object 412 falls during transport exceeds a predefined threshold, or system may otherwise determine that the placement of object 412 causes an instability (e.g., a likelihood that the loading is unstable is greater than a predefined instability threshold). As another example, the system may determine that object 420 is not stably positioned because object 420 is relatively long and is not fully supported by object 418.

In contrast to loading 400, loading 450 is relatively stable. For example, loading 450 includes object 420 disposed at the bottom of the transport container rather than partly disposed on object 418. Similarly, loading 450 includes object 412 disposed on object 426 such that object 412 is fully disposed on (e.g., fully supported by) object 426.

In some embodiments, the system determines a manner to bound or trim the solution space of possible solutions (e.g., solutions for partitioning, sequencing, arranging, etc.). As an example, the system generates a tree structure/graph with each node corresponding to a decision with respect to an object (e.g., a placement of the object, association with a particular partition, an order in the sequence in which the object is to be provided, etc.). The system may then determine a manner to trip the tree structure to eliminate non-feasible solutions or solutions that do not satisfy one or more predetermined criteria. As another example, the system bounds the solution space based at least in part on one or more constraints. An example of a constraint is a runtime within which the system is to determine a solution. In the case of an inline determination of a solution, the runtime may be 5 seconds or less. In the case of an offline determination of a solution, the runtime may be 12 hours or less, etc.

The system may use a heuristic to guess a solution (e.g., a partition, a sequence, an arrangement, etc.) and then evaluate the guess and trim/bound the search space accordingly.

Figure 5A:
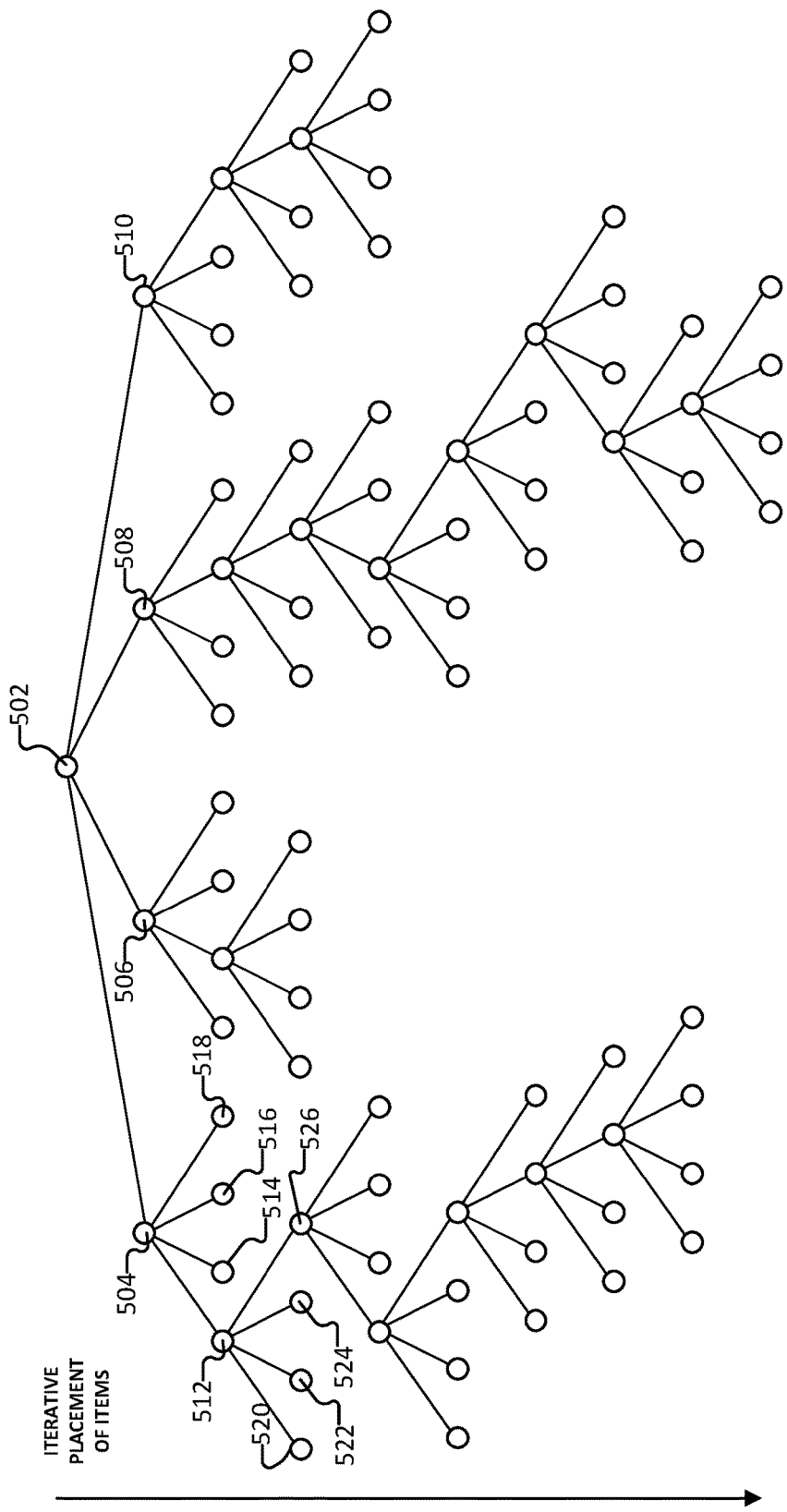
FIG. 5A is a tree corresponding to different states or placements of objects according to various embodiments.

FIG. 5A is a tree corresponding to different states or placements of objects according to various embodiments. In some embodiments, system 100 of FIG. 1 determines or uses search space 500 in connection with determining a placement(s) of one or more objects, such as a current (e.g., a next object from among a set of objects to be placed). In some embodiments, the system determines the placements offline, such as by a server that simulates partitioning, sequencing, and/or arrangements of objects into one or more transport containers.

Figure 5B:
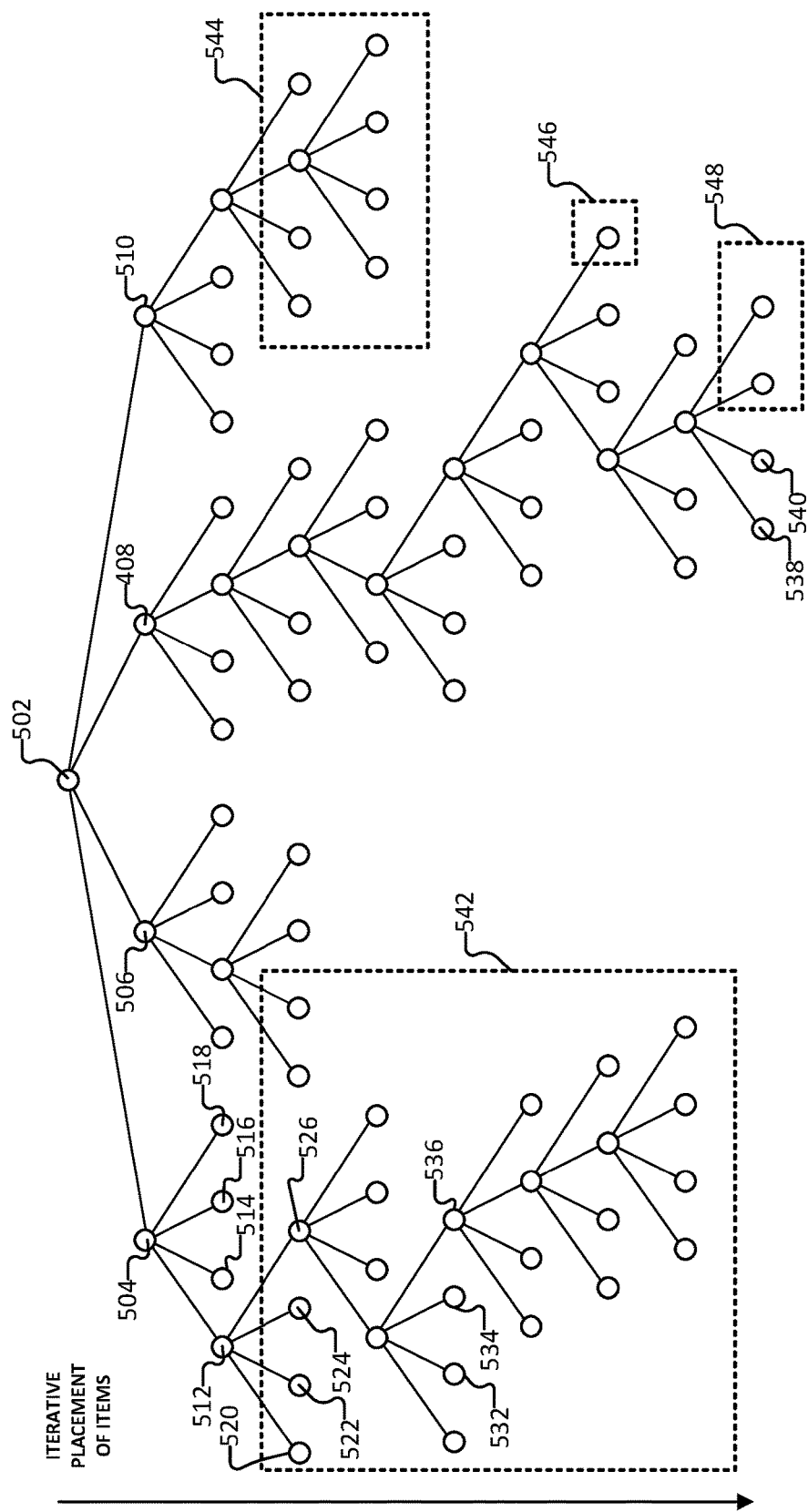
FIG. 5B is a tree corresponding to different states or placements of objects according to various embodiments.

Although FIGS. 5A and 5B provide states for placements, according to various embodiments, the system may implement similar iterative simulations and/or evaluations in other contexts, such as evaluating partitions in connection with determining a partitioning of a set of objects, evaluating a sequence of objects in connection with determining a sequencing/re-sequencing of a set of objects, etc.

In the example illustrated in FIG. 5A, search space 500 is represented in a tree structure. Search space 500 comprises a plurality of nodes, and each node may correspond to a scenario of placement of an object and each branch may correspond to a place of a current object at a particular object and in a particular orientation.

Search space 500 comprises root node 502. Root node 502 corresponds to a current state of the pallet/stack of objects. For example, the system queries a state estimation service/module to obtain an estimated state and uses such estimated state as the state at root node 502.

In response to determining the root node, the system iteratively determines placements for a set of next objects. For example, the system progresses through the different orders of the tree based on placement of different next objects. Nodes 504, 506, 508, and 510 correspond to placement of a first next object (e.g., the object for which the system is determining a best placement). As an example, nodes 504, 506, 508, and 510 are first-order nodes respectively corresponding to different placements of a first next object (e.g., different locations and/or different orientations, or different objects in the case that the system is permitted to buffer some objects). As illustrated in FIGS. 5A and 5B, each of nodes 504, 506, 508, and 510 have second-order nodes respectively branching therefrom. For example, nodes 512, 514, 516, and 518 branch from node 504. Each of the second-order nodes respectively correspond to different placements of a second next object (e.g., different locations and/or different orientations, or different objects in the case that the system is permitted to buffer some objects). As the system determines placements corresponding to each node, the system determines nodes that branch from the nodes for placements of the remaining objects to be simulated. For example, in response to determining the placement for node 512, the system determines the nodes 520, 522, 524, and 526 (e.g., the system determines estimated states and associated information for the nodes).

If the system were to analyze the stability at each node in search space 500, such an analysis may be computationally expensive. Accordingly, as illustrated in FIG. 5B, various embodiments prune the search space to limit the number of nodes for which the state/stability is to be determined in connection with determining placement of an object (e.g., the first next object).

FIG. 5B is a tree corresponding to different states or placements of objects according to various embodiments. In some embodiments, system 100 of FIG. 1 determines or uses search space 530 in connection with determining a placement(s) of one or more objects, such as a current (e.g., a next object from among a set of objects to be placed). In some embodiments, the system determines the placements offline, such as by a server that simulates partitioning, sequencing, and/or arrangements of objects into one or more transport containers.

The system determines search space 530 based on determining whether to prune and/or a manner by which to prune search space 500. Segmented areas 542, 544, 546, and 548 correspond to areas of the tree that the system has determined to be unfavorable scenarios and thus pruned from search space 500 (e.g., the tree).

In some embodiments, the system determines whether a node corresponds to a favorable or unfavorable scenario based on one or more of (i) a simulation of the state of the stack of objects for the placements associated with the node, and (ii) one or more heuristics. In some embodiments, the system simulates the state of the stack of objects for the first-order nodes (e.g., 504, 506, 508, and 510) in connection with determining an estimated state and an expected stability of the stack of objects. In some embodiments, for all nodes (e.g., 512, 514, 516, 518, 520, 522, 524, 526, etc.) having an order higher than the first order nodes, the system uses one or more heuristics to determine whether the corresponding placement is expected to be an unfavorable scenario (e.g., expected to result in a stable or unstable stack, expected to have a significant cost such as a cost higher than a cost threshold, expected to cause the robot to be positioned in an awkward pose, etc.).

According to various embodiments, in response to determining a state, an expected stability, and/or a result of an analysis of the favorability of the placement based on one or more heuristics, the system determines whether to prune the corresponding node(s). If the system determines to prune a node, the system prunes the node and all potential nodes that branch from the node. For example, in response to determining that node 526 is to be pruned (e.g., that the node corresponds to an unfavorable scenario), the system correspondingly determines to prune nodes 532, 534, 536, etc. based on such nodes branching directly or indirectly from node 526. In some embodiments, the system determines to prune nodes 532, 534, 536, etc. without further analysis using one or more heuristics. For example, the system determines to prune nodes 532, 534, 536, etc. based on the determination to prune node 526.

In some embodiments, after determining search space 530 (e.g., after pruning the search space 500), the system determines a best placement for the next object (e.g., the object for the first-order nodes). The system can determine the best placement based on one or more of an expected stability, a cost for the placement, the cost of placing the next object and M objects after placement of the next object, an expected stability of the stack of objects after placement of the next object and the M objects after placement of the next object, a favorability of the placements, etc.

In some embodiments, the system determines that the best placement of the next object corresponds to the placement at node 508. For example, the system determines that the placement at node 508 is best based on a determination that the state of the stack of objects remains favorable (e.g., cost effective, stable, etc.) through several orders of placements (e.g., the state remains favorable for a placement of the highest number of subsequent objects, etc.). In some embodiments, the system determines that nodes 538 and 540 remain favorable through placement of nine different objects (e.g., the next object and the M objects after the next object, where M is eight in this example). In some embodiments, the system performs a beam search with respect to search space 530 to determine a best placement.

In connection with determining whether to prune a node, the system can implement a pruning criteria. The pruning criteria can include one or more of (i) the state is expected to have a stability less than a stability threshold, (ii) the state violates a heuristic (e.g., a deformable object being placed at or near the bottom of a stack of objects, etc.), (iii) a cost for the corresponding placements is expected to exceed a cost threshold, (iv) a robot is expected to be positioned in an awkward pose, (v) an expected density of the stack of objects being less than a predefined density threshold, etc.

Figure 6:
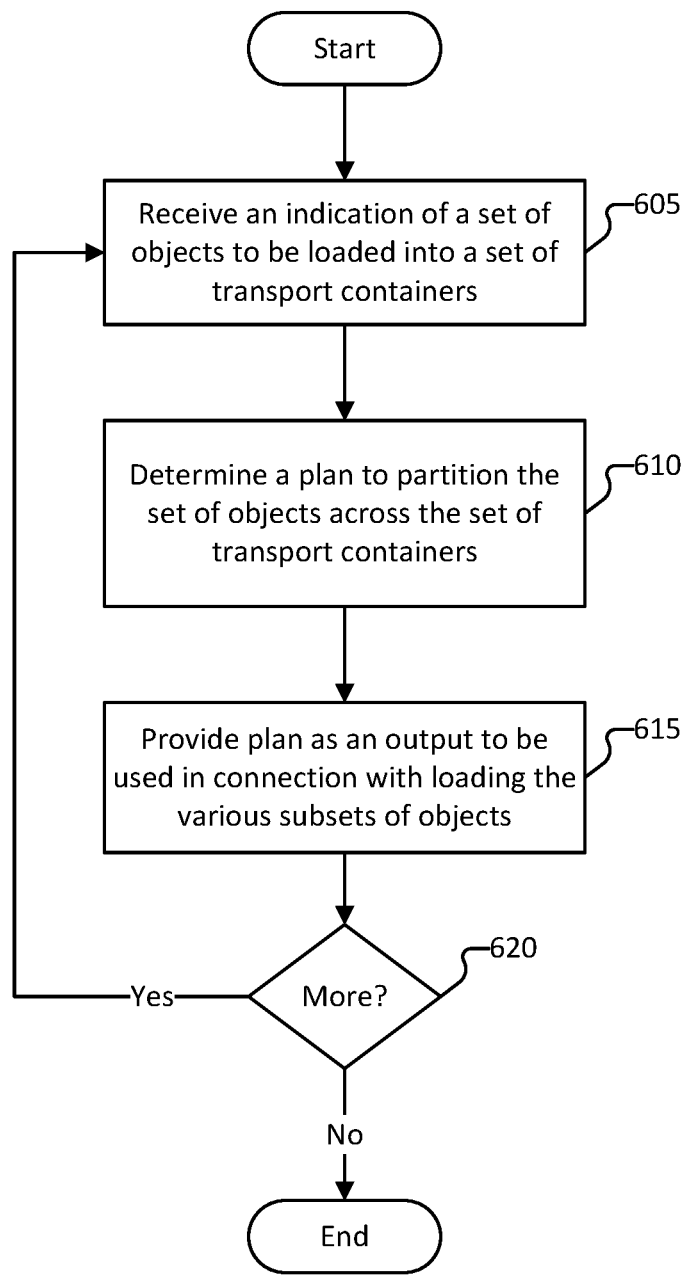
FIG. 6 is a flow chart illustrating a process to partition a set of objects to be loaded into a set of transport containers according to various embodiments.

FIG. 6 is a flow chart illustrating a process to partition a set of objects to be loaded into a set of transport containers according to various embodiments. In some embodiments, process 600 is implemented by system 100 of FIG. 1, or one or more servers such as in connection with providing a cloud service. In some embodiments, process 600 is implemented by the partitioning module. For example, the system (e.g., the model for planning the loading of objects) calls the partitioning module to invoke process 600.

At 605, an indication of a set of objects to be loaded into a set of transport containers is received. In some embodiments, the indication of the set of objects may be determined based at least in part on information obtained from one or more sensors in a workspace, such as a vision system that detects objects delivered, or being delivered, to a robotic arm configured to load the objects to the transport container. In some embodiments, the system obtains the indication of the set of objects from a data structure, such as a set of objects mapped to a manifest or order, or other list of items to be loaded to a transport container or shipped to a particular destination location.

At 610, a plan to partition the set of objects across the set of transport containers is determined. In response to receiving the indication that a set of objects to be loaded into a set of transport containers, the system determines whether the set of objects are to be partitioned across a plurality of transport containers, and in response to determining to partition the set of objects across the plurality of transport containers, the system determines the partitioning of the set of objects (e.g., the subsets of objects mapped to each partition or transport container).

The system seeks to optimize the loading of the set of objects across one or more partitions. For example, the system simulates a plurality of different scenarios (e.g., different partitionings) and scores the partitionings according to a predefined scoring function. The system may select the best partitioning (e.g., most efficient, most stable, highest density, highest scoring value) for which the partitioning module has a feasible solution after a maximum computation runtime has expired.

In some embodiments, the scoring of the various partitioning includes determining a scoring value for each partition in a partitioning and determining an aggregate partitioning scoring value for each partitioning simulated. As an example, the aggregate partitioning scoring value for a particular partitioning may be a cumulative scoring value for all partitions within the partitioning. As another example, the aggregate partitioning scoring value for a particular partitioning may be a weighted average of the scoring values for the various partitions within the partitioning, and the weights for the weighted average may be predefined, such as based on a priority of items. In some embodiments, if any one partition within a partitioning is an infeasible partition (e.g., the partition leads to a weight distribution that violates a weight distribution criterion or is otherwise an unsafe load, the partition has a loading time in excess of a predefined threshold, etc.), the partitioning is deemed infeasible. For each partitioning, the system may invoke a simulation module that simulates various arrangements or loadings for one or more partitions in the partitioning, such as in connection with determining whether a feasible partition can be obtained for the partitions within the partitioning.

The system determines the plan to partition the set of objects based at least in part on the selected partitioning (e.g., an optimal partitioning, a best partitioning after a maximum computation runtime has expired, a feasible partition that is quickly determined using one or more heuristics in response to the system not determining a feasible solution during the maximum computation runtime, etc.).

At 615, a plan to be used in connection with loading various subsets of objects is provided as an output. In some embodiments, the plan to partition the set of objects is provided to the system or module (e.g., the model for determining loadings) that invoked process 600. In some embodiments, the plan to partitioning the set of objects is provided to a robotic system that segments/sorts the set of objects (e.g., to create the partitions) or a robotic system that is configured to load the various partitions to various transport containers.

At 620, a determination is made as to whether process 600 is complete. In some embodiments, process 600 is determined to be complete in response to a determination that no further sets of objects are to be loaded into the set of transport containers, the system determines that the set objects have been loaded into the set of transport containers, the system receives confirmation that a robotic system configured to load objects to a transport container receives the plan, an administrator indicates that process 600 is to be paused or stopped, etc. In response to a determination that process 600 is complete, process 600 ends. In response to a determination that process 600 is not complete, process 600 returns to 605.

Figure 7:
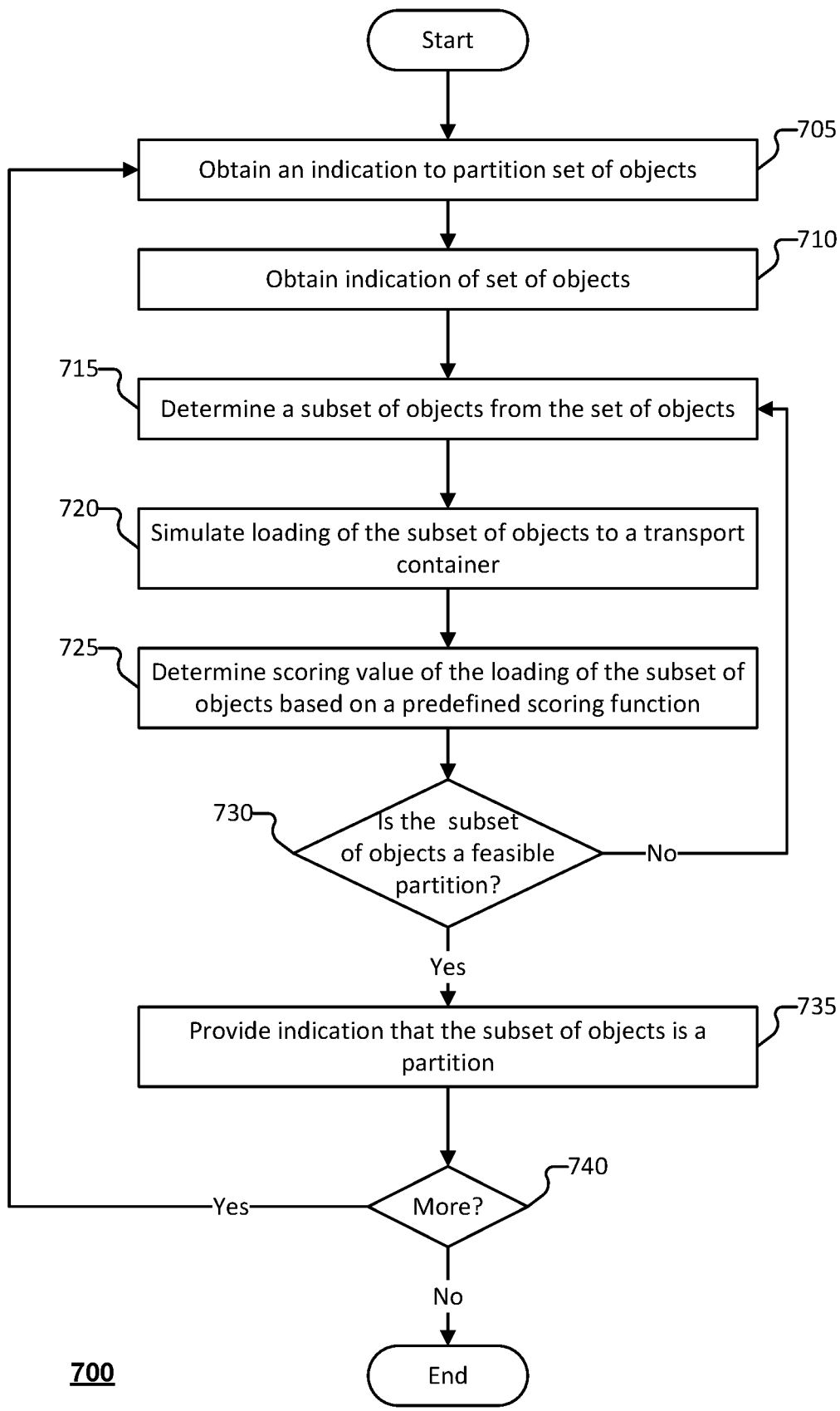
FIG. 7 is a flow chart illustrating a process to partition a set of objects to be loaded into a set of transport containers according to various embodiments.

FIG. 7 is a flow chart illustrating a process to partition a set of objects to be loaded into a set of transport containers according to various embodiments. In some embodiments, process 700 is implemented by system 100 of FIG. 1, or one or more servers such as in connection with providing a cloud service. In some embodiments, process 700 is implemented by the partitioning module. For example, the system (e.g., the model for planning the loading of objects) calls the partitioning module to invoke process 700. Process 700 may be invoked by process 600 of FIG. 6, such as at 610 of process 600.

In some embodiments, process 700 is invoked for each partition within a partitioning being evaluated, such as to determine feasible partitionings.

At 705, an indication to partition the set of objects is obtained. In some embodiments, the system receives an indication that a set of objects are to be delivered to a destination location(s) and that a feasible solution for partitioning a set of objects is to be provided.

At 710, an indication of the set of objects is obtained. In some embodiments, in connection with obtaining the indication to partition the set of objects, the system obtains the set of objects that are to be loaded and shipped to a destination location(s). As an example, the system obtains a manifest of objects. The obtaining the indication of the set of objects may include obtaining one or more attributes respectively associated with the objects.

At 715, a subset of objects is determined from the set of objects. The subset of objects may be determined based on a simulation, a heuristic(s), a predefined sorting/allocation process, etc.

In some embodiments, the system determines a subset of objects based on one or more heuristics for partitioning loadings. As an example, the one or more heuristics are obtained using machine learning processes. The machine learning process determines a set of heuristics that are expected to be indicative of feasible partitionings (e.g., partitionings for which the set of partitions are feasible partitions).

In some embodiments, the system determines the subset of objects based at least in part on a predefined sorting/allocation process. For example, the system may determine a number of transport containers available for carrying the set of objects, and sequentially allocate objects to a particular transport container. For example, if four transport containers are available, a first object (e.g., a first object queued at a system that delivers objects to workspaces, or a first object unloaded from an incoming transport container, etc.) is assigned to the first transport container; the second object is assigned to the second transport container; the third object is assigned to the third transport container; the fourth object is assigned to the fourth transport container; the fifth object is assigned to the first transport container; and the sixth object is assigned to the second transport container; and so on and so forth. As another example, the system may sequentially assign large/heavy objects (e.g., objects having a weight exceeding a predefined weight threshold, or a size/dimension exceeding a size threshold) across the available transport containers, such as to ensure relatively equal distribution of heavy items across the available transport containers. The system may then assign non-heavy or non-large objects (e.g., sequentially) across the available transport containers. Various other predefined sorting/allocation processes may be implemented.

At 720, a loading of the subset of objects to a transport container is simulated. In some embodiments, the system calls a simulation module to simulate various loadings (e.g., arrangements, sequences, etc.) of the subset of objects for a particular partition. For example, the system simulates the loadings of the subset of objects for a particular partition in order to determine whether a feasible partition may be assembled using the subset of objects or to select a best loading for the partition.

At 725, a scoring value of the loading of the subset of objects is determined based at least in part on a predefined scoring function. The system evaluates the simulated loading based at least in part on a predefined scoring function. As an example, the predefined scoring function may account for density, weight distribution, likelihood that an object will fall, likelihood that an object will be damaged during transport, etc. In some embodiments, the predefined scoring function comprises one or more criterion for which feasible partitions/loadings are to satisfy otherwise the partition/loading are deemed infeasible. Examples of the one or more criterion include: a minimum density threshold, a maximum likelihood that an object is expected to be damaged during transit, a minimum stability, a maximum likelihood that an object is expected to fall during transit, a maximum likelihood that an object is expected to be deformed during transit, a maximum weight distribution in a top section of the transport container (e.g., a top half or a top third of the transport container, etc.), a minimum weight distribution in a bottom section of the transport container (e.g., a bottom half or bottom third of the transport container, etc.). Various other criteria may be implemented.

At 730, the system determines whether the subset of objects is a feasible partition. In some embodiments, the system determines whether the subset of objects is a feasible partition based at least in part on a determination of whether the scoring value for the loading (e.g., the possible partition) exceeds a predefined scoring threshold.

In some embodiments, the system evaluates a loading against a set of heuristics before doing full simulation/evaluation. For example, the system determines whether a potential loading violates one or more heuristics before performing a computationally expensive simulation of the loading and evaluation using models of the simulated loading. The heuristics may include, or be indicative of, parameters pertaining to density, weight distribution, stability, etc.

In response to determining that the subset of objects is not a feasible partition at 730, process 700 proceeds to 715, and process 700 may iterate over 715-730 until a predefined amount of time has expired or at least one possible partition is deemed to be feasible. In contrast, in response to determining that the subset of objects is a feasible partition at 730, process 700 proceeds to 735 at which an indication that the subset of objects is a partition is provided.

At 740, a determination is made as to whether process 700 is complete. In some embodiments, process 700 is determined to be complete in response to a determination that no further sets of objects are to be loaded into the set of transport containers, the system determines that the set objects have been loaded into the set of transport containers, the system receives confirmation that a robotic system configured to load objects to a transport container receives the plan, the system determines that no further portioning of the set of objects is to be performed (e.g., a feasible partition has been determined, or a time over which the possible partitions has reached a predefined time threshold), an administrator indicates that process 700 is to be paused or stopped, etc. In response to a determination that process 700 is complete, process 700 ends. In response to a determination that process 700 is not complete, process 700 returns to 705.

In some embodiments, process 700 iterates over 705-745 until no further objects from among the set of objects are to be allocated to a partition, or until no further potential partitions are to be evaluated. For example, process 700 may end after a first partition is deemed to be a feasible partition, or after the evaluation of partitions has been performed for a predefined time threshold. A best partition among the evaluated feasible partitions may be selected as the partition to implement.

Figure 8:
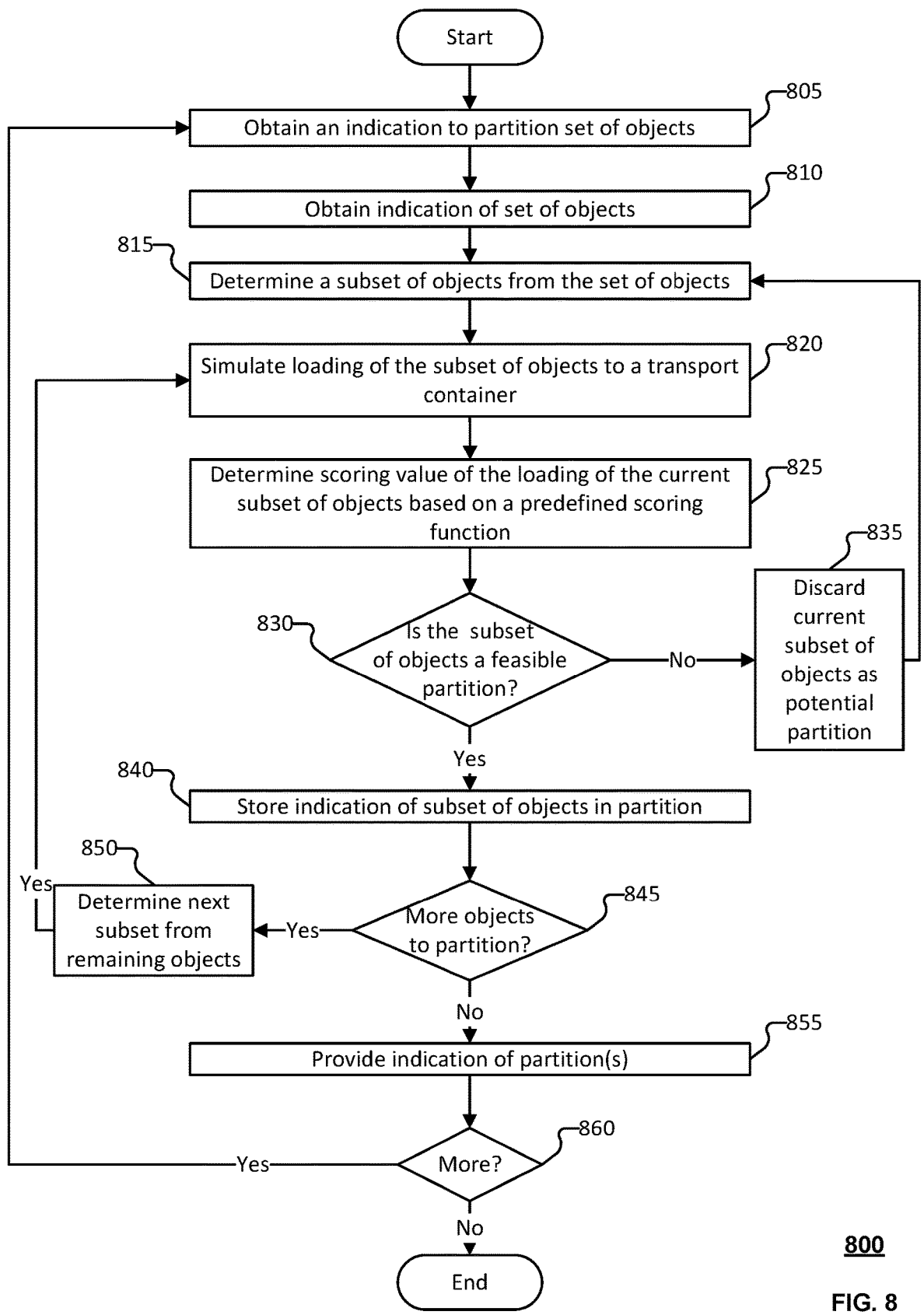
FIG. 8 is a flow chart illustrating a process to partition a set of objects to be loaded into a set of transport containers according to various embodiments.

FIG. 8 is a flow chart illustrating a process to partition a set of objects to be loaded into a set of transport containers according to various embodiments. In some embodiments, process 800 is implemented by system 100 of FIG. 1, or one or more servers such as in connection with providing a cloud service. In some embodiments, process 800 is implemented by the partitioning module. For example, the system (e.g., the model for planning the loading of objects) calls the partitioning module to invoke process 800. Process 800 may be invoked by process 600 of FIG. 6, such as at 610 of process 600.

In some embodiments, process 800 is invoked for each partition within a partitioning being evaluated, such as to determine feasible partitionings.

At 805, an indication to partition the set of objects is obtained. At 810, an indication to partition the set of objects is obtained. At 815, a subset of objects is determined from the set of objects. At 820, a loading of the subset of objects to a transport container is simulated. At 825, a scoring value of the loading of the subset of objects is determined based at least in part on a predefined scoring function. At 830, the system determines whether the subset of objects is a feasible partition. In some embodiments, the system determines whether the subset of objects is a feasible partition based at least in part on a determination of whether the scoring value for the loading (e.g., the possible partition) exceeds a predefined scoring threshold.

In some embodiments, 805-830 respectively correspond to, or are similar to, 705-730.

In response to determining that the subset of objects is not a feasible partition at 830, process 800 proceeds to 835 at which the current subset of objects is discarded as a potential partition. Thereafter, process 800 returns to 815 and process 800 iterates over 815-830 until a predefined amount of time has expired or at least one possible partition is deemed to be feasible. In contrast, in response to determining that the subset of objects is a feasible partition at 830, process 800 proceeds to 840 at which an indication of the subset of objects in the partition is stored. For example, the system stores a set of feasible partitions from which a partition is selected to be implemented in connection with loading objects to the transport container(s).

At 845, the system determines whether more objects in the set of objects are to be partitioned. For example, after determining a partition for a first subset of objects, the system determines whether to determine a partition for a second subset of objects, or whether the remaining objects in the subset of objects correspond to a single remaining partition (e.g., whether the remaining objects are to be loaded into a single additional transport container).

In response to determining that more objects are to be partitioned at 845, process 800 proceeds to 850 at which a next subset is determined from the remaining objects. Process 800 then returns to 820 and process 800 iterates over 820-845 until no further objects are to be allocated to a partition. Conversely, in response to determining that no more objects are to be partitioned at 845 (e.g., that no further objects are to be allocated to a partition), process 800 proceeds to 855.

At 855, an indication of the one or more partitions is provided. In some embodiment, the system provides the indication of the partition(s) to the system or process that invoked process 800.

At 860, a determination is made as to whether process 800 is complete. In some embodiments, process 800 is determined to be complete in response to a determination that no further sets of objects are to be loaded into the set of transport containers, the system determines that the set objects have been loaded into the set of transport containers, the system receives confirmation that a robotic system configured to load objects to a transport container receives the plan, the system determines that no further portioning of the set of objects is to be performed (e.g., a feasible partition has been determined, or a time over which the possible partitions has reached a predefined time threshold), an administrator indicates that process 800 is to be paused or stopped, etc. In response to a determination that process 800 is complete, process 800 ends. In response to a determination that process 800 is not complete, process 800 returns to 805.

Figure 9:
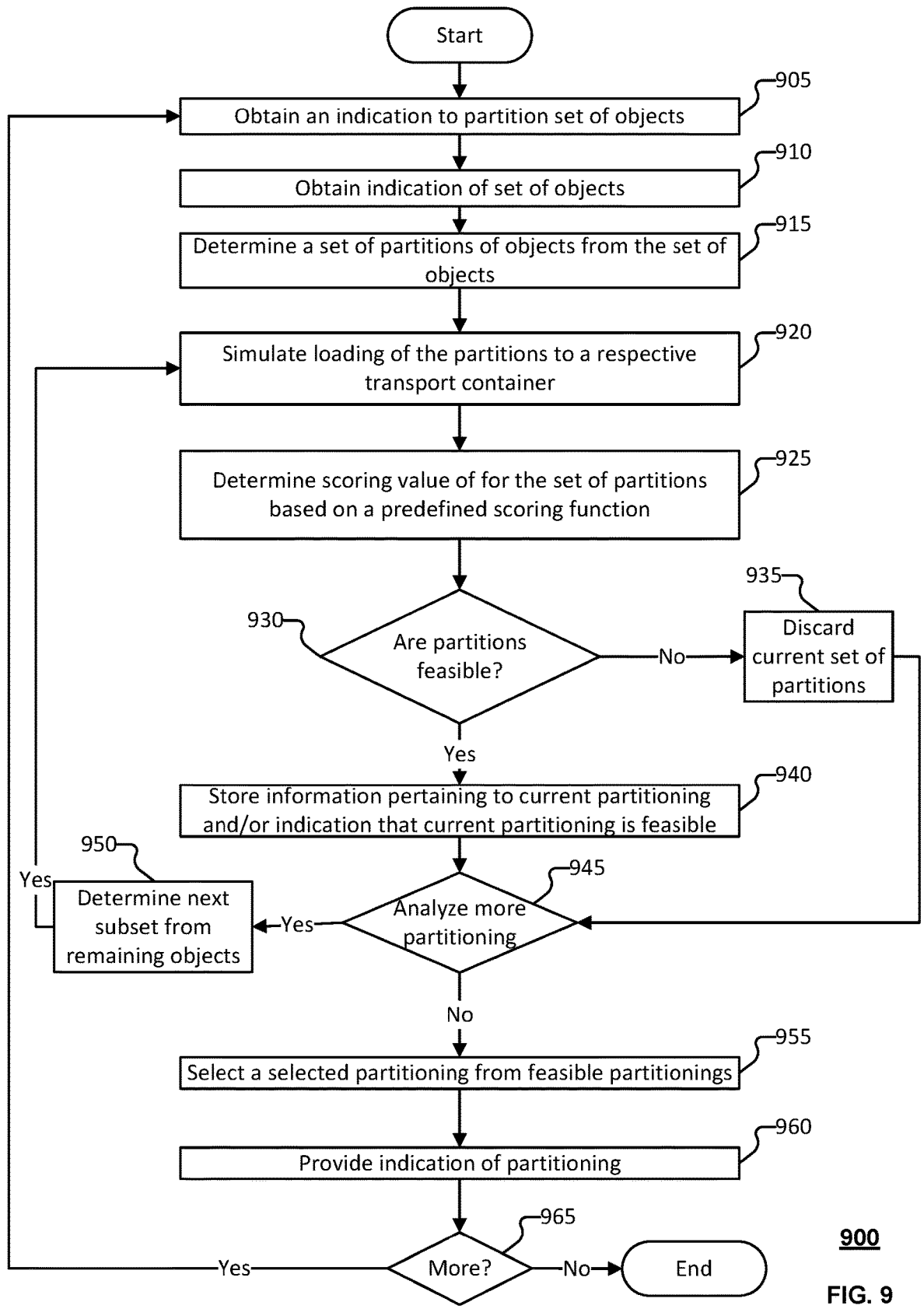
FIG. 9 is a flow chart illustrating a process to partition a set of objects to be loaded into a set of transport containers according to various embodiments.

FIG. 9 is a flow chart illustrating a process to partition a set of objects to be loaded into a set of transport containers according to various embodiments. In some embodiments, process 900 is implemented by system 100 of FIG. 1, or one or more servers such as in connection with providing a cloud service. In some embodiments, process 900 is implemented by the partitioning module. For example, the system (e.g., the model for planning the loading of objects) calls the partitioning module to invoke process 900. Process 900 may be invoked by process 600 of FIG. 6, such as at 610 of process 600.

In some embodiments, process 900 is invoked for each partition within a partitioning being evaluated, such as to determine feasible partitionings.

At 905, an indication to partition the set of objects is obtained. At 910, an indication to partition the set of objects is obtained. At 915, a set of partitions of objects from the set of objects is determined. At 920, a loading of the partitions (s) to a transport container(s) is simulated. At 925, a scoring value(s) respectively corresponding to the loading of the sets of partitions is determined based at least in part on a predefined scoring function. At 930, the system determines whether the partition(s) are feasible partition(s). In some embodiments, the system determines whether a partition is a feasible partition based at least in part on a determination of whether the scoring value for the loading (e.g., the possible partition) exceeds a predefined scoring threshold.

In some embodiments, 905-930 respectively correspond to, or are similar to, 705-730.

In response to determining that the partition(s) are not feasible at 930, process 900 proceeds to 935 at which a current set of partitions is discarded.

Figure 10:
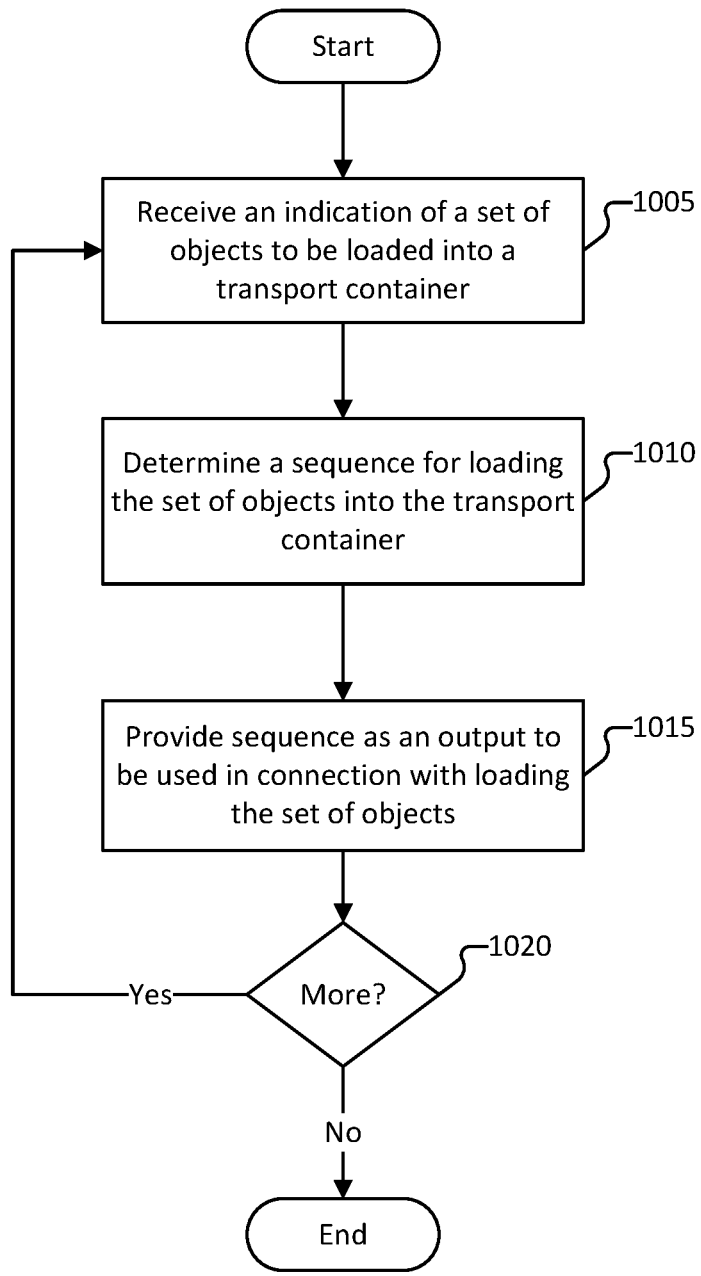
FIG. 10 is a flow chart illustrating a process to determine a sequence of a set of objects to be loaded into a transport container according to various embodiments.

FIG. 10 is a flow chart illustrating a process to determine a sequence of a set of objects to be loaded into a transport container according to various embodiments. In some embodiments, process 1000 is implemented by system 100 of FIG. 1, or one or more servers such as in connection with providing a cloud service. In some embodiments, process 1000 is implemented by the partitioning module. For example, the system (e.g., the model for planning the loading of objects) calls the partitioning module to invoke process 1000.

At 1005, an indication of a set of objects to be loaded into a transport container is received. For example, in response to determining a partition, or in connection with evaluating a partition, the system obtains the indication of the set of objects in the partition (e.g., for which process 1000 determines/recommends a sequencing). In some embodiments, the system receives the indication of the set of objects to be loaded into a transport container in connection with 615 of process 600 (e.g., the plan output by process 600 may include information pertaining to objects within various partitions).

At 1010, a sequence for loading the set of objects in the transport containers is determined. In some embodiments, the sequence includes an indication of an order in which items are to be delivered to a workspace of the robot that is configured to load the set of objects into the transport container. In some embodiments, the sequence includes an indication of an order in which a robot is to load the objects into the transport container.

At 1015, the sequence to be used in connection with loading the set of objects is provided as an output. In some embodiment, providing the sequence of the set of objects includes providing a plan for sequencing or re-sequencing the objects, such as a plan for using a buffer zone to stage one or more items to re-sequence the objects.

In some embodiments, the sequence is provided to the system or module (e.g., the model for determining loadings) that invoked process 600. In some embodiments, sequence is provided to a robotic system that segments/sorts the set of objects (e.g., to create the partitions) and provides the objects to a workspace, or a robotic system that is configured to load the various objects to a transportation container(s).

At 1020, a determination is made as to whether process 1000 is complete. In some embodiments, process 1000 is determined to be complete in response to a determination that no further objects are to be loaded into the transport container, the system receives confirmation that a robotic system configured to load objects to a transport container receives the sequence, an administrator indicates that process 1000 is to be paused or stopped, etc. In response to a determination that process 1000 is complete, process 1000 ends. In response to a determination that process 1000 is not complete, process 1000 returns to 1005.

Figure 11:
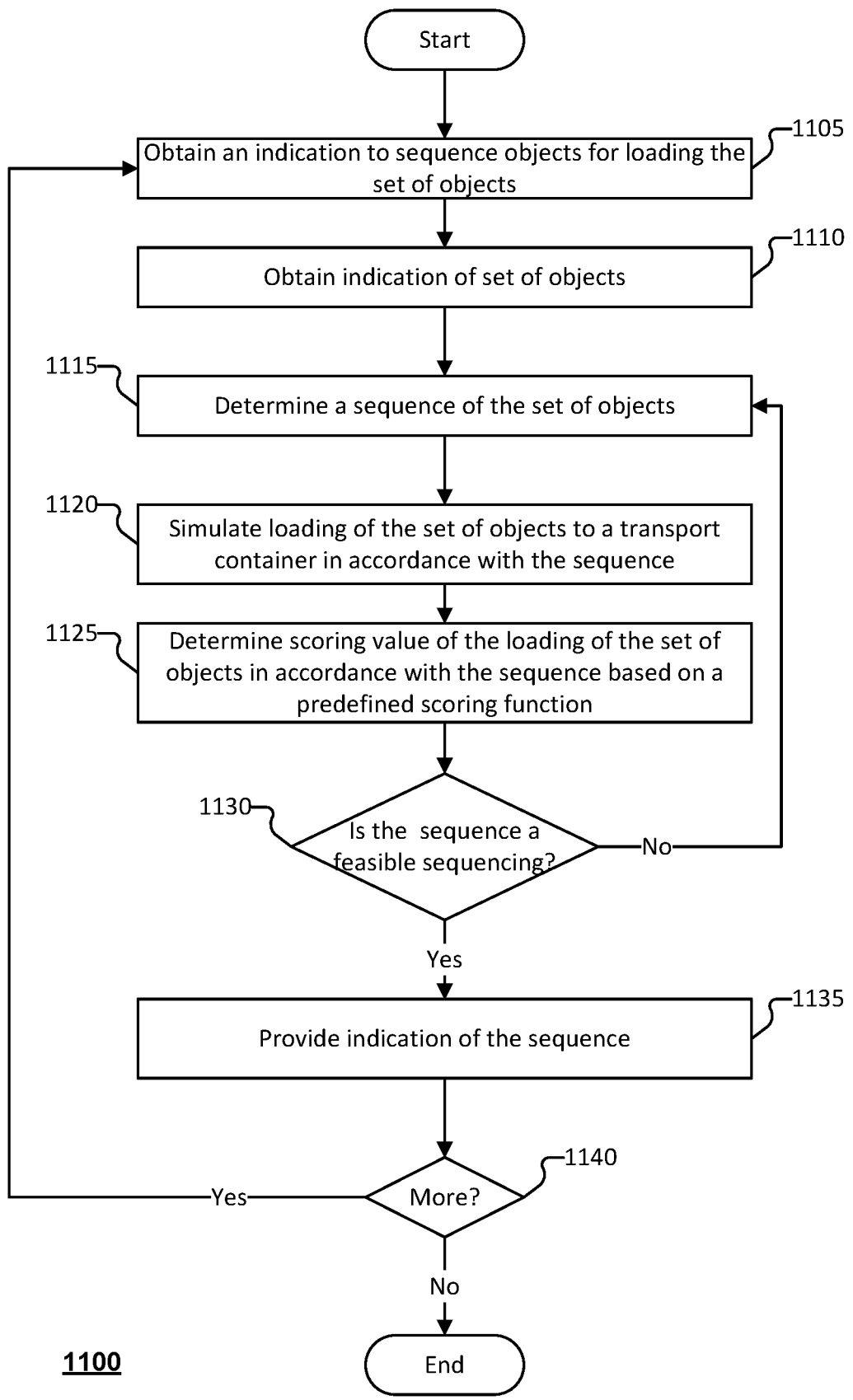
FIG. 11 is a flow chart illustrating a process to determine a sequence of a set of objects to be loaded into a transport container according to various embodiments.

FIG. 11 is a flow chart illustrating a process to determine a sequence of a set of objects to be loaded into a transport container according to various embodiments. In some embodiments, process 1100 is implemented by system 100 of FIG. 1, or one or more servers such as in connection with providing a cloud service. In some embodiments, process 1100 is implemented by the sequencing module. For example, the system (e.g., the model for planning the loading of objects) calls the sequencing module to invoke process 1100. Process 1100 may be invoked by process 1000 of FIG. 10, such as at 1010 of process 1000.

In some embodiments, process 1100 is invoked for each sequence of the set of objects that is being evaluated, such as to determine feasible sequencings.

At 1105, an indication to sequence objects for loading the set of objects is obtained. At 1110, an indication of the set of objects is obtained. At 1115, a sequence of the set of objects is determined. At 1120, loading of the set of objects to a transport container in accordance with the sequence is simulated. In some embodiments, a simulation module is invoked to simulate the loading. For example, the sequencing module provides the simulation module with the determined sequence of the set of objects. In some embodiments, the simulation module is used to simulate the various loadings that may be arranged in accordance with the input sequence of objects. The simulation module may use a physics engine to model forces that may interact on or between objects during loading and/or transport.

At 1125, a scoring value of the loading of the set of objects in accordance with the sequence is determined. In some embodiments, the system scores the sequence based on the predetermined scoring function. For example, the system scores the sequence in connection with evaluating whether the sequence is a feasible/possible sequence and/or determining a best sequence.

At 1130, the system determines whether the sequence is feasible. In some embodiments, the system determines whether the sequence is a feasible sequence based at least in part on a determination of whether the scoring value for the loading (e.g., the possible sequence) exceeds a predefined scoring threshold.

In some embodiments, the system evaluates a loading against a set of heuristics before doing full simulation/evaluation. For example, the system determines whether a potential loading violates one or more heuristics before performing a computationally expensive simulation of the loading and evaluation using models of the simulated loading. The heuristics may include, or be indicative of, parameters pertaining to density, weight distribution, stability, etc.

In response to determining that the sequence is not a feasible sequence at 1130, process 1100 proceeds to 1115, and process 1100 may iterate over 1115-1130 until a predefined amount of time has expired, at least one possible sequence is deemed to be feasible, or a set of M feasible sequences is determined. In contrast, in response to determining that the sequence is a feasible sequence at 1130, process 1100 proceeds to 1135 at which an indication of the sequence is provided. The indication of the sequence may be provided to another system or module that invoked process 1100, or a robotic system to be used to load the set of objects into the transport container.

At 1140, a determination is made as to whether process 1100 is complete. In some embodiments, process 1100 is determined to be complete in response to a determination that no further objects are to be loaded into the transport container, the system receives confirmation that a robotic system configured to load objects to a transport container receives the sequence, an administrator indicates that process 1100 is to be paused or stopped, etc. In response to a determination that process 1100 is complete, process 1100 ends.

In some embodiments, process 1100 iterates over 1105-1145 until no further sequences for various sets of objects are to be determined, or until no further potential sequences for sequencing a particular set of objects are to be evaluated. For example, process 1100 may end after a first sequence is deemed to be a feasible sequence, after the evaluation of sequences has been performed for a predefined time threshold, or a set of M possible/feasible sequences is determined for sequencing a set of objects to be loaded to the transport container. M may be a positive integer. A best sequence/ordering among the evaluated feasible sequences may be selected as the sequence to implement.

Figure 12:
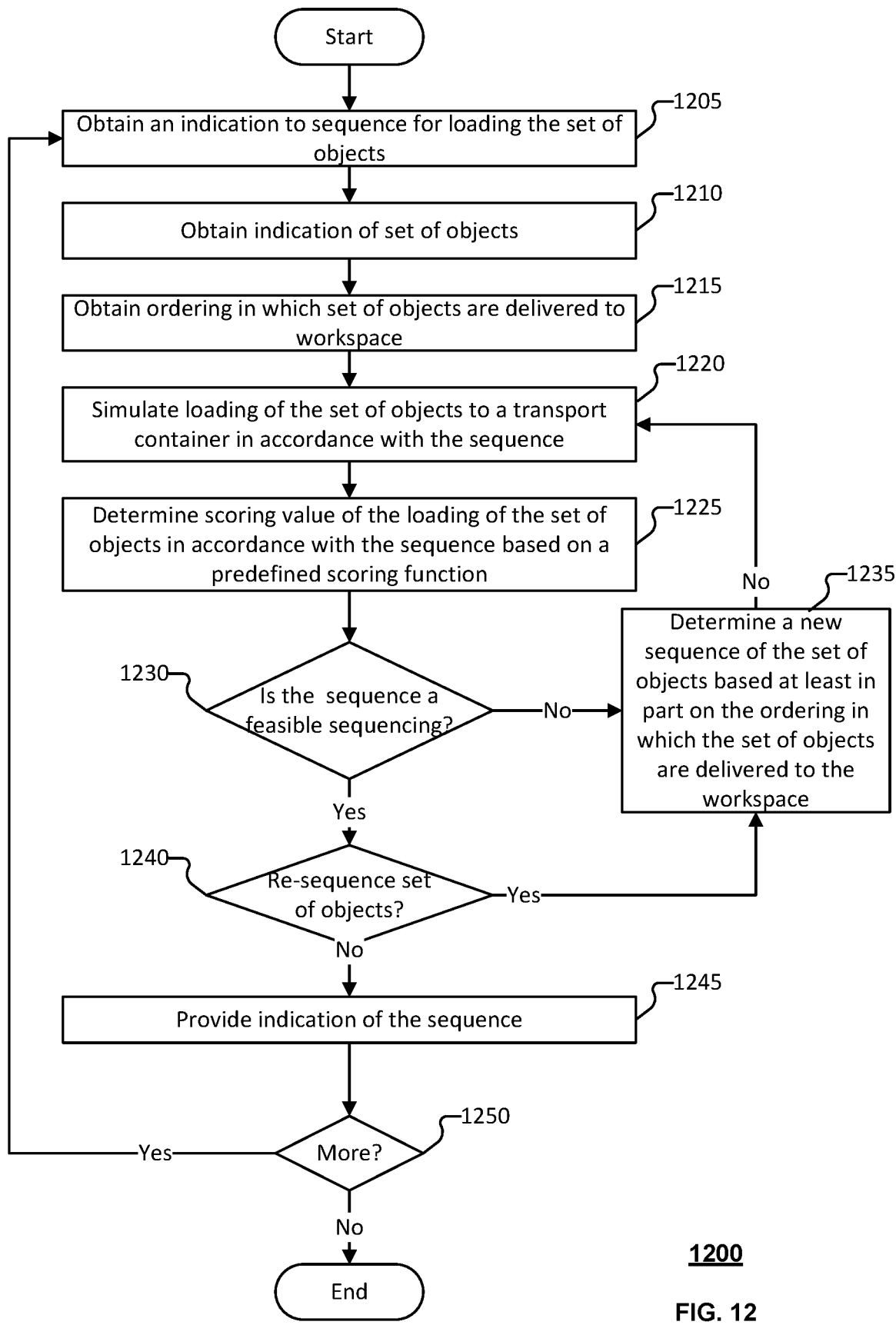
FIG. 12 is a flow chart illustrating a process to determine a sequence of a set of objects to be loaded into a transport container according to various embodiments.

FIG. 12 is a flow chart illustrating a process to determine a sequence of a set of objects to be loaded into a transport container according to various embodiments. In some embodiments, process 1200 is implemented by system 100 of FIG. 1, or one or more servers such as in connection with providing a cloud service. In some embodiments, process 1200 is implemented by the sequencing module. For example, the system (e.g., the model for planning the loading of objects) calls the sequencing module to invoke process 1200. Process 1200 may be invoked by process 1000 of FIG. 10, such as at 1010 of process 1000.

In some embodiments, process 1200 is invoked for each sequence of the set of objects that is being evaluated, such as to determine feasible sequencings. For example, the system runs process 1200 for each sequence that is obtainable by the system, such as based on a consideration of an extent to which the orders may be re-sequenced.

At 1205, an indication to sequence objects for loading the set of objects is obtained. At 1210, an indication of the set of objects is obtained. At 1215, a sequence of the set of objects is determined. At 1220, loading of the set of objects to a transport container in accordance with the sequence is simulated. At 1225, a scoring value of the loading of the set of objects in accordance with the sequence is determined. At 1230, the system determines whether the sequence is feasible. In some embodiments, 1205-1230 corresponds to, or is similar to, 1105-1130 of process 1100.

In response to determining that the sequence is not a feasible sequence at 1230, process 1200 proceeds to 1235 at which a new sequence for the set of objects is determined based at least in part on the ordering in which the set of objects are to be delivered to the workspace. Thereafter, process 1200 may return to 1220 and process 1200 may iterate over 1220-1230 until a predefined amount of time has expired, at least one possible sequence is deemed to be feasible, or a set of M feasible sequences is determined.

In response to determining that the sequence is a feasible sequencing at 1230, process 1200 proceeds to 1240 at which the system determines whether the set of objects are to be re-sequenced.

In some embodiments, the determining whether a sequence is feasible includes determining scoring values for the loading and other loadings objects for which the ordering of objects is within a predefined variation (e.g., a maximum number of items re-sequenced, a maximum extent to which any one object may be out of sequence with others, etc.). For example, the system evaluates loadings that are obtainable based on the sequence of the set of objects or loosely based on the sequence of objects (e.g., loadings obtainable within a predetermined extent of variation in the sequencing). The loadings to be evaluated may also be those loadings that are obtainable based on the buffering capability of the robotic system, such as an extent to which the robotic system can buffer objects such as to cure a variation from the determined sequence.

In response to determining that the set of objects are to be re-sequenced at 1240, process 1200 proceeds to 1235 and process 1200 iterates over 1220-1240 until a feasible sequencing is determined and no further re-sequencing of the items is to be performed. In contrast, in response to determining that the set of objects are not to be re-sequenced at 1240, process 1200 proceeds to 1245 at which an indication of the sequence is provided. The indication of the sequence may be provided to another system or module that invoked process 1200, or a robotic system to be used to load the set of objects into the transport container.

At 1250, a determination is made as to whether process 1200 is complete. In some embodiments, process 1200 is determined to be complete in response to a determination that no further objects are to be loaded into the transport container, the system receives confirmation that a robotic system configured to load objects to a transport container receives the sequence, an administrator indicates that process 1200 is to be paused or stopped, etc. In response to a determination that process 1200 is complete, process 1200 ends.

In some embodiments, process 1200 iterates over 1205-1250 until no further sequences for various sets of objects are to be determined, or until no further potential sequences for sequencing a particular set of objects are to be evaluated. For example, process 1200 may end after a first sequence is deemed to be a feasible sequence, after the evaluation of sequences has been performed for a predefined time threshold, or a set of M possible/feasible sequences is determined for sequencing a set of objects to be loaded to the transport container. M may be a positive integer. A best sequence among the evaluated feasible sequences may be selected as the sequence to implement.

Figure 13:
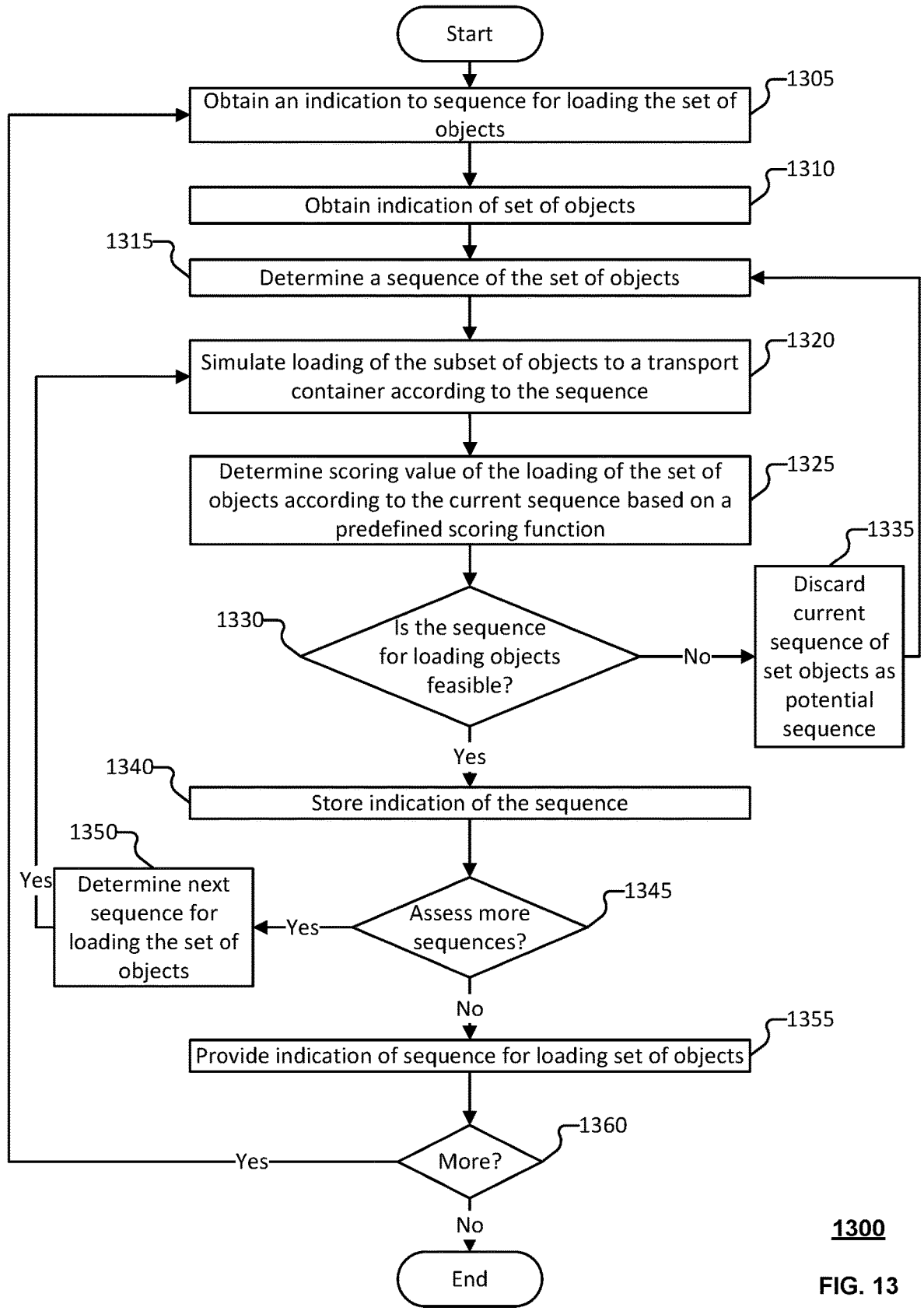
FIG. 13 is a flow chart illustrating a process to determine a sequence of a set of objects to be loaded into a transport container according to various embodiments.

FIG. 13 is a flow chart illustrating a process to determine a sequence of a set of objects to be loaded into a transport container according to various embodiments. In some embodiments, process 1300 is implemented by system 100 of FIG. 1, or one or more servers such as in connection with providing a cloud service. In some embodiments, process 1300 is implemented by the sequencing module. For example, the system (e.g., the model for planning the loading of objects) calls the sequencing module to invoke process 1300. Process 1300 may be invoked by process 1000 of FIG. 10, such as at 1010 of process 1000.

In some embodiments, process 1300 is invoked for each sequence of the set of objects that is being evaluated, such as to determine feasible sequencings. For example, the system runs process 1300 for each sequence that is obtainable by the system, such as based on a consideration of an extent to which the orders may be re-sequenced.

At 1305, an indication to sequence objects for loading the set of objects is obtained. At 1310, an indication of the set of objects is obtained. At 1315, a sequence of the set of objects is determined. At 1320, loading of the set of objects to a transport container in accordance with the sequence is simulated. At 1325, a scoring value of the loading of the set of objects in accordance with the sequence is determined. At 1330, the system determines whether the sequence is feasible.

In some embodiments, 1305-1330 respectively correspond to, or are similar to, 1205-1230 of process 1200.

In response to determining that the sequence for loading the set of objects is not a feasible sequence at 1330, process 1300 proceeds to 1335 at which the current sequence of the set of objects is discarded as a potential sequence. Thereafter, process 1300 may return to 1315 at which a sequence of the set of objects is determined. For example, the system determines another sequence to be evaluated. Process 1300 iterates over 1320-1330 until a predefined amount of time has expired, at least one possible sequence is deemed to be feasible, or a set of M feasible sequences is determined.

In response to determining that the sequence is a feasible sequencing at 1330, process 1300 proceeds to 1340 at which the system stores an indication of the sequence of the set of objects.

At 1345, the system determines whether an additional sequence(s) is to be assessed (e.g., evaluated). In some embodiments, the system determines whether additional sequences are to be evaluated based on an amount of time during which evaluation has been performed (e.g., whether the runtime of determining a loading or a sequencing has exceeded a maximum computation runtime. For example, if the runtime has exceeded the maximum computation runtime, the system determines that additional sequences are not to be assessed.

In some embodiments, the system determines whether additional sequences are to be evaluated based on a determination that sequence is determined for which the sequence or a loading attained using the sequence has an associated scoring value exceeds a scoring threshold. For example, if the system determines that a loading deemed "good enough" is obtainable using a particular sequencing of objects, the system determines that no additional sequences are to be evaluated.

In some embodiments, the system evaluates sequences/loadings until the earlier of expiration of the maximum computation runtime or a "good enough" solution is determined.

In response to determining that an additional sequence(s) is to be assessed, process 1300 proceeds to 1350 at which a next sequence for loading the set of objects is determined. In some embodiments, the system uses one or more heuristics (e.g., heuristics inferred based on a machine learning model) to find other highly likely solutions (e.g., sequences expected to be feasible sequences). For example, the system uses the currently feasible sequence as a base from which to guess/select a next sequence (e.g., in conjunction with the one or more heuristics). Process 1300 thereafter proceeds to 1320 to simulate the next sequence. Process 1300 iterates over 1320-1345 until no further sequences are to be assessed.

In response to determining that no additional sequence for loading the set of objects is to be assessed at 1345, process 1300 proceeds to 1355 at which an indication of the sequencing for loading the set of objects is provided. In some embodiments, the indication of the sequence for loading the set of objects comprises an indication of a set of the feasible sequences, a predefined number of feasible sequences from the set of feasible sequences (e.g., the three sequences with the highest scoring value, etc.), or a best feasible sequence from the set of feasible sequences (e.g., a sequence from among the set of feasible sequences having a highest scoring value, lowest cost, etc.).

At 1360, a determination is made as to whether process 1300 is complete. In some embodiments, process 1300 is determined to be complete in response to a determination that no further objects are to be loaded into the transport container, the system receives confirmation that a robotic system configured to load objects to a transport container receives the sequence, an administrator indicates that process 1300 is to be paused or stopped, etc. In response to a determination that process 1300 is complete, process 1300 ends.

Figure 14:
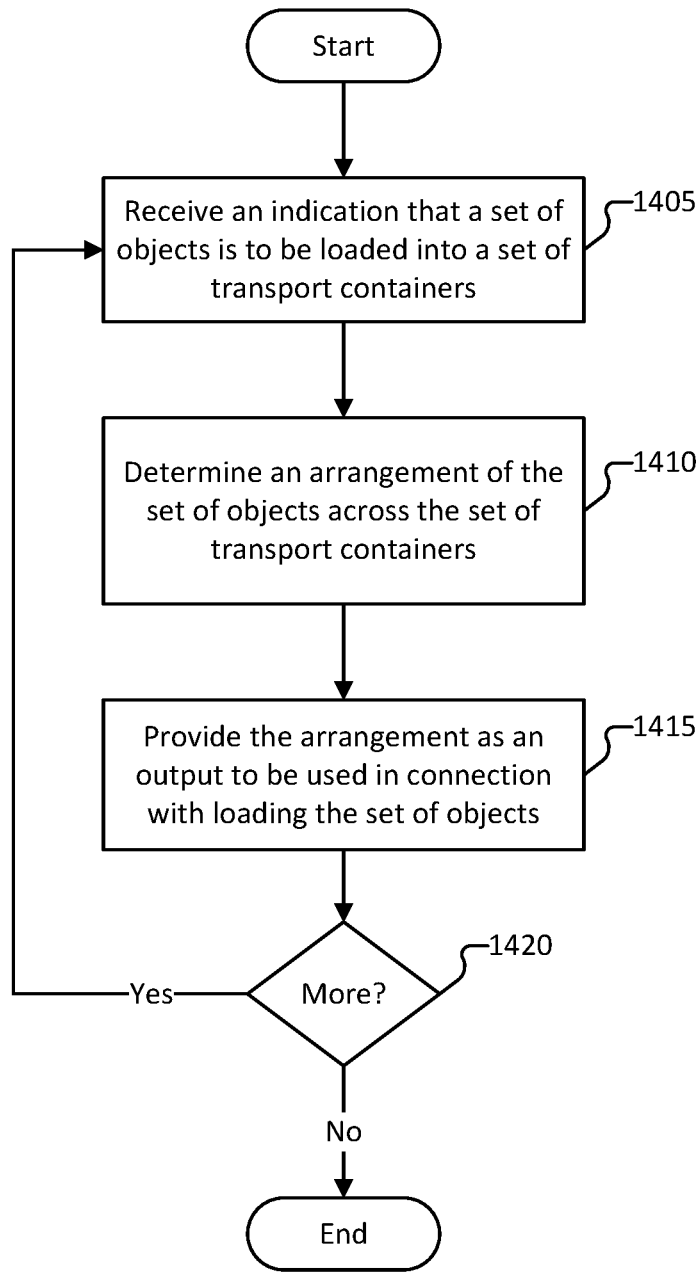
FIG. 14 is a flow chart illustrating a process to determine an arrangement of a set of objects to be loaded into a transport container according to various embodiments.

FIG. 14 is a flow chart illustrating a process to determine an arrangement of a set of objects to be loaded into a transport container according to various embodiments. In some embodiments, process 1400 is implemented by system 100 of FIG. 1, or one or more servers such as in connection with providing a cloud service. In some embodiments, process 1400 is implemented by the model for planning loading of objects to a transport container.

At 1405, an indication that a set of objects is to be loaded into a set of one or more transport containers is received. For example, in response to determining a partition, or in connection with evaluating a partition, the system obtains the indication of the set of objects in the partition (e.g., for which process 1400 is to determine/recommend an arrangement), or an indication of a set of objects in a partition and a corresponding sequencing of the items (e.g., for which process 1400 is to determine/recommend an arrangement), etc. In some embodiments, the system receives the indication that a set of objects is to be loaded into a transport container in connection with 615 of process 600 (e.g., the plan output by process 600 may include information pertaining to objects within various partitions) or 1015 of process 1000 of FIG. 10.

At 1410, an arrangement for loading the set of objects in the set of one or more transport containers is determined. In some embodiments, the arrangement includes an indication of a destination location and/or orientation for the objects in the set of objects to be loaded to a particular transport container. In some embodiments, the arrangement includes an indication of a plan according to which a robot is to load the objects into the transport container.

At 1415, the arrangement to be used in connection with loading the set of objects is provided as an output. In some embodiments, the arrangement is provided to the system, module, or process that invoked process 1400. For example, the arrangement is provided to a robotic system, such as system 100 of FIG. 1, which controls a robot to load/unload a set of objects to a transport container.

At 1420, a determination is made as to whether process 1400 is complete. In some embodiments, process 1400 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1400 is to be paused or stopped, etc. In response to a determination that process 1400 is complete, process 1400 ends. In response to a determination that process 1400 is not complete, process 1400 returns to 1405.

Figure 15:
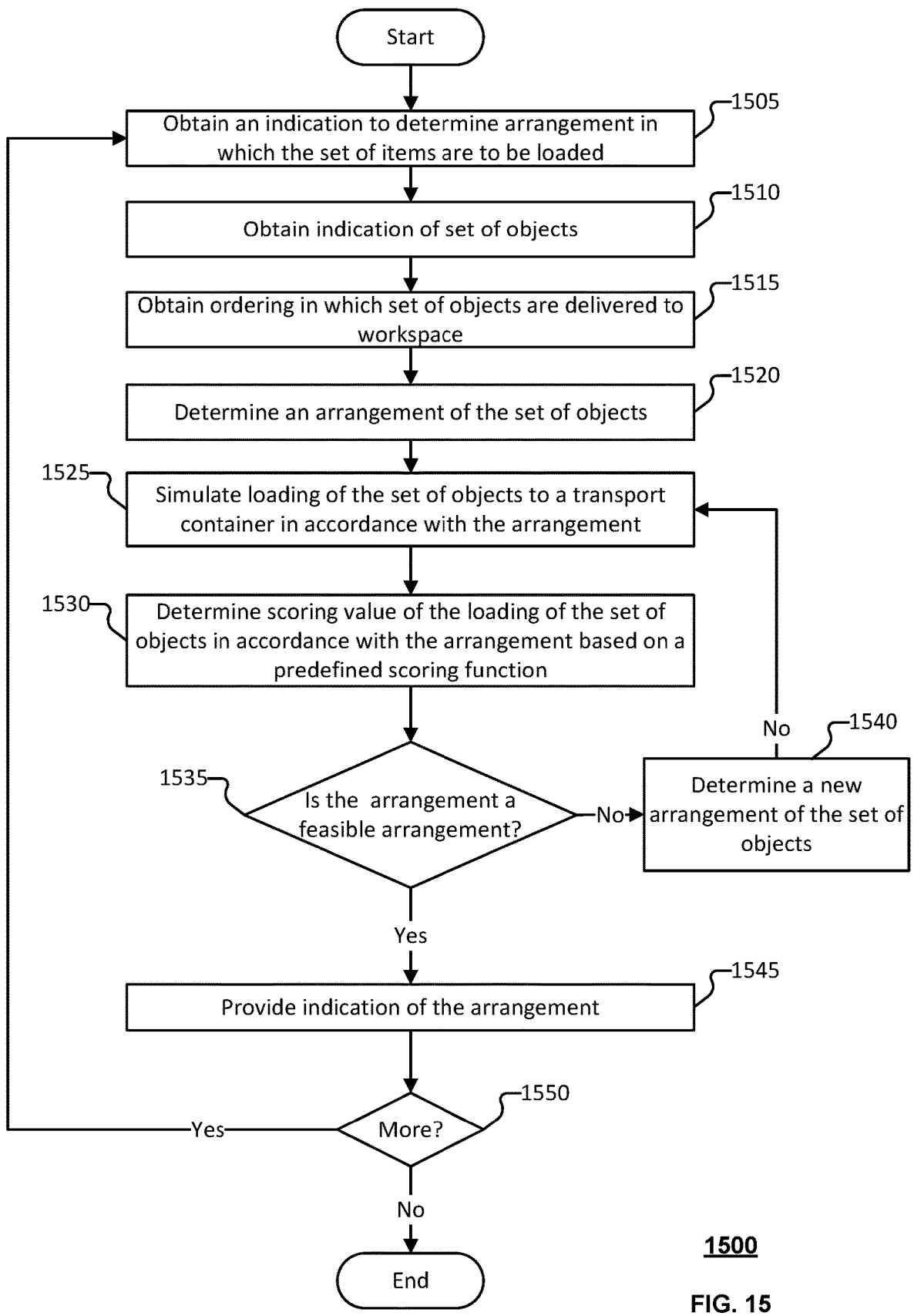
FIG. 15 is a flow chart illustrating a process to determine an arrangement of a set of objects to be loaded into a transport container according to various embodiments.

FIG. 15 is a flow chart illustrating a process to determine an arrangement of a set of objects to be loaded into a transport container according to various embodiments. In some embodiments, process 1500 is implemented by system 100 of FIG. 1, or one or more servers such as in connection with providing a cloud service. In some embodiments, process 1500 is implemented by the model for planning loading of objects to a transport container.

At 1505, an indication to determine an arrangement according to which a set of items are to be loaded to a transport container is obtained. In some embodiments, the system receives the indication to determine the arrangement in connection with 1410 of process 1400. For example, process 1500 is invoked by 1410 of process 1400.

At 1510, an indication of the set of objects is obtained.

At 1515, an ordering in which the set of objects are delivered to the workspace is obtained. In some embodiments, the ordering is predetermined, such as based on a pre-determined sequencing (e.g., a sequence determined by process 1000, etc.). For example, the system uses a predetermined sequence in connection with determining an arrangement offline (e.g., asynchronous) with respect to the loading of the set of items.

In some embodiments, the ordering is obtained based on information received from a vision system. For example, the system receives an indication of the ordering as objects are delivered to the workspace. The system may receive the ordering based on information received from a vision system in connection with determining arrangements inline (e.g., synchronously or in real-time) with the loading of the set of objects to the particular transport container. In connection with determining arrangements inline, the system may obtain an ordering of a subset of the set of objects. For example, the vision system may only detect a next Y items that are being delivered to the workspace. Y is a positive integer. In some embodiments, in connection with determining an arrangement inline with loading the set of objects, the system may store a pre-determined arrangement, and the system updates the pre-determined arrangements based on variations in the real world, such as variation in ordering of objects, variation in attributes of objects, etc. The predetermined arrangement may be an ideal arrangement or an arrangement among a set of evaluated arrangements that has a highest scoring value according to a predetermined scoring function.

At 1520, an arrangement of the set of objects is determined. In some embodiments, the system determines the arrangement based at least in part on an arrangement/placement model.

In some embodiments, the system determines the arrangement based at least in part on one or more heuristics. For example, the system uses one or more heuristics to make an educated guess of an arrangement that would be deemed feasible. The system can thereafter iteratively improve the arrangement based on evaluation of the arrangement. An initial arrangement (e.g., initial iteration of process 1500 for a set of objects) may be selected using the one or more heuristics, and subsequent arrangements may be variations of the initial arrangement, or a preceding arrangement based on updates to the arrangement based at least in part on the evaluation of the arrangement. The evaluation of the arrangement may identify one or more objects that are expected to cause the arrangement to be infeasible or to otherwise negatively impact a scoring of the arrangement in an extent greater than a predefined scoring threshold. For example, the evaluation of the arrangement identifies one or more objects expected to cause an instability. As another example, the evaluation of the arrangement identifies one or more objects expected to cause a violation of a weight distribution criterion.

At 1525, loading of the set of objects to a transport container in accordance with the arrangement is simulated. In some embodiments, the system calls a simulation module to generate a model of the arrangement. For example, the simulation module generates a geometric model of placements of the set of objects. As another example, the simulation module calls a physics engine to simulate forces that interact on and between objects within the loading, such as during transport.

At 1530, a scoring value of the loading of the set of objects in accordance with the arrangement is determined. In some embodiments, the system scores the arrangement based on the predetermined scoring function. For example, the system scores the arrangement in connection with evaluating whether the arrangement is a feasible/possible arrangement and/or determining a best arrangement.

In some embodiments, the predefined scoring function takes into account cost, time, stability, density, weight distribution, etc. Various other characteristics of a loading (e.g., arrangement) can be implemented in the predefined scoring function.

In some embodiments, the determining the scoring value of the loading includes comparing the loading with respect to one or more heuristics. For example, the system uses a set of heuristics to quickly determine whether the loading is expected to be feasible or infeasible. The system may use the set of heuristics to evaluate the loading before performing a computationally expensive simulation of the loading, such as to avoid arrangements for which the one or more heuristics indicate that the loading is expected to violate one or more loading criterion.

At 1535, the system determines whether the arrangement is feasible. In some embodiments, the system determines whether the arrangement is a feasible arrangement based at least in part on a determination of whether the scoring value for the loading (e.g., the possible arrangement) exceeds a predefined scoring threshold.

In response to determining that the arrangement is not a feasible arrangement at 1535, process 1500 proceeds to 1540 at which a new arrangement of the set of objects is determined. Thereafter, process 1500 returns to 1525 and process 1500 iterates over 1524-1535 until a predefined amount of time has expired, at least one possible arrangement is deemed to be feasible, or a set of Z feasible arrangement is determined. Z is a positive integer. In contrast, in response to determining that the arrangement is a feasible arrangement at 1535, process 1500 proceeds to 1545 at which an indication of the arrangement is provided. The indication of the arrangement may be provided to another system or module that invoked process 1500, or a robotic system to be used to load the set of objects into the transport container. In some embodiments, the providing the indication of the arrangement comprises storing the arrangement in a set of feasible arrangements (e.g., from which a preferred or best arrangement may be selected for implementation).

At 1550, a determination is made as to whether process 1500 is complete. In some embodiments, process 1500 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1500 is to be paused or stopped, etc. In response to a determination that process 1500 is complete, process 1500 ends. In response to a determination that process 1500 is not complete, process 1500 returns to 1505.

In some embodiments, process 1500 iterates over 1505-1550 until no further arrangements for various sets of objects are to be determined, or until no further potential arrangements for arranging/loading a particular set of objects are to be evaluated. For example, process 1500 may end after a first arrangement is deemed to be a feasible arrangement, after the evaluation of arrangements has been performed for a predefined time threshold, or a set of X possible/feasible arrangements is determined for arranging/loading a set of objects to be loaded to the transport container. X may be a positive integer. A best arrangement among the evaluated feasible arrangements may be selected as the arrangement to implement.

Figure 16:
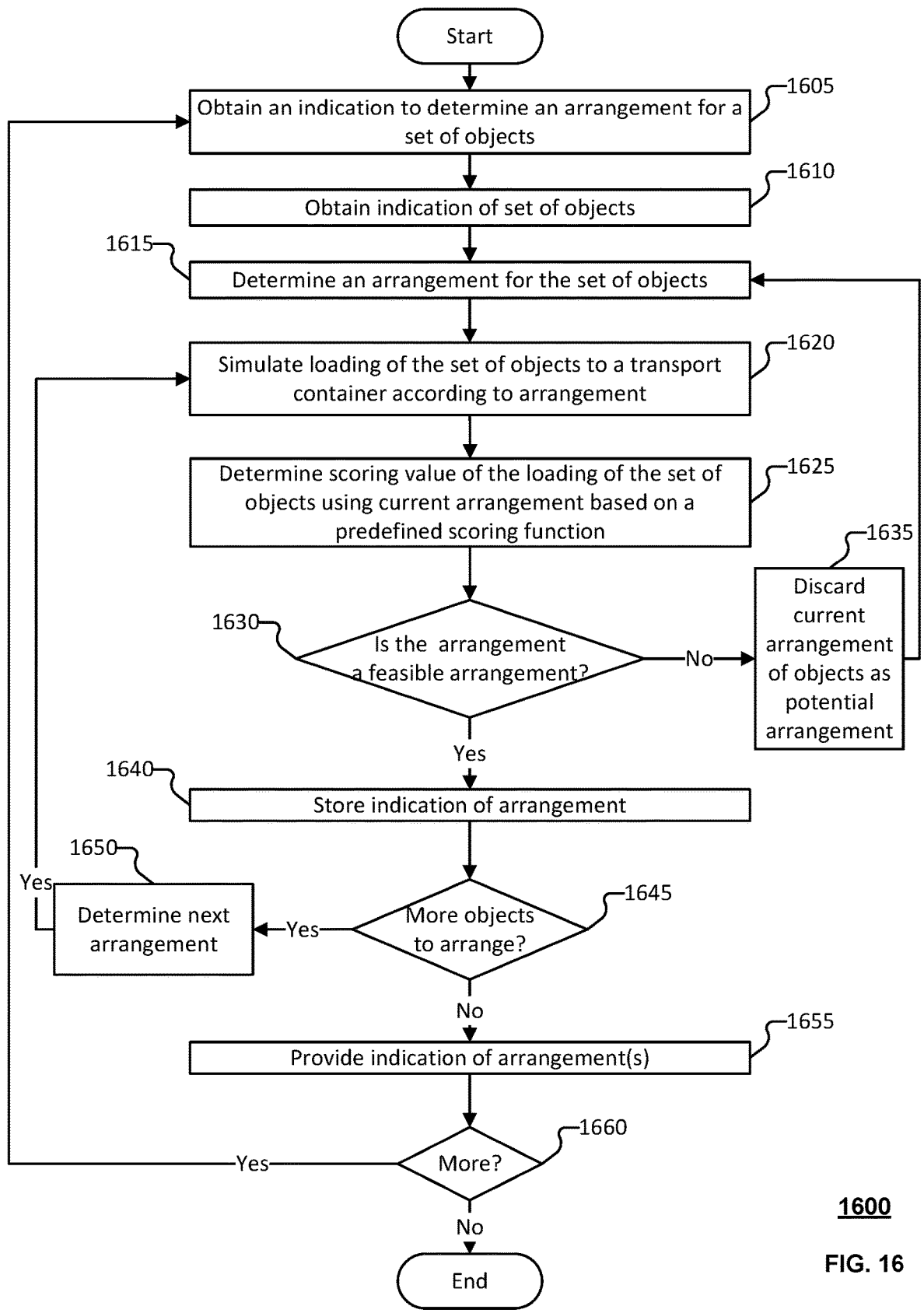
FIG. 16 is a flow chart illustrating a process to determine an arrangement of a set of objects to be loaded into a transport container according to various embodiments.

FIG. 16 is a flow chart illustrating a process to determine an arrangement of a set of objects to be loaded into a transport container according to various embodiments. In some embodiments, process 1600 is implemented by system 100 of FIG. 1, or one or more servers such as in connection with providing a cloud service. In some embodiments, process 1600 is implemented by the model for planning loading of objects to a transport container.

At 1605, an indication to determine an arrangement according to which a set of items are to be loaded to a transport container is obtained. In some embodiments, 1605 corresponds to, or is similar to, 1505 of process 1500.

At 1610, an indication of the set of objects is obtained. In some embodiments, 1610 corresponds to, or is similar to, 1510 of process 1500. The indication of the set of objects may include an ordering of the set of objects, such as an order in which the set of objects are expected to be delivered to a robotic system for loading to the transport container.

At 1615, an arrangement of the set of objects is determined. In some embodiments, the arrangement is determined with respect to a subset of the objects. For example, process 1600 is queried to determine a placement of a particular object (e.g., inline with the robotic system performing the pick and placement operations). As another example, process 1600 is queried to determine a placement of a set of K objects from the set of objects, such as the next K objects to be delivered to the workspace to be loaded to the transport container. K may be a positive integer.

At 1620, loading of the set of objects to a transport container in accordance with the arrangement is simulated. In some embodiments, 1620 corresponds to, or is similar to, 1525 of process 1500.

At 1625, a scoring value of the loading of the set of objects in accordance with the sequence is determined. In some embodiments, the system scores the arrangement based on the predetermined scoring function. For example, the system scores the arrangement in connection with evaluating whether the arrangement is a feasible/possible arrangement and/or determining a best arrangement.

At 1630, the system determines whether the arrangement is feasible. In some embodiments, the system determines whether the arrangement is a feasible arrangement based at least in part on a determination of whether the scoring value for the loading (e.g., the possible arrangement) exceeds a predefined scoring threshold.

In response to determining that the arrangement is not a feasible arrangement at 1630, process 1600 proceeds to at which the current arrangement of objects is discarded as a potential arrangement. Thereafter, process 1600 returns to 1615 and process 1600 iterates over 1615-1630 until a predefined amount of time has expired, at least one possible arrangement is deemed to be feasible, or a set of Z feasible arrangement is determined. Z is a positive integer. In contrast, in response to determining that the arrangement is a feasible arrangement at 1630, process 1600 proceeds to 1640 at which an indication of the arrangement is stored such as in a set of feasible arrangements (e.g., from which a preferred or best arrangement may be selected for implementation).

At 1645, the system determines whether more objects are to be arranged. For example, in the event that the arrangement is determined with respect to a subset of the set of objects to be loaded to the transport container (e.g., a next K objects to be loaded), the system determines whether any objects in the set of objects remain for which an arrangement (e.g., placement) is to be determined).

In response to determining that more objects are to be arranged at 1645, process 1600 proceeds to 1650 at which a next arrangement is determined. Thereafter, process 1600 returns to 1620 and process 1600 iterates over 1620-1645 until no further objects in the set of objects are to be arranged.

In response to determining that no further objects are to be arranged at 1645, process 1600 proceeds to 1655 at which an indication of the arrangement is provided.

At 1660, a determination is made as to whether process 1600 is complete. In some embodiments, process 1600 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1600 is to be paused or stopped, etc. In response to a determination that process 1600 is complete, process 1600 ends. In response to a determination that process 1600 is not complete, process 1600 returns to 1605.

Figure 17:
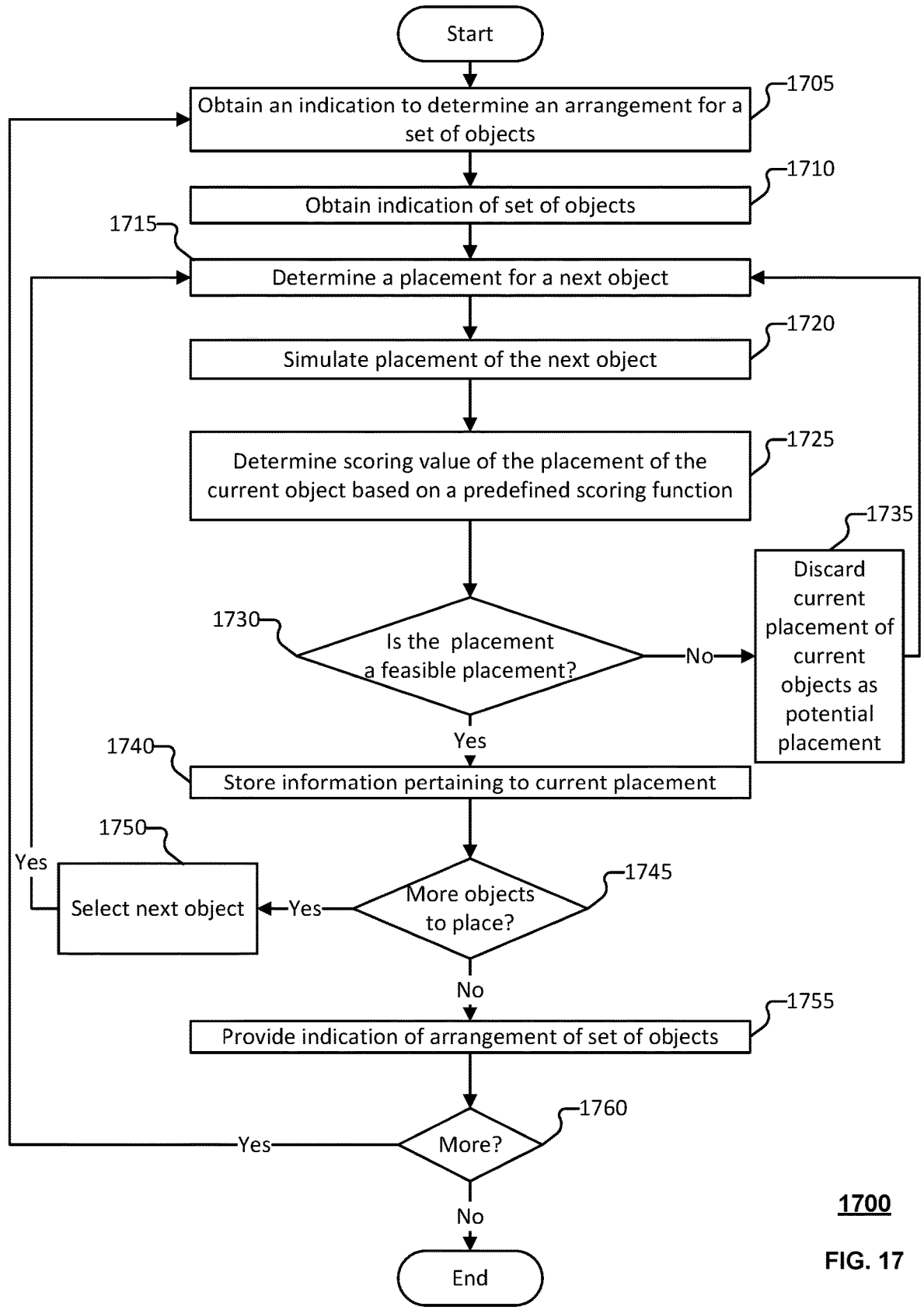
FIG. 17 is a flow chart illustrating a process to determine an arrangement of a set of objects to be loaded into a transport container according to various embodiments.

FIG. 17 is a flow chart illustrating a process to determine an arrangement of a set of objects to be loaded into a transport container according to various embodiments. In some embodiments, process 1700 is implemented by system 100 of FIG. 1, or one or more servers such as in connection with providing a cloud service. In some embodiments, process 1700 is performed inline (e.g., synchronous, real-time, etc.) with the loading of the set of objects. For example, process 1700 is implemented in connection with determining placements for individual objects among the set of objects to be loaded to the transport container, or in determining placements (e.g., arrangements) of subsets of the set of objects.

At 1705, an indication to determine an arrangement according to which a set of items are to be loaded to a transport container is obtained. At 1710, an indication of the set of objects is obtained. At 1715, an arrangement of the set of objects is determined. At 1720, loading of the set of objects to a transport container in accordance with the arrangement is simulated. At 1725, a scoring value of the loading of the set of objects in accordance with the sequence is determined. At 1730, the system determines whether the arrangement is feasible. In some embodiments, 1705-1730 corresponds to, or is similar to, 1605-1630 of process 1600.

In response to determining that the arrangement is not a feasible arrangement at 1730, process 1700 proceeds to 1735 at which the current arrangement of objects is discarded as a potential arrangement. Thereafter, process 1700 returns to 1715 and process 1700 iterates over 1715-1730 until a predefined amount of time has expired, at least one possible arrangement is deemed to be feasible, or a set of Z feasible arrangement is determined. Z is a positive integer. In contrast, in response to determining that the arrangement is a feasible arrangement at 1730, process 1700 proceeds to 1740 at which an indication of the arrangement is stored such as in a set of feasible arrangements (e.g., from which a preferred or best arrangement may be selected for implementation).

At 1745, the system determines whether more objects are to be arranged. In some embodiments, 1745 corresponds to, or is similar to, 1645 of process 1600.

In response to determining that more objects are to be arranged at 1745, process 1600 proceeds to 1650 at which a next object(s) (e.g., a particular object or a subset of objects of the set of objects) is selected. Thereafter, process 1700 returns to 1715 and process 1700 iterates over 1620-1645 until no further objects in the set of objects are to be arranged.

In response to determining that no further objects are to be arranged at 1645, process 1700 proceeds to 1755 at which an indication of the arrangement is provided.

At 1760, a determination is made as to whether process 1700 is complete. In some embodiments, process 1700 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1700 is to be paused or stopped, etc. In response to a determination that process 1700 is complete, process 1700 ends. In response to a determination that process 1700 is not complete, process 1700 returns to 1705.

In some embodiments, the system determines one or more of the partitioning, the sequencing, and the arranging of the objects serially. In some embodiments, the system determines a plurality of the partitioning, the sequencing, and the arranging of the objects simultaneous. For example, the system configures the module to determine a solution for a plurality of the partitioning, the sequencing, and the arranging of the objects simultaneous such as based on bounding the solution space using a set of constraints along the corresponding dimensions (e.g., partitioning constraints, sequencing constraints, stability constraints, etc.).

Figure 18A:
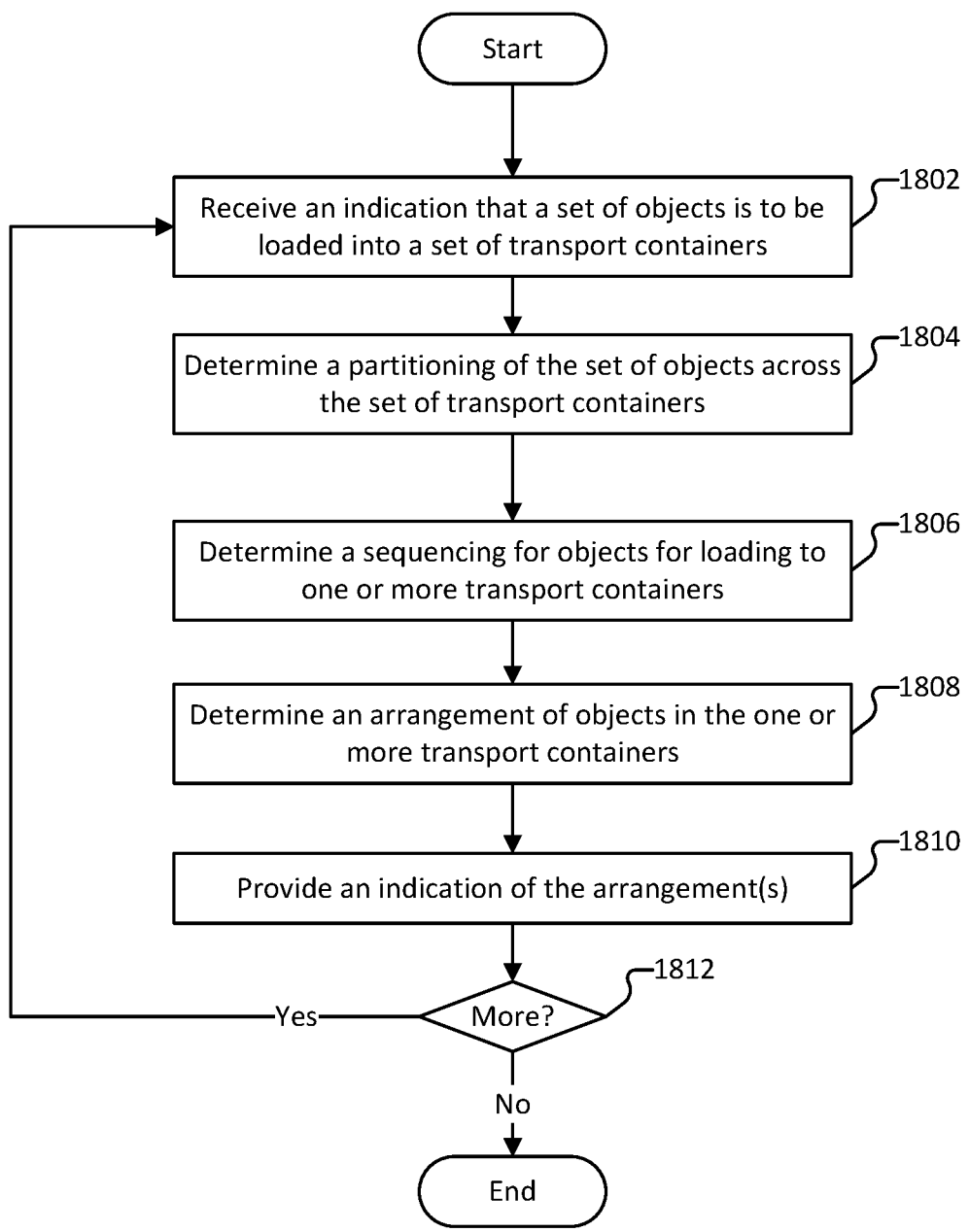
FIG. 18A is a flow chart illustrating a process to determine a loading a set of objects to be loaded into a transport container according to various embodiments.

FIG. 18A is a flow chart illustrating a process to determine a loading a set of objects to be loaded into a transport container according to various embodiments. In some embodiments, process 1800 is implemented by system 100 of FIG. 1, or one or more servers such as in connection with providing a cloud service.

At 1802, an indication that a set of objects is to be loaded into a set of transport containers is received. At 1804, a partitioning of the set of objects across the set of transport container is determined. In some embodiments, the partitioning of the set of objects is determined based at least in part on querying a partitioning model. At 1806, a sequencing for objects for loading to one or more transport containers is determined. In some embodiments, the system determines the sequence for the objects based at least in part on querying a sequencing model. The system may determine the sequence for a particular transport container, or a sequence for objects assigned to each transport container in the set of transport containers. At 1808, an arrangement of the objects in the one or more transport containers is determined. In some embodiments, the system determines the arrangement based at least in part on querying a placement model. As an example, the system may determine the arrangement and verify that the arrangement satisfies one or more weight distribution criteria. The system may determine the arrangement of objects for a particular transport container, or arrangements for each transport container of the set of transport containers. At 1810, an indication of the arrangement(s) is provided. In some embodiments, the system provides the arrangements for to one or more computer systems to implement the loading of objects to one or more of the transport containers. In some embodiments, the indication comprises a plan for loading the set of objects to a particular transport container(s). At 1812, a determination is made as to whether process 1800 is complete. In some embodiments, process 1800 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1800 is to be paused or stopped, etc. In response to a determination that process 1800 is complete, process 1800 ends. In response to a determination that process 1800 is not complete, process 1800 returns to 1802.

In some embodiments, the determining the partitioning, sequencing, and arrangement may be done sequentially or in parallel. The system may iteratively evaluate the various permutations and combinations.

Figure 18B:
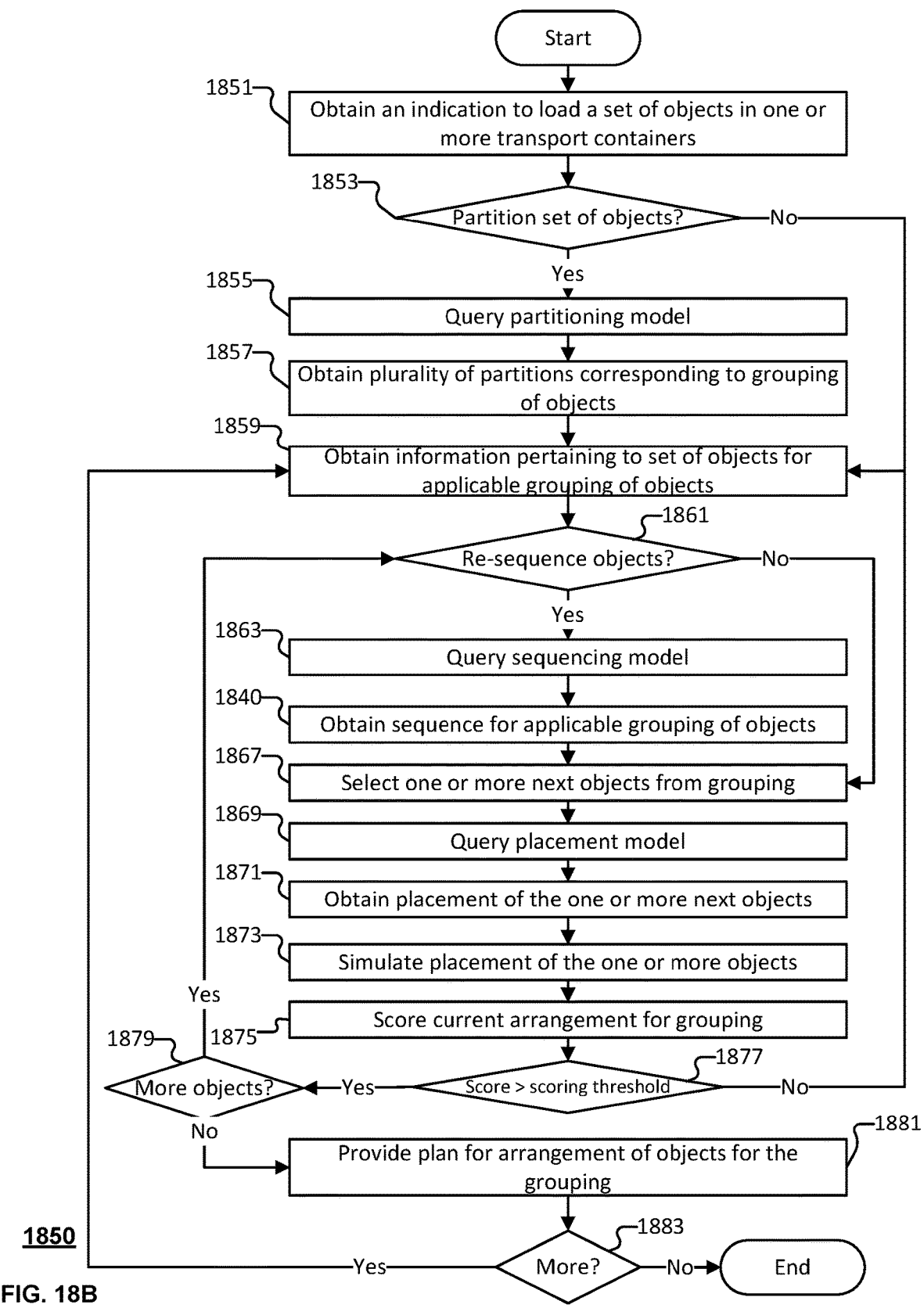
FIG. 18B is a flow chart illustrating a process to determine a loading a set of objects to be loaded into a transport container according to various embodiments.

FIG. 18B is a flow chart illustrating a process to determine a loading a set of objects to be loaded into a transport container according to various embodiments. In some embodiments, process 1850 is implemented by system 100 of FIG. 1, or one or more servers such as in connection with providing a cloud service.

At 1851, an indication to load a set of objects in one or more transport containers is obtained.

At 1852, the system determines whether the set of objects is to be partitioned. For example, the system determines whether the set of objects are expected to fit within a single transport container (e.g., while satisfying predefined characteristic criterion, such as satisfying a density threshold, a weight distribution threshold, a weight threshold, a stability threshold, etc.). As another example, the system determines whether the indication to load the set of objects indicates that the set of objects are to be loaded across a plurality of transport containers. In response to determining that the set of objects is to be partitioned at 1853, process 1850 proceeds to 1855. In contrast, in response to determining that the set of objects is not to be partitioned at 1810, process 1800 proceeds to 1825.

At 1855, the system queries a partitioning model. In some embodiments, the system queries the partitioning model for a set of partitions based at least in part on the set of objects. As an example, the system queries the partitioning model to determine groupings of objects to be allocated across the partitions respectively corresponding to a plurality of transport containers. In some embodiments, querying the partitioning model includes invoking one or more of process 600 of FIG. 6, process 700 of FIG. 7, process 800 of FIG. 8, or process 900 of FIG. 9.

At 1857, a plurality of partitions corresponding to a grouping of the set of objects is obtained. For example, the system receives a result from querying the partition model (e.g., a set of partitions for the set of objects). The system allocates/assigns each of the plurality of partitions to respective transport containers to which the set of objects are to be loaded.

At 1859, information pertaining to the set of objects for the applicable grouping of objects. In some embodiments, the system selects from the plurality of partitions a partition to be evaluated or implemented.

At 1861, the system determines whether to re-sequence the objects. For example, the system determines whether the robotic system or warehouse/hardware (e.g., shipping facilities, etc.) has the capability for a re-ordering of the objects, such as whether the robotic system/warehouse has a buffer zone, etc. In some embodiments, the system determines whether to re-sequence the objects based at least in part on one or more heuristics, such as in contexts in which a quick prediction of a solution is required or to generate a quick initial solution that may be iteratively improved. In some embodiments, the system determines whether to re-sequence the objects based at least in part on invoking an any-time solver, such as a sequencing module, which provides a solution (e.g., a best solution determined within a predefined amount of time, such as a time permitted in the particular context).

In response to determining that the objects are to be re-sequenced at 1861, process 1850 proceeds to 1863. Conversely, in response to determining that the objects are not to be re-sequenced at 1861, process 1850 proceeds to 1867.

At 1863, the system queries a sequencing model. In some embodiments, the system queries the sequencing model for a sequence (e.g., ordering) the objects, such as a sequence in which the set of objects are to be loaded into the corresponding transport container. In some embodiments, such as in the case that the system (e.g., the robotic system) has the capability to re-order items being delivered to the workspace, the system queries the sequencing model for a sequence in which objects are to be delivered to the workspace. The querying the partitioning model may include invoking one or more of process 1000 of FIG. 10, process 1100 of FIG. 11, process 1200 of FIG. 12, or process 1300 of FIG. 13.

At 1865, a sequence for the applicable grouping of objects is obtained. The system obtains a result from querying the sequencing the model. For example, the system obtains a sequence in which the subset of objects (e.g., the set of objects to be loaded to a particular transport container) are to be loaded to the transport container and/or delivered to the workspace of the robotic system (e.g., via a conveyance structure) for loading to the transport container.

At 1867, the system selects one or more next objects from the grouping of objects (e.g., the subset of objects corresponding to the partition). As an example, if the system is configured to determine sequences or arrangements of a subset of the set of objects for a partition, process 1850 iterates over 1861-1879 until all of the objects in the partition have been sequenced and/or arranged.

At 1869, the system queries a placement model. The system queries the placement model for an indication of a location/orientation (e.g., an arrangement) for objects corresponding to a partition. For example, the system queries the placement model to obtain an arrangement for the objects corresponding to the partition (e.g., the subset of the objects for the partition). The placement includes a destination location and an object orientation.

At 1871, the system obtains a placement of the one or more objects. For example, the system obtains the placement from the placement model.

At 1873, the system simulates placement of the one or more objects. In some embodiments, the system obtains a model of the workspace (e.g., a geometric model of the workspace taking into account previous placements of subsets of objects to be loaded to a particular transport container) and simulates placing the one or more next objects to be loaded to the transport container.

At 1875, the current arrangement for the grouping of objects (e.g., the particular partition) is scored. In some embodiments, the system scores the arrangement based on the predetermined scoring function. For example, the system scores the arrangement in connection with evaluating whether the arrangement is a feasible/possible arrangement and/or determining a best arrangement.

At 1877, the system determines whether the scoring value (e.g., the score from evaluating the arrangement) exceeds a predefined scoring threshold. In some embodiments, the system compares the scoring value, or various aspects of the scoring value, to a plurality of characteristic thresholds. For example, the system compares an expected density component of the scoring value (e.g., the evaluation of the arrangement) to a minimum density threshold. As another example, the system compares an expected weight distribution component of the scoring value (e.g., the evaluation of the arrangement) to a minimum weight distribution threshold. As another example, the system compares an expected stability component of the scoring value (e.g., the evaluation of the arrangement) to a minimum stability threshold. In some embodiments, the system deems the scoring value as not satisfying the scoring threshold (e.g., not exceeding the scoring threshold) if any one of the components of the scoring value pertaining to a particular characteristic does not satisfy a corresponding predefined characteristic threshold (e.g., density threshold, weight distribution threshold, time threshold, stability threshold, etc.).

In response to determining that the scoring value (e.g., the score from evaluating the arrangement) exceeds a predefined scoring threshold at 1877, process 1850 proceeds to 1879 and process 1850 iterates over 1859-1879 until no further objects are to be arranged (e.g., the arrangement for the particular partition has been determined for all objects in the partition). Conversely, in response to determining that the scoring value does not exceed the predefined threshold at 1877, process 1850 returns to 1859.

At 1879, the system determines whether more objects are to be arranged (e.g., placed). For example, the system determines whether the set of objects for a particular partition comprise any more objects that are to be sequenced and/or placed. In some embodiments, 1879 corresponds to, or is similar to, 1645 of process 1600.

In response to determining that one or more remaining objects are to be arranged at 1879, process 1850 returns to 1830 and process 1850 iterates over 1861-1879 until no further objects are to be arranged (e.g., the arrangement for the particular partition has been determined for all objects in the partition). Conversely, in response to determining that no further objects remain at 1879, process 1850 proceeds to 1881 at which the plan for arrangement of objects for the grouping (e.g., the objects in the partition) are provided. In some embodiments, providing the plan for arrangement of objects includes storing the plan in a mapping of plans to grouping of objects (e.g., partitions). In some embodiments, providing the plan for arrangement of objects includes storing the plan in a set of feasible plans for arranging the objects for a grouping of objects (e.g., the partition). The plan may be provided to a robotic system to implement the loading of the grouping of objects to a particular transport container based at least in part on the plan.

At 1883, a determination is made as to whether process 1850 is complete. In some embodiments, process 1850 is determined to be complete in response to a determination that no further objects are to be loaded into the transport container, the system receives confirmation that a robotic system configured to load objects to a transport container receives the arrangement, the system receives an indication that the robotic system has completed loading the set of objects to the transport container(s), an administrator indicates that process 1850 is to be paused or stopped, etc. In response to a determination that process 1850 is complete, process 1850 ends. In response to a determination that process 1850 is not complete, process 1850 returns to 1851.

Figure 19:
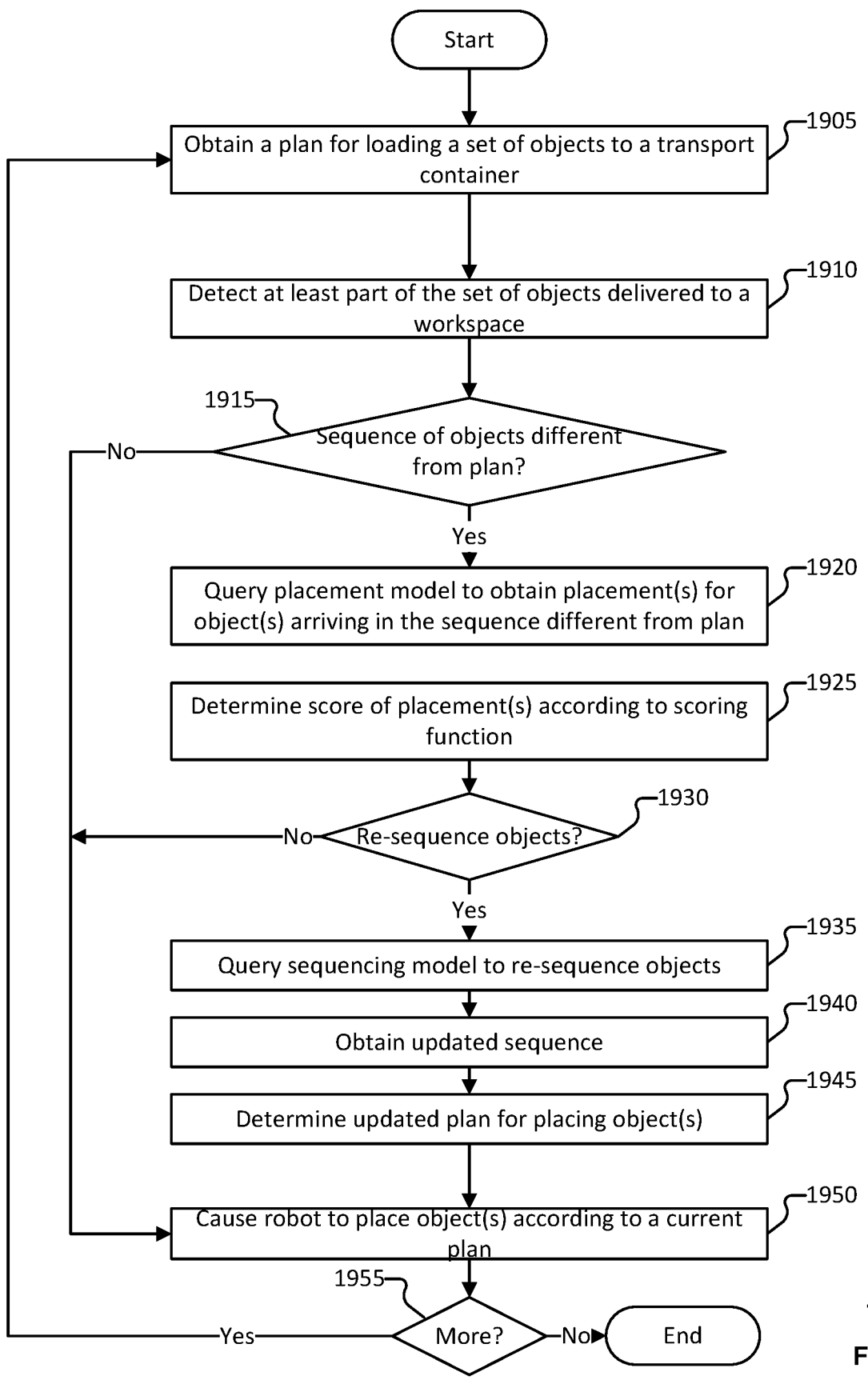
FIG. 19 is a flow chart illustrating a process to load a set of objects to be loaded into a transport container according to various embodiments.

FIG. 19 is a flow chart illustrating a process to load a set of objects to be loaded into a transport container according to various embodiments. In some embodiments, process 1900 is implemented by robotic system configured to load a set of objects to a transport container, such as system 100 of FIG. 1. Process 1900 is an example of a robotic system updating a plan for loading the set of objects to the transport container inline (e.g., synchronously, in real time, etc.) with the loading of the set of objects. For example, a robotic system uses a process similar to process 1900 to modify the plan for loading the set of objects, such as to account for variation in object ordering or object attributes, etc.

At 1905, a plan for loading a set of objects to a transport container is obtained. In some embodiments, the plan is determined offline, such as by another system (e.g., one or more servers, a cloud service, etc.). The other system determines the plan and then provides the plan to the robotic system configured to load the set of objects. For example, the plan is determined by another system, which has greater computational capabilities than the computer system comprised in the robotic system. In some embodiments, the offline service for determining plans is not constrained by time or computational resources in the same manner as the robotic system configured to load the set of objects. Accordingly, the plan determined by the offline service has higher fidelity.

At 1910, at least part of the set of objects delivered to the workspace are detected. The robotic system uses one or more sensors, such as a vision system, to detect (e.g., identify) objects being delivered to the workspace for loading to the transport container. In some implementations, such a part of the set of objects are detected during a phase in which the objects are unloaded from a different transport container within the shipping facility (e.g., a truck carrying packages to be shipped to different locations) before being provided to the robotic system for loading to the transport container.

At 1915, the system determines whether the sequence of objects is different from the plan. The system determines if the sequence in which objects are delivered to the workspace is different from the sequence according to the plan based on comparing the information obtained by the one or more sensors (e.g., segmenting the information captured by the sensor(s) and identifying the objects delivered to the workspace) with the planned sequence.

In response to determining that the sequence of objects is different from the plan at 1915, process 1900 proceeds to 1920. Conversely, in response to determining that the sequence of objects is not different from the plan at 1915, process 1900 proceeds to 1950.

At 1920, a placement model is queried to obtain placement(s) for the objects arriving in the sequence different from the plan. In some embodiments, the placement model queried is a lightweight model that provides a quick solution for updating the plan for loading the objects. The placement model may be stored locally at the robotic system and is configured to trade-off physical fidelity for computational time as compared to the offline service (e.g., the offline placement model that is computed by a system having significantly greater computational resources). The placement model that is queried may provide a "good-enough" solution that satisfies one or more predetermined criteria, such as stability, density, weight distribution, runtime for determining the placement, and time to execute the placement. In some embodiments, the placement model is bounded by various other constraints such as dimensional constraints of the transport container, movement constraints of the robot, etc.

At 1925, a scoring value for the placement is determined according to a predefined scoring function.

At 1930, the system determines whether to re-sequence the items. In some embodiments, the system determines to re-sequence the items based on comparing the scoring value of the placement to a scoring threshold or one or more other criteria (e.g., one or more heuristics, etc.).

According to various embodiments, the system attempts to determine an arrangement of objects provided in a sequence different from the plan without having to re-sequence items. For example, the system attempts to determine an acceptable solution that, while not optimized, provides an acceptable arrangement of objects.

In response to determining that the objects are not to be re-sequenced at 1930, process 1900 proceeds to 1950. Conversely, in response to determining to that the objects are to be re-sequenced at 1930, process 1900 proceeds to 1935 at which a sequencing model is queried to re-sequence the objects. In some embodiments, the system determines an updated sequence by querying a lightweight sequencing model that is stored locally and that quickly determines (e.g., within 5 seconds or less) a solution to the re-sequencing.

At 1940, an updated sequence is obtained. In some embodiments, the system obtains the updated sequence from the sequencing model. As an example, the system receives a set of feasible updated sequences and selects an updated sequence to implement. The system may select the updated sequence based on one or more predefined selection criteria or based on a determination of the updated sequence that has a highest scoring value according to a predefined scoring function. Examples of the selection criteria include: (i) least extent of resequencing; (ii) least number of object to be re-sequenced; (iii) least amount of time to implement the re-sequencing and/or the loading according to the updated sequence; (vi) greatest stability; (vii) best weight distribution; (viii) greatest density, or any combination thereof, etc.

At 1945, an updated plan for placing the objects is determined. In some embodiments, in response to determining a new sequence for loading the objects to the transport container, the system determines an updated plan to load the objects in the updated sequence. For example, the updated plan includes placing one or more objects in a buffer zone to buffer the objects until the objects are to be loaded to the transport container in accordance with the updated plan. The system can use the buffer zone as a mechanism for re-sequencing the objects delivered to the workspace.

At 1950, a robot is caused to place the objects according to a current plan. The current plan corresponds to the initial plan (e.g., the plan provided to the robotic system from an offline system), or an updated plan determined based on the re-sequencing of the objects delivered to the workspace. In some embodiments, causing the robot to place the objects includes controlling a robotic arm to move to engage an object, grasp the object, move the object to the corresponding destination location (e.g., a destination location in the transport container), and placing the object at the destination location.

At 1955, the system determines whether more objects are to be loaded to the transport container. In some embodiments, the system determines whether any objects remain to be loaded to the transport container. For example, an iteration of 1905-1950 may be implemented for a subset of the objects to be loaded to the transport container (e.g., a subset of a partition allocated to the transport container).

In response to determining that more objects are to be loaded to the transport container at 1950, process 1900 returns to 1905 and process 1900 iterates over 1905-1955 until no further objects are to be loaded to the transport container (e.g., the transport container is fully loaded).

In some embodiments, the system determines that no further objects are to be loaded to the transport container in response to determining that the system receives an indication from an administrator that process 1900 is to be paused or stopped, etc.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for arranging a set of objects for loading to a transport container, comprising:
 a processor configured to:
  receive an indication of the set of objects to be loaded into the transport container for transport from a source location to a destination location;
  determine, based at least in part on object information corresponding to the set of objects and resources available to load the set of objects, an arrangement of the set of objects loaded into the transport container that satisfies a weight distribution criteria, wherein:
   determining the arrangement comprises: (i) determining a set of potential arrangements, (ii) simulating a set of loadings of the set of objects according to the set of potential arrangements, (iii) scoring the set of potential arrangements according to a predefined scoring function, and (iv) selecting a selected arrangement from among the set of potential arrangements based at least in part on the scoring of the simulated loading for the selected potential arrangement, including based at least in part on determining that selected arrangement satisfies the weight distribution criteria; and
   simulating the set of loadings of the set of objects according to the set of potential arrangements comprises pruning a search space based at least in part on a pruning criteria to limit a number of placements to be simulated for the set of potential arrangements, wherein:
    the pruning criteria is based at least in part on a determination that a state for a particular loading is expected to have a stability less than a stability threshold based on a simulation of the particular loading; and
    the pruning the search space comprises: in response to determining that the pruning criteria is satisfied for the particular loading, pruning from the search space all potential loadings that branch from the particular loading; and
  providing the arrangement to a robot, wherein in response to providing to the robot the arrangement as an output to be used in connection with loading the set of objects to the transport container, the robot is configured to load the set of objects to the transport container; and
 a memory configured to store the object information.

2. The system of claim 1, wherein the object information comprises one or more object attributes.

3. The system of claim 2, wherein the one or more object attributes include one or more of a shape, a mass, a material, a moment of inertia, a rigidity, an object size, an object dimension, an object weight, a type of packaging, an object identifier.

4. The system of claim 1, wherein the arrangement is determined by determining a solution having a highest scoring value according to a predefined cost function that is based at least in part on a weight distribution model, a sequencing model, and a partitioning model.

5. The system of claim 4, wherein the weight distribution model is constrained based at least in part on an object density of the set of objects loaded into the transport container satisfying a predefined density threshold.

6. The system of claim 1, wherein determining the arrangement of the set of objects loaded into the transport containers includes:
 simulating a predicted arrangement of the set of objects loaded into the transport container; and
 determining whether the predicted arrangement satisfies the weight distribution criteria; and
 in response to determining that the predicted arrangement does not satisfy the weight distribution criteria, providing information pertaining to weight imbalances within the transport container.

7. The system of claim 6, wherein the weight distribution criteria is a weight distribution of a loading for the particular arrangement exceeding a predefined minimum weight distribution threshold.

8. The system of claim 6, wherein in response to determining that the predicted arrangement does not satisfy the weight distribution criteria, information pertaining to objects that are predicted to be damaged during loading or transport is provided as feedback for determining a next predicted arrangement.

9. The system of claim 6, wherein in response to determining that the predicted arrangement does not satisfy the weight distribution criteria, recommended packing modifications that attain an updated arrangement that satisfies the weight distribution criteria is provided as feedback for determining a next predicted arrangement.

10. The system of claim 6, wherein the weight distribution criteria is based at least in part on weight distribution of a loading for the predicted arrangement relative to support for the transport container during transport.

11. The system of claim 1, wherein the weight distribution constraint includes a restriction from placing an object having a weight greater than a predetermined weight threshold on top of one or more objects having one or more predetermined characteristics.

12. The system of claim 11, wherein the one or more predetermined characteristics includes one or more of an indication of a fragility, a rigidity, a deformability, a size, and surface area of a top surface.

13. The system of claim 1, further comprising one or more sensors configured to obtain information indicative of one or more object attributes for the set of objects.

14. The system of claim 1, wherein the arrangement is determined based at least in part on a constraint of whether the loading and unloading of the set of objects is feasible and efficient for robotic manipulators.

15. The system of claim 1, wherein the arrangement is determined based at least in part on a weight distribution model and one or more of a sequencing model and a partitioning model.

16. The system of claim 1, wherein the weight distribution criteria include a maximum weight per square foot on a floor of the transport container.

17. The system of claim 1, wherein the weight distribution criteria include a constraint for centering loads around a location of tires of a vehicle that is to move the transport container.

18. The system of claim 1, wherein the search space for a particular arrangement is pruned in response to determining that a particular placement in the particular arrangement is expected to result in an undesirable arrangement.

19. A method for arranging a set of objects for loading to a transport container, comprising:
receiving, by one or more processors, an indication of the set of objects to be loaded into the transport container for transport from a source location to a destination location;
determining, based at least in part on object information corresponding to the set of objects and resources available to load the set of objects, an arrangement of the set of objects loaded into the transport container that satisfies a weight distribution criteria, wherein:
determining the arrangement comprises: (i) determining a set of potential arrangements, (ii) simulating a set of loadings of the set of objects according to the set of potential arrangements, (iii) scoring the set of potential arrangements according to a predefined scoring function, and (iv) selecting a selected arrangement from among the set of potential arrangements based at least in part on the scoring of the simulated loading for the selected potential arrangement, including based at least in part on determining that selected arrangement satisfies the weight distribution criteria; and
simulating the set of loadings of the set of objects according to the set of potential arrangements comprises pruning a search space based at least in part on a pruning criteria to limit a number of placements to be simulated for the set of potential arrangements, wherein:
the pruning criteria is based at least in part on a determination that a state for a particular loading is expected to have a stability less than a stability threshold based on a simulation of the particular loading; and
the pruning the search space comprises: in response to determining that the pruning criteria is satisfied for the particular loading, pruning from the search space all potential loadings that branch from the particular loading; and
providing the arrangement to a robot, wherein in response to providing to the robot the arrangement as an output to be used in connection with loading the set of objects to the transport container, the robot is configured to load the set of objects to the transport container.

20. A computer program product embodied in a non-transitory computer readable medium for arranging a set of objects for loading to a transport container, and the computer program product comprising computer instructions for:
receiving, by one or more processors, an indication of the set of objects to be loaded into the transport container for transport from a source location to a destination location;
determining, based at least in part on object information corresponding to the set of objects and resources available to load the set of objects, an arrangement of the set of objects loaded into the transport container that satisfies a weight distribution criteria, wherein:
determining the arrangement comprises: (i) determining a set of potential arrangements, (ii) simulating a set of loadings of the set of objects according to the set of potential arrangements, (iii) scoring the set of potential arrangements according to a predefined scoring function, and (iv) selecting a selected arrangement from among the set of potential arrangements based at least in part on the scoring of the simulated loading for the selected potential arrangement, including based at least in part on determining that selected arrangement satisfies the weight distribution criteria; and
simulating the set of loadings of the set of objects according to the set of potential arrangements comprises pruning a search space based at least in part on a pruning criteria to limit a number of placements to be simulated for the set of potential arrangements, wherein:
the pruning criteria is based at least in part on a determination that a state for a particular loading is expected to have a stability less than a stability threshold based on a simulation of the particular loading; and
the pruning the search space comprises: in response to determining that the pruning criteria is satisfied for the particular loading, pruning from the search space all potential loadings that branch from the particular loading; and providing the arrangement to a robot, wherein in response to providing to the robot the arrangement as an output to be used in connection with loading the set of objects to the transport container, the robot is configured to load the set of objects to the transport container.

* * * * *